US012715998B2

(12) United States Patent
Kiel et al.

(10) Patent No.: US 12,715,998 B2
(45) Date of Patent: *Aug. 25, 2026

(54) METHODS OF FORMING AN OBJECT IN A VOLUME OF A PHOTOHARDENABLE COMPOSITION, PHOTOHARDENABLE COMPOSITIONS, AND PHOTOINITIATORS

(71) Applicant: QUADRATIC 3D, INC., Charlestown, MA (US)

(72) Inventors: Gavin R. Kiel, Cambridge, MA (US); Samuel N. Sanders, Arlington, MA (US); Elango Kumarasamy, Arlington, MA (US)

(73) Assignee: QUADRATIC 3D, INC., Charlestown, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/291,280

(22) Filed: Aug. 5, 2025

(65) Prior Publication Data

US 2025/0361403 A1 Nov. 27, 2025

Related U.S. Application Data

(63) Continuation of application No. 18/945,127, filed on Nov. 12, 2024, which is a continuation of application No. PCT/US2023/022172, filed on May 13, 2023.

(60) Provisional application No. 63/450,931, filed on Mar. 8, 2023, provisional application No. 63/440,085, filed on Jan. 19, 2023, provisional application No. 63/438,280, filed on Jan. 11, 2023, provisional application No. 63/341,594, filed on May 13, 2022.

(51) Int. Cl.

| | |
|---|---|
| ***C09D 4/00*** | (2006.01) |
| ***B29C 64/129*** | (2017.01) |
| ***B29K 33/00*** | (2006.01) |
| ***B33Y 10/00*** | (2015.01) |
| ***B33Y 70/00*** | (2020.01) |
| ***C09D 133/06*** | (2006.01) |
| ***C09D 133/26*** | (2006.01) |

(52) U.S. Cl.

CPC .............. *C09D 4/00* (2013.01); *B29C 64/129* (2017.08); *B33Y 10/00* (2014.12); *B33Y 70/00* (2014.12); *C09D 133/062* (2013.01); *C09D 133/26* (2013.01); *B29K 2033/26* (2013.01)

(58) Field of Classification Search

CPC .... C09D 4/00; C09D 133/062; C09D 133/26; C09D 5/00; B29C 64/129; B29C 64/124; B29C 64/264; B33Y 10/00; B33Y 70/00; B29K 2033/26; G03F 7/0037; G03F 7/029; G03F 7/2051; G03F 7/2053; G03F 7/031; G03F 7/70416

See application file for complete search history.

(56) References Cited

U.S. PATENT DOCUMENTS

| | | | |
|---|---|---|---|
| 4,041,476 | A | 8/1977 | Swainson |
| 5,230,986 | A | 7/1993 | Neckers |
| 5,474,719 | A | 12/1995 | Fan et al. |
| 6,548,593 | B2 | 4/2003 | Merz et al. |
| 6,693,201 | B1 | 2/2004 | Rentzepis et al. |
| 7,964,333 | B1 | 6/2011 | Belfield |
| 8,071,666 | B2 | 12/2011 | Barthel et al. |
| 9,227,986 | B2 | 1/2016 | Branda et al. |
| 9,376,602 | B2 | 6/2016 | Walther et al. |
| 10,208,220 | B2 | 2/2019 | Shields et al. |
| 10,392,523 | B2 | 8/2019 | Shields et al. |
| 10,843,410 | B2 | 11/2020 | Lippert et al. |
| 11,407,890 | B2 | 8/2022 | Gover et al. |
| 11,491,711 | B2 | 11/2022 | Holt et al. |
| 2003/0083753 | A1 | 5/2003 | Kalgutkar |
| 2003/0174560 | A1 | 9/2003 | Dahmen |
| 2004/0030078 | A1 | 2/2004 | Branda et al. |
| 2004/0049040 | A1 | 3/2004 | Irie |
| 2006/0079653 | A1 | 4/2006 | Dunaev et al. |
| 2006/0111461 | A1 | 5/2006 | Barachevsky et al. |
| 2007/0082964 | A1 | 4/2007 | Weine Ramsey |
| 2007/0108644 | A1 | 5/2007 | Cregger |
| 2007/0114365 | A1 | 5/2007 | Potyrailo et al. |
| 2007/0211110 | A1 | 9/2007 | Iftime et al. |
| 2009/0202919 | A1 | 8/2009 | Waldman et al. |
| 2010/0328741 | A1 | 12/2010 | Cheverton et al. |
| 2013/0116358 | A1 | 5/2013 | Rrahimi |
| 2013/0305947 | A1 | 11/2013 | Iftime et al. |

(Continued)

FOREIGN PATENT DOCUMENTS

| | | | |
|---|---|---|---|
| CN | 107663377 | A | 2/2018 |
| CN | 107880238 | A | 4/2018 |

(Continued)

OTHER PUBLICATIONS

Irie et al., "Diarylethenes for Memories and Switches" Chem. Rev., 100, 1685-1716 (Year: 2000).*

(Continued)

*Primary Examiner* — Jessica M Roswell

(57) ABSTRACT

The present invention includes methods for forming an object in a volume including a photohardenable composition described herein that includes a photohardenable resin component and a photoswitchable photoinitiator comprising a P-type photochromic molecule. The present invention also includes photoswitchable photoinitiators comprising a P-type photochromic molecule, preferably comprising a P-type diarylethene molecule, and photohardenable compositions and methods including such photoswitchable photoinitiators.

13 Claims, 3 Drawing Sheets

(56) References Cited

U.S. PATENT DOCUMENTS

| | | | |
|---|---|---|---|
| 2015/0070743 | A1 | 3/2015 | Branda et al. |
| 2015/0111979 | A1 | 4/2015 | Yang et al. |
| 2016/0067922 | A1 | 3/2016 | Voris et al. |
| 2016/0137838 | A1 | 5/2016 | Roland et al. |
| 2016/0271875 | A1 | 9/2016 | Brown, Jr. |
| 2017/0022311 | A1 | 1/2017 | Liu et al. |
| 2017/0291356 | A1 | 10/2017 | Adashi |
| 2018/0015672 | A1 | 1/2018 | Shusteff et al. |
| 2018/0112018 | A1 | 4/2018 | Czaplewski et al. |
| 2018/0273657 | A1 | 9/2018 | Wang et al. |
| 2018/0333913 | A1 | 11/2018 | Lin et al. |
| 2019/0358895 | A1 | 11/2019 | Jau et al. |
| 2020/0341373 | A1 | 10/2020 | Wang et al. |
| 2020/0355862 | A1 | 11/2020 | Lane et al. |
| 2020/0361152 | A1 | 11/2020 | Shusteff et al. |
| 2021/0070741 | A1 | 3/2021 | Robb et al. |
| 2021/0078253 | A1 | 3/2021 | Lippert et al. |
| 2021/0162670 | A1 | 6/2021 | Nichols et al. |
| 2021/0291460 | A1 | 9/2021 | Clark |
| 2022/0007005 | A1 | 1/2022 | Lippert et al. |
| 2022/0025255 | A1 | 1/2022 | Congreve et al. |
| 2022/0055290 | A1 | 2/2022 | Hahn et al. |
| 2022/0410473 | A1 | 12/2022 | Garmshausen et al. |
| 2023/0167139 | A1 | 6/2023 | Yam et al. |
| 2024/0166912 | A1 | 5/2024 | Sanders et al. |
| 2024/0198583 | A1 | 6/2024 | Arndt et al. |
| 2024/0217943 | A1 | 7/2024 | Sanders et al. |
| 2024/0218086 | A1 | 7/2024 | Sanders et al. |
| 2025/0066584 | A1 | 2/2025 | Sanders et al. |
| 2025/0066585 | A1 | 2/2025 | Sanders et al. |
| 2025/0068071 | A1 | 2/2025 | Sanders et al. |

FOREIGN PATENT DOCUMENTS

| | | | |
|---|---|---|---|
| CN | 113173920 | A | 7/2021 |
| CN | 114031713 | A | 2/2022 |
| RU | 0002473586 | | 1/2011 |
| WO | WO2010/107784 | A1 | 9/2010 |
| WO | WO 2016/048361 | A1 | 3/2016 |
| WO | WO2020/070639 | A1 | 4/2020 |
| WO | WO 2020/139858 | A1 | 7/2020 |
| WO | WO2020/185553 | A1 | 9/2020 |
| WO | WO2020/245456 | A1 | 12/2020 |
| WO | WO 2021/154895 | A1 | 8/2021 |
| WO | WO 2021/154897 | A1 | 8/2021 |
| WO | WO 2021/247926 | A1 | 12/2021 |
| WO | WO 2023/034398 | A1 | 3/2023 |
| WO | WO2023/0220463 | A1 | 11/2023 |

OTHER PUBLICATIONS

Bao, Y., "Recent Trends in Advanced Photoinitiators for Vat Photopolymerization 3D Printing", Macromol. Rapid Commun. 2022, 43, 2200202.

Dolinski, N.D., et al., "Solution Mask Liquid Lithography (SMaLL) for One-Step, Multimaterial 3D Printing", Adv. Mater. 2018, 100364 (pp. 1-6).

Ebereli, E., et al., "DLP Additive Manufacturing of Ceramics: Photosensitive Parameters, Thermal Analysis, Post-Processing, and Parts Characterization". 11$^{th}$ Brazilian Congress on Manufacturing Engineering, May 24-26, 2021, Curitiba, PR, Brazil, URL: https://www.researchgate.net/profile/Italo-Camargo/publication/351973092_DLP_ADDITIVE_MANUFACTURING_OF_CERAMICS_PHOTOSENSITIVE_PARAMETERS_THERMAL_ANALYSIS_POST-PROCESSING_AND_PARTS_CHARACTERIZATION/links/60b6986092851cde884a65ee/DLP-ADDITIVE-MANUFACTURING-OF-CERAMICS-PHOTOSENSITIVE-PARAMETERS-THERMAL-ANALYSIS-POST-PROCESSING-AND-PARTS-CHARACTERIZATION.pdf.

Extended European search Report dated Jul. 4, 2025 in counterpart European Patent Application No. 23804380.6 ,which the European Regional Phase application filed from International Application No. PCT/US2023/022172, which is the grandparent of the present application).

Fredrich. S., et al., "Switching Diarylethenes Reliably in Both Directions with Visible Light," Agnew. Chem. Int. Ed., 2016, 55 1208 (2016).

Hahn, V., et al., "Light-sheet 3D microprinting via two-colour two-step absorption", Nature Photonics, vol. 16, Nov. 2022, 784-791 (published online Oct. 13, 2022).

Ichimura, K., et al., "A Spiropyran-Iodonium Salt System as a Two Photon Radical Photoinitiator", J Polym. Sci: Part C: Polymer Letters, vol. 26, 185-189 (1988).

International Search Report , Written Opinion, Transmittal dated Oct. 6, 2023 mailed in International Application No. PCT/US2023/022172 filed May 13, 2023. (International Application No. PCT/US2023/022172 is the grandparent of the present application).

Irie, M., "Diarylethene Molecular Photoswitches—Concepts and Functionalities", 2021 Wiley-VCH GmbH.

Lee, S-K., et al., "Benzospiropyrans as Photochromic and/or Thermochromic Photoinitiators", Chem. Mater. 1991, 3, pp. 852-858.

Lee, S-K., et al., "Two-photon radical photoinitiator system based on iodinated benzospiropyrans", Chem. Mater. 1991, 3, pp. 858-864.

Lee, Y-H, et al., "Fabrication of Periodic 3D Nanostructuration for Optical Surfaces by Holographic Two-Photon-Polymerization", Int'l Journal of Information and Electronics Engineering, vol. 6, No. 3, May 2016.

Liravi, F., et al., "Additive manufacturing of 3D structures with non-Newtonian highly viscous fluids: Finite element modeling and experimental validation", Additive Manufacturing (2016), http://dx.doi.org/10.1016/j.addma.2016.10.008.

Lu, P., et al., "Wavelength-selective light-matter interactions in polymer science", Matter 4, 2172-2229, Jul. 7, 2021.

Morimitsu, K., et al., "Thermal Cycloreversion Reaction of a Photochromic Dithienylperfluorocyclopentene with tert-Butoxy Substituents at the Reactive Carbons", Chemistry Letters Jun. 2002 pp. 572-573.

Punpogsanon P. et al., ColorMod: Recoloring 3D Printed Objects using Photochromic Inks. In Proceedings of CHI'18, Conference on human factors in computing systems, Apr. 21-26, 2018, Montreal, QC, Canada, Association for Computing Machinery Digital Library, published Apr. 21, 2018, Brazil. Retrieved from URL: https://groups.csail.mit.edu/hcie/files/research-projects/colormod/2018-chi-colormod-paper.pdf.

Reghely, M., et al., "Xolography for linear volumetric 3D printing ", Nature vol. 588 24/31 Dec. 2020.

Reghely, M., et al., Supplementary Information—"Xolography for linear volumetric 3D printing ", Nature Research 2020.

Sponza, A., et al., Synthesis strategies for Non-symmetric, Photochromic Diarylethenes, Organic Biomolecular Chemistry, vol. 18, Sep. 8, 2020, pp. 7238-7252.

Theodoropoulou, et al., "Aldehydes as powerful initiators for photochemical transformations". Beilstein Journal of Organic Chemistry, vol. 16, 2020, doi:10.3762/bjoc.16.76,pp. 833-857; abstract.

Texas Instruments Application Report DLPA022-Jul. 2010 entitled "DLP™ System Optics".

Texas Instruments "TI DLR Technology for 3D Printing—Design scalable high-speed stereolithograpy [sic] systems using TI DLP technology" 2016.

Texas Instruments "DLP6500 0.65 1080p MVSP Type A DMD", DLP6500, DLPS040A-Oct. 2014—Revised Oct. 2016.

Towns, Andrew D., Chapter 5 entitled "Industrial Photochromism" (pp. 227-279), Giacomo Bergamini, Serena Silvi (eds.), *Applied Photochemistry*, Lecture Notes in Chemistry 92, DOI 10.1007/978-3-319-31671-0_5, Publisher: Springer International Publishing Switzerland.

Wang, B., et al., Nature Communications (2022) 13:367 (https://doi.org/10.1038/s41467-022-28013-4).

Zhang, Z., et al., "A building-block design for enhanced visible-light switching of diarylethenes", Nature Communications (2019) 10:4232 https://doi.org/10.1038/s41467-019-12302-6 www.naturecommunications.

(56) References Cited

OTHER PUBLICATIONS

Extended European Search Report issued in EP Application No. 23804378.0 of Quadratic 3D, Inc. This EP application is a counterpart of U.S. Appl. No. 18/944,951, filed Nov. 12, 2024 of Quadratic 3D, Inc.
Ern, J., et al. “Reaction Dynamic of a Photochromic Fluorescing Dithienylethene”, American Chemical Society [final form Nov. 8, 2000], published as J. Phys. Chem. A, 2001, 105, 1741-1749.
Petchprayoon Chutima et al, “Rational design, synthesis, and characterization of highly fluorescent optical switches for high-contrast optical lock-in detection (OLID) imaging microscopy in living cells”, Bioorganic & Medicinal Chemistry, [on-line] vol. 19, No. 3, pp. 1030-1040 (2010).
Qin, Xiaozhuan, et al., “Stilbene-benzophenone dyads for free radical initiating polymerization of methyl methacrylate under visible light irradiation”, Dyes and Pigments 132 (2016) 27-40.
Sysoiev, D., et al., “Pronounced effects on switching efficiency of diarylcycloalkenes upon cycloalkene ring contraction”, Chem. Commun., 2012, 48, 11355-11357.
Traven, Valerii F., et al., “Synthesis and photochromism of aryl(heteroaryl)-and diheteroarylethenes-coumarin derivatives”, Journal of Heterocyclic Communications https://doi.org/10.155/hc-2013-0056.
Velema, Willem A. et al., „Ciprofloxacin-Photoswitch Conjugates: A Facile Strategy for Photopharmacology, Bioconjugate Chemistry {on-line] vol. 26, No. 12 Dec. 3, 2015.
Xiao, Shuzhang Xiao, et al., “A multi-photo responsive photochromic dithienylethene containing coumarin derivative”, Tetrahedron Letters 46 (2005) 9009-9012.
Zheng Jueting et al., “Structure identification for Force-Induced Reaction Using Single Molecule Conductance measurement”, CCS Chemistry [on-line], vol. 5, No. 8, Aug. 1, 2023, pp. 1888-1895.

* cited by examiner

FIG. 1A
A
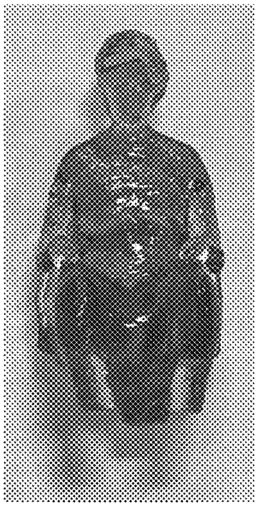
FIG. 1B
B
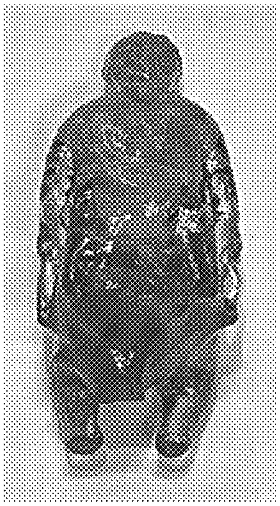
FIG. 1C
C
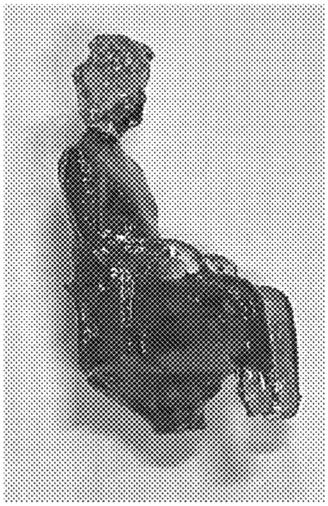
D
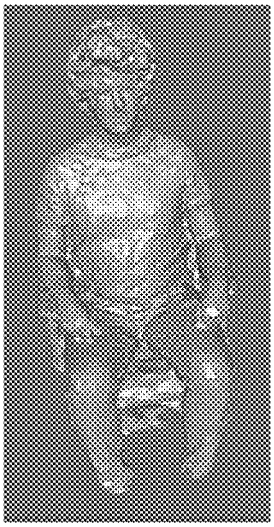
FIG. 1D
E
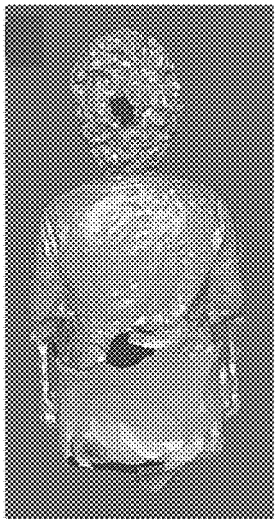
FIG. 1E
F
FIG. 1F FIG. 2A
A
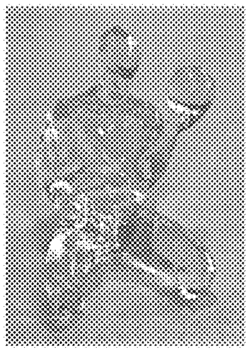
FIG. 2B
B
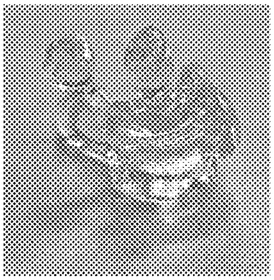
FIG. 2C
C
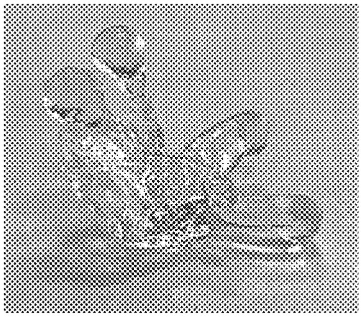
D
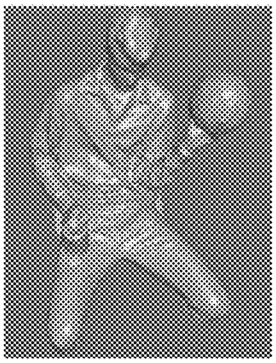
FIG. 2D
E
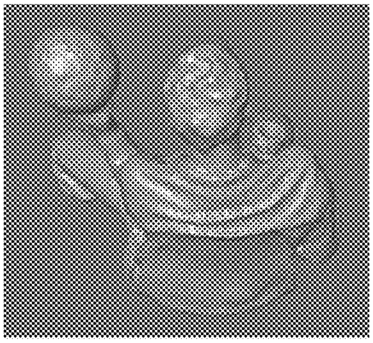
FIG. 2E
F
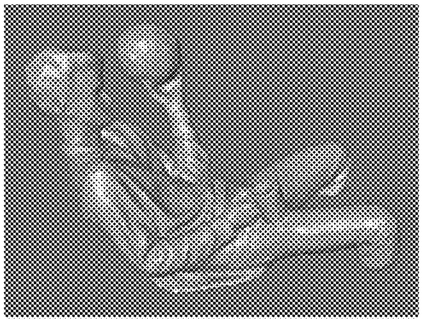
FIG. 2F FIG. 3A
A
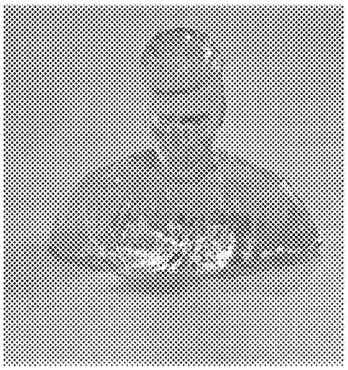
FIG. 3B
B
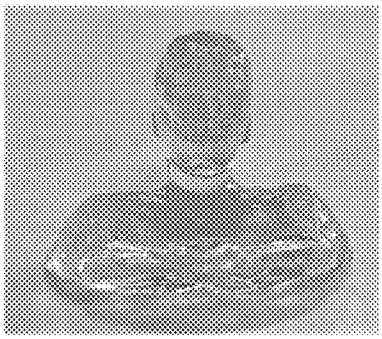
FIG. 3C
C
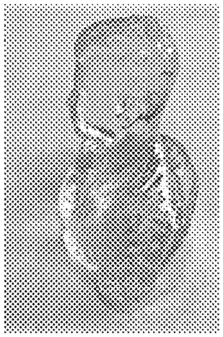
D
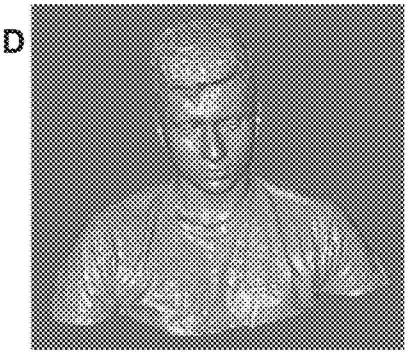
FIG. 3D
E
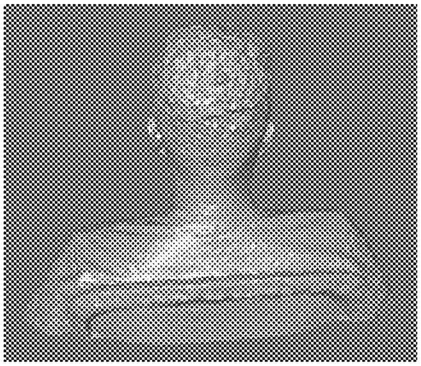
FIG. 3E
F
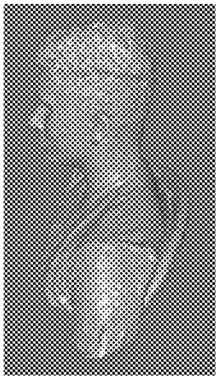
FIG. 3F

METHODS OF FORMING AN OBJECT IN A VOLUME OF A PHOTOHARDENABLE COMPOSITION, PHOTOHARDENABLE COMPOSITIONS, AND PHOTOINITIATORS

CROSS-REFERENCE TO RELATED APPLICATIONS

This application is a continuation of U.S. patent application Ser. No. 18/945,127, filed Nov. 12, 2024, which is a continuation of International Application No. PCT/US2023/022172, filed 13 May 2023, which International Application claims priority to U.S. Provisional Patent Application No. 63/341,594 filed on May 13, 2022, U.S. Provisional Patent Application No. 63/438,280 filed on Jan. 11, 2023, U.S. Provisional Patent Application No. 63/440,085 filed Jan. 19, 2023, and U.S. Provisional Patent Application No. 63/450,931 filed Mar. 8, 2023, each of the foregoing being hereby incorporated herein by reference in its entirety for all purposes.

TECHNICAL FIELD OF THE INVENTION

The present invention relates to the technical field of three-dimensional printing and related compositions, materials, methods, and products thereof.

BRIEF SUMMARY OF THE INVENTION

The present invention includes methods for forming an object in a volume of a photohardenable composition comprising a photohardenable resin component and photoswitchable photoinitiator including a P-type photochromic molecule. The present invention also includes photoswitchable photoinitiators comprising a P-type diarylethene molecule represented by formulae described herein, and photohardenable compositions and methods including any of such photoswitchable photoinitiators.

In accordance with one aspect of the present invention, there is provided a method of forming an object in a volume of a photohardenable composition, the method comprising:

(a) providing the volume including the photohardenable composition, the photohardenable composition comprising a photohardenable resin component and a photoswitchable photoinitiator comprising a P-type photochromic molecule, (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations to induce a crosslinking or polymerization reaction in the photohardenable composition at the intersection of the first and second wavelengths at the one or more selected locations within the volume to at least partially form the object; and (c) optionally repeating step (b), irradiating the photohardenable composition at one or more selected locations that are the same as or different from one or more previous selected locations in the volume until the object is partially or fully formed.

The method preferably further comprises separating the partially or fully formed object from the photohardenable composition.

Preferred photoswitchable photoinitiators for inclusion in the methods of the invention comprise a substituted or unsubstituted P-type photochromic molecule, preferably comprising a P-type diarylethene molecule, wherein the P-type photochromic molecule is activatable by light having a first wavelength ($\lambda_1$) and light having a second wavelength ($\lambda 2$) to induce a crosslinking or polymerization reaction in the photohardenable composition at the intersection of the first and second wavelengths, wherein the first wavelength is shorter than the second wavelength.

More preferred photoswitchable photoinitiators for inclusion in the method of the present invention comprise a P-type photochromic molecule, preferably comprising a P-type diarylethene molecule, that includes one or more substituents at least one which comprises a carbonyl group, wherein the P-type photochromic molecule is activatable by light having a first wavelength ($\lambda 1$) and light having a second wavelength ($\lambda 2$) to induce a crosslinking or polymerization reaction in the photohardenable composition at the intersection of the first and second wavelengths, wherein the first wavelength is shorter than the second wavelength.

Examples of substituent groups comprising a carbonyl group include, but are not limited to, a substituted or unsubstituted thioxanthone group, a substituted or unsubstituted diarylketone group, a substituted or unsubstituted benzophenone group, a substituted or unsubstituted alpha-diketone (e.g., but not limited to, a substituted or unsubstituted benzil group, and the like), a polycyclic group including at least two fused rings of atoms, wherein at least one of the fused rings of atoms includes one or more substituents, wherein at least one of the substituents comprises a double bonded oxygen attached to a carbon atom ring member included in one of the fused rings (e.g., but not limited to, acenaphthylene-1,2-dione group, a polycyclic group including at least two fused rings of atoms comprises a thiochroman-4-one group a 9-fluorenone group, an anthraquinone group, a benzanthrone group, a 9,10-phenanthrenequinone group, and the like, and derivatives thereof). Substituents on substituted functional groups including a carbonyl group can optionally further include one or more additional substituents.

Preferred P-type diarylethene molecules include P-type diarylcycloalkene molecules. Such molecules can desirably include one or more substituents. More preferably such molecules include one or more substituents at least one of which comprises a carbonyl group.

Examples of more preferred photoswitchable photoinitiators for inclusion in photohardenable compositions and methods described herein include, but are not limited to, P-type photochromic molecules including one or more substituents at least one of which comprises a substituted or unsubstituted diarylketone group, a substituted or unsubstituted alpha-diketone group or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings.

More preferred photohardenable compositions for inclusion methods described herein include photoswitchable photoinitiators in accordance with another aspect of the present invention.

In accordance with another aspect of the present invention, there is provided a photoswitchable photoinitiator comprising a P-type photochromic molecule, which molecule includes one or more substituents, wherein at least one substituent comprises a substituted or unsubstituted diarylketone group, a substituted or unsubstituted alpha-diketone group, or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings, wherein the P-type photochromic molecule is activatable by light having a first wavelength ($\lambda_1$) and light having a second wavelength ($\lambda$2) to induce a cross-linking or polymerization reaction in a photohardenable composition at the intersection of the first and second wavelengths, wherein the first wavelength is shorter than the second wavelength.

Photoswitchable photoinitiators in accordance with the invention preferably include a P-type photochromic molecule.

Nonlimiting examples of preferred photoswitchable photoinitiators include photoswitchable photoinitiators comprising a diarylcycloalkene molecule represented by general formula (I):

(I)

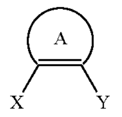

wherein:

A represents a substituted or unsubstituted cycloalkene ring structure,

X represents a heteroaryl group represented by following formula ($X_a$), ($X_b$), ($X_c$), or ($X_a$):

($X_a$)

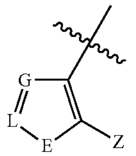

wherein:

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, a sulfur atom with an $R^7$ substituent group ($SR^7$), an oxygen atom with an $R^8$ substituent group ($OR^8$), or a cyano (CN) group, G is a member of the ring and represents a carbon atom with an $R^9$ substituent group ($CR^9$) or a nitrogen atom (N);

L is a member of the ring and represents a carbon atom with an R' substituent group ($CR^1$) or a nitrogen atom (N), and $R^1$, $R^6$—$R^9$, and are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or ($X_b$)

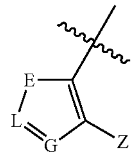

wherein:

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, a sulfur atom with an $R^7$ substituent group ($SR^7$), an oxygen atom with an $R^8$ substituent group ($OR^8$), or a cyano (CN) group, G is a member of the ring and represents a carbon atom with an R substituent group ($CR^9$) or a nitrogen atom (N);

L is a member of the ring and represents a carbon atom with an $R^1$ substituent group (C $R^1$) or a nitrogen atom (N), and $R^1$ and $R^6$—$R^9$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or ($X_c$)

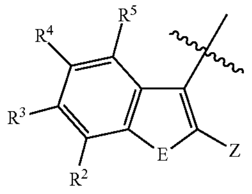

wherein:

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, a sulfur atom with an $R^7$ substituent group ($SR^7$), an oxygen atom with an $R^8$ substituent group ($OR^8$), or a cyano (CN) group, and $R^2$—$R^8$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or ($X_d$)

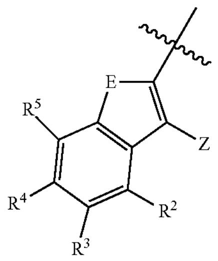

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, a sulfur atom with an $R^7$ substituent group ($SR^7$), an oxygen atom with an $R^8$ substituent group ($OR^8$), or a cyano (CN) group, and $R^2$—$R^8$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group;

Y represents a heteroaryl group represented by formula ($Y_a$), ($Y_b$), ($Y_c$) or ($Y_a$):

($Y_a$)

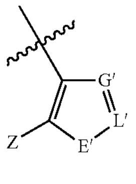

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z' represents a substituted or unsubstituted alkyl group, a substituted or unsubstituted aryl group, a substituted or unsubstituted alkynyl group, a sulfur atom with an $R^{16}$ substituent group ($SR^{16}$), an oxygen atom with an $R^{17}$ substituent group ($OR^{17}$), or a cyano (CN) group, G' is a member of the ring and represents a carbon atom with an $R^{18}$ substituent group ($CR^{18}$) or a nitrogen atom (N);

L' is a member of the ring and represents a carbon atom with an $R^{10}$ substituent group ($CR^{10}$) or a nitrogen atom (N), and $R^{10}$ and $R^{15}$—$R^{18}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or ($Y_b$)

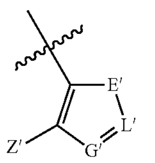

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z' represents a substituted or unsubstituted alkyl group, a substituted or unsubstituted aryl group, a substituted or unsubstituted alkynyl group, a sulfur atom with an $R^{16}$ substituent group ($SR^{16}$), an oxygen atom with an $R^{17}$ substituent group ($OR^{17}$), or a cyano (CN) group, G' is a member of the ring and represents a carbon atom with an $R^{18}$ substituent group, ($CR^{18}$) or a nitrogen atom (N);

L' is a member of the ring and represents a carbon atom with an $R^{10}$ substituent group ($CR^{10}$) or a nitrogen atom (N), and and $R^{10}$ and $R^{15}$—$R^{18}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or ($Y_c$)

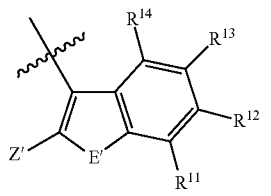

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z' represents a substituted or unsubstituted alkyl group, a substituted or unsubstituted aryl group, a substituted or unsubstituted alkynyl group, a sulfur atom with an $R^{16}$ substituent group ($SR^{16}$), an oxygen atom with an $R^{17}$ substituent group ($OR^{17}$), or a cyano (CN) group, and $R^{11}$—$R^{17}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or ($Y_d$)

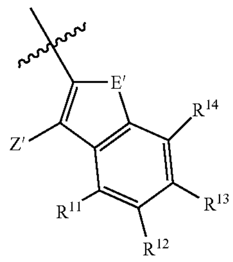

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z' represents a substituted or unsubstituted alkyl group, a substituted or unsubstituted aryl group, a substituted or unsubstituted alkynyl group, a sulfur atom with an $R^{16}$ substituent group ($SR^{16}$), an oxygen atom with an $R^{17}$ substituent group ($OR^{17}$), or a cyano (CN) group, and $R^{11}$—$R^{17}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group;

wherein at least one of X and Y includes at least one R substituent comprising a substituted or unsubstituted diarylketone group, a substituted or unsubstituted alpha-diketone group, or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings; and wherein the P-type photochromic molecule is activatable by light having a first wavelength (λ1) and light having a second wavelength (λ2) to induce a crosslinking or polymerization reaction in a photohardenable composition at the intersection of the first and second wavelengths, wherein the first wavelength is shorter than the second wavelength.

It can be desirable for the at least one R substituent comprising a substituted or unsubstituted diarylketone group, a substituted or unsubstituted alpha-diketone group, or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings, to be located at one of positions $R^1$ or $R^9$ when X is represented by ($X_a$) or ($X_b$), at one of positions $R^2$—$R^5$ when X is represented by formula ($X_c$) or ($X_d$), at one of positions $R^{10}$ or $R^{18}$ when Y is represented by ($Y_a$) or ($Y_b$), or at one of positions $R^{11}$—$R^{14}$ when Y is represented by ($Y_c$) or ($Y_d$).

Preferred examples of A include structures represented by formula ($A_a$), ($A_b$), ($A_c$), and $A_{(d)}$ below.

Optionally R groups on any two adjacent ring members of X and/or Y may comprise atoms for completing a ring structure linking the two adjacent substituent groups together. Such ring structure can be substituted or unsubstituted and may optionally be part of a polycyclic substituted or unsubstituted ring structure. Such ring structure or, if applicable, a polycyclic structure of which it is a part, can optionally include one or more heteroatoms in addition to carbon atoms in the ring structure.

More preferably at least one R substituent on X and/or Y comprises a substituted or unsubstituted benzophenone group, a substituted or unsubstituted benzil group, a substituted or unsubstituted thioxanthone group, a substituted or unsubstituted acenaphthylene-1,2-dione group, a substituted or unsubstituted thiochroman-4-one group, a substituted or unsubstituted 9-fluorenone group, a substituted or unsubstituted anthraquinone group, a substituted or unsubstituted benzanthrone group, a substituted or unsubstituted 9,10-phenanthrenequinone group, a substituted or unsubstituted xanthone group, a substituted 1,2-indanedione group, a substituted or unsubstituted chromone group, a substituted or unsubstituted 1,4-naphthoquinone group, and the like.

It can be desirable for each of X and Y to include at least one R substituent comprising a substituted or unsubstituted diarylketone group, a substituted or unsubstituted alpha-diketone group, or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings. In such case, such substituent on X and Y can be the same or different.

Optionally, X and Y can be symmetrical in that the R substituent(s) on X and the R substituent(s) on Y matching each other.

Optionally, X and Y are not symmetrical with each of X and Y including one or more different substituents on each of X and Y.

It can be particularly desirable for at least one R substituent on X and/or at least one R substituent on Y to comprise a substituted or unsubstituted benzophenone group, a substituted or unsubstituted benzil group, a substituted or unsubstituted thioxanthone group, a substituted or unsubstituted acenaphthylene-1,2-dione group, a substituted or unsubstituted thiochroman-4-one group, a substituted or unsubstituted 9-fluorenone group, a substituted or unsubstituted anthraquinone group, a substituted or unsubstituted benzanthrone group, a substituted or unsubstituted 9,10-phenanthrenequinone group, a substituted or unsubstituted xanthone group, a substituted 1,2-indanedione group, a substituted or unsubstituted chromone group, a substituted or unsubstituted 1,4-naphthoquinone group, and the like.

In accordance with another aspect of the present invention, there is provided a photohardenable composition comprising a photohardenable resin component and a photoswitchable photoinitiator comprising a P-type photochromic molecule, preferably comprising a P-type diarylethene molecule, which molecule includes one or more substituents, wherein at least one substituent comprises a substituted or unsubstituted diarylketone group, a substituted or unsubstituted alpha-diketone group, or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings, wherein the P-type photochromic molecule is activatable by light having a first wavelength ($\lambda 1$) and light having a second wavelength ($\lambda 2$) to induce a crosslinking or polymerization reaction in the photohardenable composition at the intersection of the first and second wavelengths, wherein the first wavelength is shorter than the second wavelength.

Preferred photohardenable compositions comprise a photohardenable resin component and a photoswitchable photoinitiator comprising a P-type diarylethene molecule represented by general formula (I) as described herein. The photohardenable composition can further preferably include a sensitizer. It can be desirable for the photohardenable composition to exhibit non-Newtonian rheological behavior.

Photohardenable compositions in accordance with the present invention are particularly desirable for use in volumetric 3D printing for forming an object in a volume of photohardenable composition.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

The foregoing, and other aspects and embodiments described herein and contemplated by this disclosure all constitute embodiments of the present invention.

It is to be understood that both the foregoing general description and the following detailed description are exemplary and explanatory only and are not restrictive of the invention as claimed.

Other embodiments will be apparent to those skilled in the art from consideration of the description, from the claims, and from practice of the invention disclosed herein.

BRIEF DESCRIPTION OF THE DRAWINGS

In the Drawings,

FIGS. 1A, 1B, and 1C illustrate photographs of front, back, and side views of a part printed generally in accordance with the procedure set forth in this Example 5; FIGS. 1D, 1E, and 1F illustrate corresponding front, back, and side views of the 3D model to be printed.

FIGS. 2A, 2B, and 2C illustrate photographs of front, back, and side views of a part printed generally in accordance with the procedure set forth in this Example 6; FIGS. 2D, 2E, and 2F illustrate corresponding front, back, and side views of the 3D model to be printed.

FIGS. 3A, 3B, and 3C illustrate photographs of front, back, and side views of a part printed generally in accordance with the procedure set forth in this Example 7; FIGS. 3D, 3E, and 3F illustrate corresponding front, back, and side views of the 3D model to be printed.

The attached figures are simplified representations presented for purposes of illustration only; the actual structures may differ in numerous respects, particularly including the relative scale of the articles depicted and aspects thereof.

For a better understanding of the present invention, together with other advantages and capabilities thereof, reference is made to the following disclosure and appended claims in connection with the above-described drawings.

DETAILED DESCRIPTION OF THE INVENTION

Various aspects and embodiments of the present inventions will be further described in the following detailed description.

The present invention includes methods for forming an object in a volume of a photohardenable composition comprising a photohardenable resin component and photoswitchable photoinitiator including a P-type photochromic molecule. The present invention also includes a photoswitchable photoinitiator comprising a P-type diarylethene molecule represented by formulae described herein, and photohardenable compositions and methods including a photoswitchable photoinitiator of the invention.

A schematic representation of the ring closure and photoreversion of a P-type photochromic molecule comprising a diarylethene (A') is provided in Equation 1 (Eq1)

(Eq1)

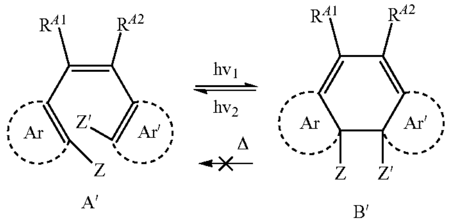

Upon exposure to light of a first wavelength, a P-type photochromic molecule A' undergoes a 6π electrocyclic ring closing reaction upon exposure to light of a first wavelength (typically in the UV range) to afford B'. The reaction can readily be reversed by exposure of light of a longer wavelength (photo-reversion). However, compounds B' do not readily undergo thermal reversion to the open ring form (A'). (While the example shown in Eq1 shows $R^{A1}$ and $R^{A2}$ as substituents, alternatively, $R^{A1}$ and $R^{A2}$ may comprise atoms in a ring structure linking the two groups together (not shown.))

P-type photochromic molecules generally exhibit minimal or no thermal reversibility on time scales for typical 3D volumetric printing. Such typical time scales can generally be less than an hour.

While thermal back reaction of a dual color photoinitiators has been reported as a necessity for the use thereof in volumetric printing, it has surprisingly been found that a P-type photochromic molecule is effective and advantageous for use as a photoswitchable photoinitiator in volumetric printing.

In accordance with one aspect of the present invention, there is provided a method of forming an object in a volume of a photohardenable composition, the method comprising:

(a) providing the volume including the photohardenable composition, the photohardenable composition comprising a photohardenable resin component and a photoswitchable photoinitiator comprising a substituted or unsubstituted P-type photochromic molecule, (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations to induce a crosslinking or polymerization reaction in the photohardenable composition at the intersection of the first and second wavelengths at the one or more selected locations within the volume to at least partially form the object; and (c) optionally repeating step (b), irradiating the photohardenable composition at one or more selected locations that are the same as or different from one or more previous selected locations in the volume until the object is partially or fully formed.

A preferred method of forming an object in a volume of a photohardenable composition in accordance with the present invention comprises:

(a) providing the volume including the photohardenable composition, the photohardenable composition comprising a photohardenable resin component and a photoswitchable photoinitiator comprising a P-type photochromic molecule, (b) projecting an optical image generated with the second excitation light along a projection axis to a selected location in the volume, wherein the optical image is oriented perpendicular to the projection axis;

(c) generating a light sheet including the first excitation light and directing the light sheet along a light sheet illumination axis through the volume such that the optical image and the light sheet intersect at the selected location in a common plane, and wherein the light sheet overlaps the projected optical image in the volume at the selected location; and (d) optionally repeating steps (b) and (c) one or more times to partially or fully form the object, wherein for a repeated set of steps (b) and (c), the selected location is the same as or different from a previous selected location and the optical image is the same as or different from a previous optical image.

Preferably the intersection of the light sheet and optical image in the common plane is coplanar or substantially coplanar.

Methods in accordance with the present invention preferably further comprise separating the partially or fully formed object from the photohardenable composition.

Preferred photoswitchable photoinitiators for inclusion in the methods of the invention comprise a substituted or unsubstituted P-type photochromic molecule, preferably comprising a P-type diarylethene molecule, wherein the P-type photochromic molecule is activatable by light having a first wavelength ($\lambda_1$) and light having a second wavelength ($\lambda 2$) to induce a crosslinking or polymerization reaction in the photohardenable composition at the intersection of the first and second wavelengths, wherein the first wavelength is shorter than the second wavelength.

More preferred photoswitchable photoinitiators for inclusion in the methods of the invention include a P-type photochromic molecule, preferably comprising a P-type diarylethene molecule, which molecule includes one or more substituents at least one of which comprises a carbonyl group, wherein the P-type photochromic molecule is activatable by light having a first wavelength ($\lambda_1$) and light having a second wavelength ($\lambda 2$) to induce a crosslinking or polymerization reaction in the photohardenable composition at the intersection of the first and second wavelengths, wherein the first wavelength is shorter than the second wavelength. Preferably the at least one substituent comprising the carbonyl group is attached to the P-type diarylethene molecule. A substituent including a carbonyl group can optionally further include one or more additional substituents or moieties in addition to a C═O moiety.

A P-type diarylethene molecule to which the at least one substituent comprising the carbonyl group is attached can preferably comprise a P-type diarylcycloalkene or diarylcycloheteroalkene molecule. An example of a preferred P-type diarylcyclopentene or diarylcycloalkene molecule includes, but is not limited to, a P-type dithienylcyclopentene molecule. It can be desirable for one or both of the two thienyl groups and/or the cyclopentene ring to which the thienyl groups are attached to include one or more substituents in addition to the at least one substituent comprising the carbonyl group.

Examples of substituent groups comprising a carbonyl group include, but are not limited to, substituent groups comprising a substituted or unsubstituted benzoyl group, a substituted or unsubstituted thioxanthone group, a substituted or unsubstituted diarylketone group (e.g., but not limited to, a substituted or unsubstituted benzophenone group, and the like), a substituted or unsubstituted alpha-diketone (e.g., but not limited to, a substituted or unsubstituted benzil group, and the like), a polycyclic group including at least two fused rings of atoms, wherein at least one of the fused rings of atoms includes one or more substituents, wherein at least one of the substituents comprises a double bonded oxygen attached to a carbon atom ring member included in one of the fused rings (e.g., but not limited to, acenaphthylene-1,2-dione group, a polycyclic group including at least two fused rings of atoms comprises a thiochroman-4-one group a 9-fluorenone group, an anthraquinone group, a benzanthrone group, a 9,10-phenanthrenequinone group, and the like, and derivatives thereof).

Additional examples of substituent groups comprising a carbonyl group include, but are not limited to, a substituted or unsubstituted thioxanthone group, a substituted or unsubstituted diarylketone group (e.g., but not limited to, a substituted or unsubstituted benzophenone group, and the like), a substituted or unsubstituted alpha-diketone (e.g., but not limited to, a substituted or unsubstituted benzil group, and the like), a substituted or unsubstituted alpha-diketone (e.g., but not limited to, a substituted or unsubstituted benzil group, and the like), a polycyclic group including at least two fused rings of atoms, wherein at least one of the fused rings of atoms includes one or more substituents, wherein at least one of the substituents comprises a double bonded oxygen attached to a carbon atom ring member included in one of the fused rings (e.g., but not limited to, acenaphthylene-1,2-dione group, a polycyclic group including at least two fused rings of atoms comprises a thiochroman-4-one group a 9-fluorenone group, an anthraquinone group, a benzanthrone group, a 9,10-phenanthrenequinone group, and the like, and derivatives thereof).

Examples of photoswitchable photoinitiators preferred for inclusion in the methods of the invention include photoswitchable photoinitiators in accordance with another aspect of the present invention, described below, including, but not limited to, photoswitchable photoinitiators represented by any of formula (I), including, but not limited to, those represented by any of formula (III) through (XIII) and (XV) through (XXX) below and derivatives thereof. (The photoswitchable photoinitiator represented by formula (XIV) that was prepared demonstrated no coloration.)

A substituent comprising the carbonyl group (C═O) can be a substituent attached to the P-type photochromic molecule by a bond. Alternatively, the carbonyl group can be indirectly attached to the ring, e.g., attached to another substituent or moiety that is attached to the ring.

Photohardenable compositions preferred for inclusion in methods of the invention include photohardenable compositions described herein.

In methods described herein, a volume of the photohardenable composition is preferably included within a container wherein at least one or more portions of the container are optically transparent so that the photohardenable composition is accessible by light used to irradiate the photohardenable composition. It can be desirable for the optically transparent portions of the container to also be optically flat.

Examples of first and second wavelength ranges for use in methods described herein include a first wavelength in a range from 300 nm to about 550 nm, for example, but not limited to, from about 350 to about 460 nm, from about 350 to about 455 nm, from about 350 nm to about 445 nm, from about 350 nm to about 410 nm, from about 375 nm to about 455 nm, from about 375 nm to about 445 nm, from about 375 nm to about 410 nm, and from about 375 nm to about 405 nm, and a second wavelength in a range from about 450 nm to about 1000 nm, for example, but not limited to, from about 450 nm to about 850 nm most typically, from about 450 nm to about 700 nm.

Examples of power densities for the first wavelength light include power densities in a range from about 0.01 to about 100,000 $W/cm^2$. Examples of power densities for the second wavelength light include power densities in a range from about 0.01 to about 100,000 $W/cm^2$.

Examples of exposure energies for the first wavelength light include exposure energies in a range from about 0.001 to about 1,000 $mJ/cm^2$. Examples of exposure energies for the second wavelength light include exposure energies in a range from about 0.01 to about 100,000 $mJ/cm^2$.

Methods in accordance with the present invention preferably include a photohardenable composition that demonstrate non-Newtonian rheological behavior. A photohardenable composition including a photohardenable resin component and P-type photochromic molecule that demonstrates non-Newtonian rheological behavior can facilitate forming an object, preferably a three-dimensional object, that is fully suspended in the volume of the photohardenable composition during formation. The ability to have the object fully suspended in the volume during formation advantageously eliminates the need to include support structures of the type used in stereolithography to maintain the geometry/shape of the object during formation (which is sometimes referred to as printing or 3D printing).

For use in forming objects, e.g., three-dimensional objects, it is desired that photohardenable compositions do not harden (e.g., the photohardenable resin component does not undergo polymerization or cross-linking) upon exposure of the photohardenable composition to only the first wavelength or only the second wavelength. In other words, hardening of the photohardenable composition in the volume which is not simultaneously or nearly simultaneously (e.g., due to the closely timed sequential exposure) exposed to both radiations do not polymerize. In particular, in scanning a volume of the photohardenable media, as a results of beams passing through previously exposed areas or planes, there will be numerous points in the volume which are sequentially scanned in any order with the first wavelength radiation and the second wavelength radiation as the structure of the object is defined in the volume of the medium by the intersection of the beams. Some points may also experience multiple exposures to the first wavelength light and/or second wavelength light. Preferably points receiving such multiple sequential (non-simultaneous) exposures do not polymerize.

Preferably the amount of time during which one or more selected locations within the volume are simultaneously or sequentially exposed to the first wavelength light and the second wavelength light is sufficient to induce hardening of the photohardenable composition at the one or more selected locations and is insufficient to cause hardening of the photohardenable composition when only one of the first and second wavelengths is present.

Preferably light of the first and light of the second wavelengths are directed into the volume as separate optical projections.

Preferably the direction of the projection of light of the first wavelength is orthogonal to the direction of the projection of the light of the second wavelength.

Preferably the projection of light of the first wavelength comprises a light sheet. The light sheet can desirably comprise a planar configuration of light with opposed major faces with the major faces being parallel to direction in which the light sheet is directed into the volume.

Preferably the projection of light of the second wavelength comprises an optical image that is perpendicular to the direction in which the optical image is projected into the volume. A digital micromirror device (DMD) is preferably utilized in the projection of the optical image.

Preferably the light sheet and optical image intersect in a common plane. It is desirable for the intersection of the light sheet and optical image to be coplanar or substantially coplanar.

An optical image can include any optical projection generated by an optical projection system. Examples of optical images include, without limitation, a patterned or unpatterned two-dimensional image, a line of light, or a single point of light. A two-dimensional image can comprise a cross-sectional plane of the three-dimensional image being printed. A two-dimensional image can represent a cross-sectional slice of an object to be printed. Such cross-sectional slice is typically generated using slicing software, as discussed elsewhere herein.

Examples of light sources of the excitation light that may be suitable for use in methods described herein include, by way of example and non-limitation, lasers, laser diodes, light emitting diodes, light-emitting diodes (LEDs), micro-LED arrays, vertical cavity lasers (VCLs), and filtered lamps. Such light sources are commercially available and selection of a suitable light source can be readily made by one of ordinary skill in the relevant art. LEDs of the type such as Pathlight LEDs available from Luminous may be useful with DMDs, Laser light sources can be preferred. Other suitable light sources may also be useful.

Optionally, the excitation light can be temporally and/or spatially modulated. Optionally, the intensity of the excitation light can be modulated.

Examples of projection devices for use in the methods described herein may include, but are not limited to, a laser projection system, a liquid crystal display (also referred to herein as "LCD"), a spatial light modulator (also referred to herein as "SLM") (for example, but not limited to, a digital micromirror device (also referred to herein as "DMD")), a micro-LED array, a vertical cavity laser array (also referred to herein as "VCL"), a Vertical Cavity Surface Emitting Laser array (also referred to herein as "VCSEL"), a liquid crystal on silicon (also referred to herein as "LCoS") projector, and a scanning laser system. (Light emitting diode is also referred to herein as "LED").

Preferred projection devices include digital light processors, e.g., SLMs and DMD, with a DMD being more preferred.

Preferably the projection device is illuminated with a laser.

An optical image projection system can optionally further include one or more optical components (e.g., projection optics, illumination optics, lenses, lens systems, mirrors, prisms, etc.) An optical image projection system can optionally further include one or more light sources as part of the projection system or external to the projection system for illuminating the projection device. Use of external light sources can facilitate the flexibility of being able to readily change light sources with light sources for generating different wavelengths and/or light sources different power capabilities.

Other information that may be useful in connection with one or more aspects and/or embodiments of the present invention includes International Application No. PCT/US2022/039766 of Quadratic 3D, Inc. filed Aug. 9, 2022, International Patent Application No. PCT/US2022,052157, filed Dec. 7, 2022, of Quadratic 3D, Inc., U.S. Provisional Patent Application No. 63/341,594 filed on May 13, 2022, U.S. Provisional Patent Application No. 63/438,280 filed on Jan. 11, 2023, U.S. Provisional Patent Application No. 63/440,085 filed Jan. 19, 2023, and U.S. Provisional Patent Application No. 63/450,931 filed Mar. 8, 2023, each of the foregoing applications being hereby incorporated herein by reference in its entirety.

Optionally, the excitation light can be temporally and/or spatially modulated. Optionally, the intensity of the excitation light can be modulated. Optionally, source drive modulation can be used to adjust the absolute power of the light beam.

Spatially modulated excitation light can be created by known spatial modulation techniques, including, for example, a liquid crystal display (LCD), a digital micromirror device (DMD), or a microLED array. Other known spatial modulation techniques can be readily identified by those of ordinary skill in the relevant art.

A light sheet generating system and/or an optical image projection system, if applicable, can be configured to apply continuous excitation light. Such systems can be configured to apply intermittent excitation light. Intermittent excitation can include random on and off application of light or periodic application of light. Examples of periodic application of light includes pulsing. Such systems can be configured to apply a combination of both continuous excitation light and intermittent light, including, for example, an irradiation step that includes the application of intermittent excitation light that is preceded or followed by irradiation with continuous light. Intermittent light may facilitate use of a higher instantaneous light intensity to increase printing speed.

As discussed above, in addition to a projection device, a projection system can further include additional components including, but not limited to, projection optics, and one or more translational stages for moving the system or components thereof.

The methods of the invention described herein can further include post-processing. Examples of post-processing steps that may be further included in a method in accordance with the invention include, but are not limited to, one or more of the following: separation of the at least partially hardened composition from the unhardened composition, washing, post-curing (e.g., by light, heat, ionizing radiation, pressure, or simultaneous or sequential combinations of techniques), metrology, freeze-dry processing, critical point drying, and packaging.

In methods in accordance with the invention for forming a three-dimensional object, it is desirable to select a photoswitchable photoinitiator molecule for which the wavelength of first excitation has significant absorption for the first form, and where the second form of the photoinitiator has minimal absorption of the first excitation wavelength. This has two advantages, first, it simplifies exposure in that activation of the photoswitchable photoinitiator can occur without activating the second form thereof to induce a crosslinking or polymerization reaction in the photohardenable resin component. When there is substantial overlap, the intensity of the two radiations must be carefully controlled so as to activate the photoswitchable photoinitiator molecule while minimally activating the second form thereof. Second, it can permit deeper penetration of the volume or layer of the composition as the conversion of the photoswitchable photoinitiator to the second form thereof has the effect of "bleaching" the photoswitchable photoinitiator molecule or making it transparent with respect to the first wavelength radiation.

A photoswitchable photoinitiator for inclusion in methods and photohardenable compositions described herein will preferably absorb first wavelength light in a range from about 300 nm to about 550 nm. Other examples of ranges in which the photoswitchable photoinitiator will absorb first wavelength light include, but are not limited to, from about 350 to about 460 nm, from about 350 to about 455 nm, from about 350 nm to about 445 nm, from about 350 nm to about 410 nm, from about 375 to about 455 nm, from about 375 to about 445 nm, from about 375 nm to about 405 nm. Depending upon the extinction coefficient for the particular photoswitchable photoinitiator, the conversion to the second form can be induced by exposure to any source which emits in this range, e.g., lasers, light emitting diodes, mercury lamps. Filters may be used to limit the output wavelengths. A non-limiting example of filtered light includes filtered emission from a mercury arc lamp, etc. Lasers can be preferred sources of radiation for generating radiation of the first wavelength.

The second form of the photoswitchable photoinitiator will preferably absorb in a range of about 450 to 1000 nm and 450 to 850 nm most typically. Other examples of ranges in which the second form of the photoswitchable photoinitiator will preferably absorb include 450 to about 700 nm. This form can be activated by the second excitation light to produce free radicals directly or to produce excitons which undergo electron transfer or hydrogen abstraction (optionally via electron, hydrogen, or energy transfer to co-initiator(s) in aspects of the invention including one or more co-initiator) by exposure to any second wavelength within this range. For the second excitation, exposures may be accomplished using a laser source, an LED or LED array, the filtered emission from an arc lamp, or other suitable source with emission within the desired wavelength range. Argon ion, He—Ne, laser diodes, krypton, frequency-multiplied Nd-YAG etc. Other light sources may be used, optionally with filters to limit output wavelengths, e.g., light emitting diodes, incandescent lamps, halogen lamps, mercury lamps, arc lamps, etc.

Optionally, a photohardenable composition included in a method in accordance with the invention can further include a light activated photoinitiator that is preferably not appreciably responsive to light of a first wavelength or second wavelength. Inclusion of such light activated photoinitiator can be desirable in connection with an optional post-curing step to be carried out with UV light after printing in any post-processing of the printed object. If a photoinitiator is included in a photohardenable resin for post-curing purposes, the method can further include a post curing step comprising exposing the object to light of a third wavelength to further harden the object, the third wavelength being different from the first and second wavelengths. When the photoinitiator is UV activatable, the third wavelength is preferable in the ultraviolet range of wavelengths.

Separation of the at least partially hardened object from the unhardened composition may be conducted by a number of means known in the art, e.g., gravity draining, sieving, air blade, centrifugation, vibration, or ultrasonic agitation.

Preferably the at least partially hardened objects are washed after separation.

Washing may be carried out with any suitable organic or aqueous wash liquid, or combination thereof, including solutions, suspensions, emulsions, microemulsions, etc. Examples of suitable wash liquids include, but are not limited to water, alcohols (e.g., methanol, ethanol, isopropanol, etc.), glycol ethers, benzene, toluene, etc. Wash liquids including a mixture of two or more liquids (e.g., water and an alcohol (e.g., isopropanol) may also be suitable. Such wash solutions may optionally contain additional constituents such as surfactants, etc.

The methods in accordance with various aspects of the invention can further include post-treatment of the three-dimensional object(s) formed.

In addition to washing, examples of other post-treatments include, but are not limited to, post-curing (e.g., by light, e-beam, heat, non-ionizing radiation, ionizing radiation, time (aging), pressure, humidity, or simultaneous or sequential combinations of techniques), metrology, labelling or tracking (e.g., by barcode, QR code, or RFID tag), freeze-dry processing, critical point drying, and packaging.

In methods described herein that include light sheets, light sheets can be constructed by means known in the art including, for example, but not limited to, techniques including a laser and a Powell lens, galvanometer, and/or polygon scanning mirror. Alternatively, one or more LEDs can be used as a light source.

Optionally, a method described herein can further include use an additional different wavelength to force the reverse reaction of the second form of the photoswitchable photoinitiator back to the original/starting form to help avoid hardening of unwanted areas.

As used herein first wavelength, second wavelength, or other additional wavelength can refer to a range of wavelengths.

In methods described herein, the first wavelength and second wavelength are preferably generated by different light sources or optical projection systems.

As mentioned above, methods in accordance with the invention preferably include providing a volume of a photohardenable composition described herein that is included within a container wherein at least a portion of the container is optically transparent so that the photohardenable composition is accessible by excitation light. Optionally, the entire container is optically transparent.

Optically transparent portions of a container can be constructed from a material comprising, for example, but not limited to, glass, quartz, fluoropolymers (e.g., Teflon FEP, Teflon AF, Teflon PFA), cyclic olefin copolymers, polymethyl methacrylate (PMMA), polynorbornene, sapphire, or transparent ceramic.

Examples of container shapes include, but are not limited to, a cylindrical container having a circular or oval cross-section, a container having straight sides with a polygonal cross-section or a rectangular or square cross-section.

As mentioned above, it can be desirable for optically transparent portion(s) of the container to also be optically flat.

Optionally, one or more filters can be added to at least a surface of any optically transparent portions of the container to block undesired light, e.g., room light, to prevent unintentional curing.

Optionally the photohardenable composition is filtered to remove particulates before introduction into the container. Optionally bubbles are removed from the photohardenable composition before or after being introduced into the container. Optionally the photohardenable composition is degassed, purged or sparged with an inert gas before or after being introduced into the container. Optionally the photohardenable composition is maintained under inert conditions, e.g., under an inert atmosphere, during printing. This can prevent introduction of oxygen into the container while the object is being printed or formed.

In the methods described herein, the container may be rotated to provide additional angles of illumination or projection of excitation light into the volume of photohardenable composition contained therein. This can be of assistance in patterning object volumes or surfaces more accurately or it can be used as a means of providing multiple exposure of a given feature from different angles.

In the methods described herein, the container may be stationary while a beam or optical projection of excitation light is being directed into the photohardenable composition.

The methods disclosed herein can also include the use of commercially available optical projection and filtering techniques or systems that employ two or more optical projection methods at once.

The methods described herein are typically used in combination with a computer and software. For example, light sheet generating systems, optical image projection systems and projection devices that may be included therein, that can be included in the methods described herein may be used in combination with a computer and software. Software can be used to coordinate generation of optical projections (e.g., point illuminations, line illuminations, a two-dimensional pattern, or a light sheet) from their respective optical projection system or projection devices at each position along the projection direction of each so that the part is developed plane by plane. The planar face of an optical image projected is preferably orthogonal to its projection direction into photohardenable composition. When two optical projections are projected into the volume of the photohardenable composition, the projection directions of the two projections are preferably orthogonal to each other. Selection of computer controls and software is within the skill of the person of ordinary skill in the relevant art. Other components can also optionally be included or used with the system.

Methods in accordance with the present invention advantageously further do not require adhering the object being printed to a fixed substrate (e.g., build plate) at the beginning of the printing process avoiding a post-processing step of separating the printed object from the fixed substrate.

Methods described herein are particularly useful for forming or "printing" three-dimensional objects.

Before printing, a digital file of the object to be printed is obtained. If the digital file is not of a format that can be used to print the object, the digital file is then converted to a format that can be used to print the object. An example of a typical format that can be used for printing includes, but is not limited to, an STL file. Typically, the STL file is then sliced into two-dimensional layers with use of three-dimensional slicer software and converted into G-Code or a set of machine commands, which facilitates building the object. See B. Redwood, et al., "The 3D Printing Handbook-Technologies, designs applications", 3D HUBS B.V. 2018.

The excitation light can be directed into the volume of photohardenable composition in a continuous or intermittent manner. Intermittent excitation can include random on and off application of light or periodic application of light. Examples of periodic application of light includes pulsing. Excitation can alternatively be applied as a combination of both continuous excitation light and intermittent light, including, for example, the application of intermittent excitation light that is preceded or followed by irradiation with continuous light.

Other information concerning optical systems that may useful in connection with the various aspects of the present inventions includes Texas Instruments Application Report DLPA022-July 2010 entitled "DLP™ System Optics"; Texas Instruments "TI DL® Technology for 3D Printing-Design scalable high-speed stereolithography [sic] systems using TI DLP technology" 2016; Texas Instruments "DLP6500 0.65 1018p MVSP Type A DMD", DLP6500, DLPS040A-October 2014-Revised October 2016; and Y H Lee, et al., "Fabrication of Periodic 3D Nanostructuration for Optical Surfaces by Holographic Two-Photon-Polymerization", Int'l Journal of Information and Electronics Engineering, Vol 6, No. 3, May 2016, each of the foregoing being hereby incorporated herein by reference in its entirety.

In accordance with another aspect of the present invention, there is provided a photoswitchable photoinitiator comprising a P-type photochromic molecule, which molecule includes one or more substituents, wherein at least one substituent comprises a substituted or unsubstituted diarylketone group, a substituted or unsubstituted alpha-diketone group, or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings, wherein the P-type photochromic molecule is activatable by light having a first wavelength ($\lambda_1$) and light having a second wavelength ($\lambda$2) to induce a crosslinking or polymerization reaction in a photohardenable composition at the intersection of the first and second wavelengths, wherein the first wavelength is shorter than the second wavelength.

A substituent comprising the carbonyl group can be a substituent attached to the P-type photochromic molecule by a bond. Alternatively, the carbonyl group can be indirectly attached to the ring.

It can be desirable for a photoswitchable photoinitiator to comprise a P-type photochromic molecule, preferably comprising a P-type diarylethene molecule, which molecule includes one or more substituents, wherein at least one substituent is a substituted or unsubstituted diarylketone group, a substituted or unsubstituted alpha-diketone group, or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings, wherein the P-type photochromic molecule is activatable by light having a first wavelength ($\lambda_1$) and light having a second wavelength ($\lambda$2) to induce a crosslinking or polymerization reaction in the photohardenable composition at the intersection of the first and second wavelengths, wherein the first wavelength is shorter than the second wavelength.

Photoswitchable photoinitiators in accordance with the invention preferably include a P-type photochromic molecule.

Nonlimiting examples of preferred photoswitchable photoinitiators include photoswitchable photoinitiators comprising a diarylcycloalkene molecule represented by general formula (I):

(I)

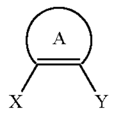

wherein:

A represents a substituted or unsubstituted cycloalkene ring structure,

X represents a heteroaryl group represented by following formula ($X_a$), ($X_b$), ($X_c$), or ($X_a$):

($X_a$)

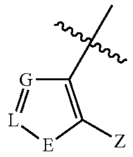

wherein:

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, a sulfur atom with an $R^7$ substituent group ($SR^7$), an oxygen atom with an $R^8$ substituent group ($OR^8$), or a cyano (CN) group, G is a member of the ring and represents a carbon atom with an $R^9$ substituent group ($CR^9$) or a nitrogen atom (N);

L is a member of the ring and represents a carbon atom with an $R^1$ substituent group ($C\ R^1$) or a nitrogen atom (N), and $R^1$, and $R^6$—$R^9$, are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or ($X_b$)

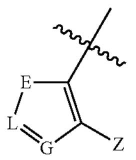

wherein:

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, a sulfur atom with an $R^7$ substituent group ($SR^7$), an oxygen atom with an $R^8$ substituent group ($OR^8$), or a cyano (CN) group, G is a member of the ring and represents a carbon atom with an R substituent group ($CR^9$) or a nitrogen atom (N);

L is a member of the ring and represents a carbon atom with an $R^1$ substituent group (C $R^1$) or a nitrogen atom (N), and $R^1$ and $R^6$—$R^9$—are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or ($X_c$)

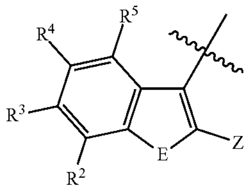

wherein:

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, a sulfur atom with an $R^7$ substituent group ($SR^7$), an oxygen atom with an $R^8$ substituent group ($OR^8$), or a cyano (CN) group, and $R^2$—$R^8$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or ($X_d$)

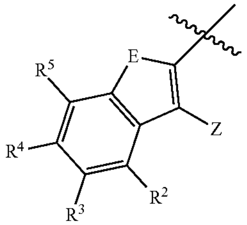

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, an $SR^7$ group, an $OR^8$ group, or a cyano (CN) group, and $R^2$—$R^8$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group;

Y represents a heteroaryl group represented by formula ($Y_a$), ($Y_b$), ($Y_c$) or ($Y_a$):

($Y_a$)

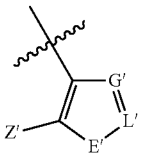

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z' represents a substituted or unsubstituted alkyl group, a substituted or unsubstituted aryl group, a substituted or unsubstituted alkynyl group, a sulfur atom with an $R^{16}$ substituent group ($SR^{16}$), an oxygen atom with an $R^{17}$ substituent group ($OR^{17}$), or a cyano (CN) group, G' is a member of the ring and represents a carbon atom with an $R^{18}$ substituent group, ($CR^{18}$) or a nitrogen atom (N);

L' is a member of the ring and represents a carbon atom with an $R^{10}$ substituent group (C $R^{10}$) or a nitrogen atom (N), and $R^{10}$ and $R^{15}$—$R^{18}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or ($Y_b$)

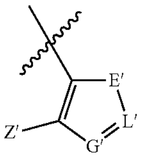

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z represents a substituted or unsubstituted alkyl group, a substituted or unsubstituted aryl group, a substituted or unsubstituted alkynyl group, a sulfur atom with an $R^{16}$ substituent group ($SR^{16}$), an oxygen atom with an $R^{17}$ substituent group ($OR^{17}$), or a cyano (CN) group, G' is a member of the ring and represents a carbon atom with an $R^{18}$ substituent group ($CR^{18}$) or a nitrogen atom (N);

L' is a member of the ring and represents a carbon atom with an $R^{10}$ substituent group (C $R^{10}$) or a nitrogen atom (N), and and $R^{10}$ and $R^{15}$—$R^{18}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or (Y$_c$)

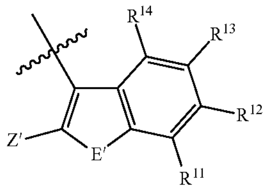

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z' represents a substituted or unsubstituted alkyl group, a substituted or unsubstituted aryl group, a substituted or unsubstituted alkynyl group, an $SR^{16}$ group, an $OR^{17}$ group, or a cyano (CN) group, and $R^{11}$_$R^{17}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group; or (Y$_d$)

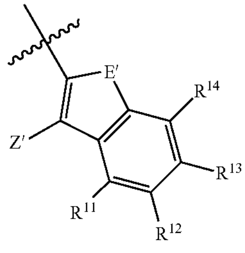

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z' represents a substituted or unsubstituted alkyl group, a substituted or unsubstituted aryl group, a substituted or unsubstituted alkynyl group, a sulfur atom with an $R^{16}$ substituent group ($SR^{16}$), an oxygen atom with an $R^{17}$ substituent group ($OR^{17}$), or a cyano (CN) group, and $R^{11}$—$R^{17}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group;

wherein at least one of X and Y includes at least one R substituent comprising a substituted or unsubstituted diarylketone group, a substituted or unsubstituted alpha-diketone group, or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings; and wherein the P-type photochromic molecule is activatable by light having a first wavelength ($\lambda_1$) and light having a second wavelength (λ2) to induce a crosslinking or polymerization reaction in a photohardenable composition at the intersection of the first and second wavelengths, wherein the first wavelength is shorter than the second wavelength.

Optionally R groups on any two adjacent ring members of X and/or Y may comprise atoms for completing a ring structure linking the two adjacent groups together. Such ring structure can be substituted or unsubstituted and may optionally be part of a polycyclic substituted or unsubstituted ring structure. Such ring structure or, if applicable, a polycyclic structure of which it is a part can optionally include one or more heteroatoms in addition to carbon in the ring structure.

Preferred examples include those wherein at least one R substituent on X and/or Y comprises a substituted or unsubstituted benzophenone group, a substituted or unsubstituted benzil group, a substituted or unsubstituted thioxanthone group, a substituted or unsubstituted acenaphthylene-1,2-dione group, a substituted or unsubstituted thiochroman-4- one group, a substituted or unsubstituted 9-fluorenone group, a substituted or unsubstituted anthraquinone group, a substituted or unsubstituted benzanthrone group, a substituted or unsubstituted 9,10-phenanthrenequinone group, a substituted or unsubstituted xanthone group, a substituted 1,2-indanedione group, a substituted or unsubstituted chromone group, a substituted or unsubstituted 1,4-naphthoquinone group, and the like. Additional preferred examples include those wherein at least one of $R^1$—$R^{18}$, and most preferably at least one of $R^1$—$R^6$, represents a substituted or unsubstituted benzophenone group, a substituted or unsubstituted benzil group, a substituted or unsubstituted thioxanthone group, a substituted or unsubstituted acenaphthylene-1,2-dione group, a substituted or unsubstituted thiochroman-4-one group, a substituted or unsubstituted 9-fluorenone group, a substituted or unsubstituted anthraquinone group, a substituted or unsubstituted benzanthrone group, a substituted or unsubstituted 9,10-phenanthrenequinone group, a substituted or unsubstituted xanthone group, a substituted 1,2-indanedione group, a substituted or unsubstituted chromone group, a substituted or unsubstituted 1,4-naphthoquinone group, and the like.

It can be desirable for each of X and Y to include at least one substituent comprising a substituted or unsubstituted diarylketone group, a substituted or unsubstituted alpha-diketone group, or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings. In such case, such substituent on X and Y can be the same or different. For example, it can be desirable for at least one R substituent on X and at least one R substituent on Y to comprise a substituted or unsubstituted diarylketone group, a substituted or unsubstituted alpha-diketone group, or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings.

Optionally, X and Y can be symmetrical in that any R substituent(s) on X and any R substituent(s) on Y match each other.

Optionally, X and Y are not symmetrical with each of X and Y including one or more different R substituents on each of X and Y.

It can be desirable for at least one R substituent on X and/or at least one of R substituent on Y to comprise a substituted or unsubstituted benzophenone group, a substituted or unsubstituted benzil group, a substituted or unsubstituted thioxanthone group, a substituted or unsubstituted acenaphthylene-1,2-dione group, a substituted or unsubstituted thiochroman-4-one group, a substituted or unsubstituted 9-fluorenone group, a substituted or unsubstituted anthraquinone group, a substituted or unsubstituted benzanthrone group, a substituted or unsubstituted 9,10-phenanthrenequinone group, a substituted or unsubstituted xanthone group, a substituted 1,2-indanedione group, a substituted or unsubstituted chromone group, a substituted or unsubstituted 1,4-naphthoquinone group, and the like.

In general formula (I), E in X and E' in Y can optionally independently be the same or different.

In general formula (I), G in X and G' in Y can optionally independently be the same or different.

In general formula (I), Z in X and Z' in Y can optionally independently be the same or different.

In general formula (I), L in X and L' in Y can optionally independently be the same or different.

Optionally X and Y can be the same or different.

Examples of preferred substituted or unsubstituted diarylketone groups include those represented by general formula (DAK):

(DAK)

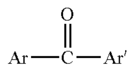

wherein Ar and Ar' are the same or different and independently comprise a substituted or unsubstituted aryl group or a substituted or unsubstituted heteroaryl group.

Examples of substituted or unsubstituted aryl groups for inclusion in general formula (DAK) as Ar and/or Ar' include, but are not limited to, a substituted or unsubstituted substituent or functional group derived from an aromatic ring including but not limited to a benzene ring, a naphthalene ring, anthracene ring, indene ring, fluorene ring and others.

Examples of substituted or unsubstituted heteroaryl groups for inclusion in general formula (DAK) as Ar or Ar' include, but are not limited to, a substituted or unsubstituted substituent or functional group derived from a heteroaryl ring including but not limited to a furan ring, thiophene ring, pyrrole ring, oxazole ring, isooxazole ring, thiazole ring, isothiazole ring, imidazole ring, pyrazole ring, pyrane ring, pyridine ring, pyrazine ring, indole ring, quinoline ring, isoquinoline ring, xanthene ring, carbazole ring, acridine ring, indoline ring, julolidine ring and others.

Examples of substituents that can be substituted for a hydrogen atom attached to an aryl group or heteroaryl group in a substituted aryl or heteroaryl group include, but are not limited to, halogen atoms, alkyl, alkoxy, alkylamino, dialkylamino, alkylthio, heterocyclic groups, more specifically, methyl, ethyl, isopropyl, tert-butyl, phenyl, trifluoromethyl, cyano, acetyl, ethoxycarbonyl, carboxyl, carboxylate, amino, methylamino, dimethylamino, ethylamino, diethylamino, isopropylamino, diisopropylamino, cyclohexylamino, dicyclohexylamino, acetylamino, piperidino, pyrrolidyl, —$PO_3H$, methoxy, ethoxy, propoxy, isopropoxy, butoxy, pentyloxy, phenoxy, hydroxyl, acetoxy, methylthio, ethylthio, isopropylthio, mercapto, acetylthio, thiocyano, methylsulfinyl, methylsulfonyl, dimethylsulfonyl, sulfonate groups, fluorine atom, chlorine atom, bromine atom, iodine atom, trimethylsilyl, triethylsilyl, furyl, thienyl, pyridyl, piperidino, morpholino, pyrrolidyl groups, and the like.

Examples of preferred substituted or unsubstituted alpha-diketone groups include those represented by general formula (ADK):

$$Ar^1—C(=O)—C(=O)—Ar^2 \quad \text{(ADK)}$$

wherein $Ar^1$ and $Ar^2$ are the same or different and are independently a substituted or unsubstituted aryl group or a substituted or unsubstituted heteroaryl group.

Examples of substituted or unsubstituted aryl groups for inclusion in general formula (ADK) as Ar and/or Ar' include, but are not limited to, a substituted or unsubstituted substituent or functional group derived from an aromatic ring including but not limited to a benzene ring, a naphthalene ring, anthracene ring, indene ring, fluorene ring and others.

Examples of substituted or unsubstituted heteroaryl groups for inclusion in general formula (ADK) as Ar or Ar' include a substituted or unsubstituted substituent or functional group derived from a heteroaryl ring including but not limited to a furan ring, thiophene ring, pyrrole ring, oxazole ring, isooxazole ring, thiazole ring, isothiazole ring, imidazole ring, pyrazole ring, pyrane ring, pyridine ring, pyrazine ring, indole ring, quinoline ring, isoquinoline ring, xanthene ring, carbazole ring, acridine ring, indoline ring, julolidine ring and others.

Examples of substituents that can be substituted for a hydrogen atom attached to an aryl group or heteroaryl group in a substituted aryl or heteroaryl group include, but are not limited to, halogen atoms, alkyl, alkoxy, alkylamino, dialkylamino, alkylthio, heterocyclic groups, more specifically, methyl, ethyl, isopropyl, tert-butyl, phenyl, trifluoromethyl, cyano, acetyl, ethoxycarbonyl, carboxyl, carboxylate, amino, methylamino, dimethylamino, ethylamino, diethylamino, isopropylamino, diisopropylamino, cyclohexylamino, dicyclohexylamino, acetylamino, piperidino, pyrrolidyl, —$PO_3H$, methoxy, ethoxy, propoxy, isopropoxy, butoxy, pentyloxy, phenoxy, hydroxyl, acetoxy, methylthio, ethylthio, isopropylthio, mercapto, acetylthio, thiocyano, methylsulfinyl, methylsulfonyl, dimethylsulfonyl, sulfonate groups, fluorine atom, chlorine atom, bromine atom, iodine atom, trimethylsilyl, triethylsilyl, furyl, thienyl, pyridyl, piperidino, morpholino, pyrrolidyl groups, and the like.

Specific examples of alpha-diketone groups represented by formula ADK include, but are not limited to, the following compounds represented by formula (ADK-1)-(ADK-11):

(ADK-1)

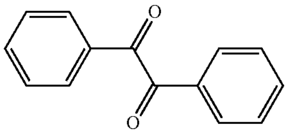

(Benzil)

(ADK-2)

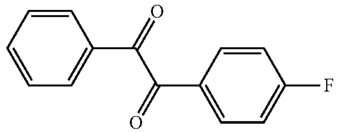

(ADK-3)

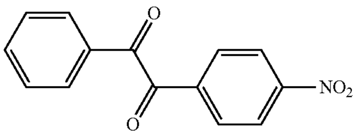

(ADK-4)

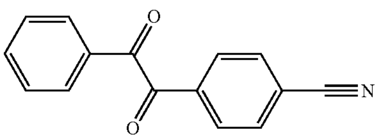

(ADK-5)

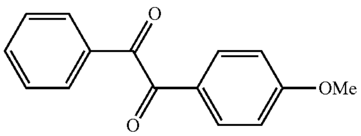

-continued (ADK-6)

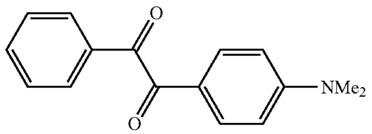

(ADK-7)

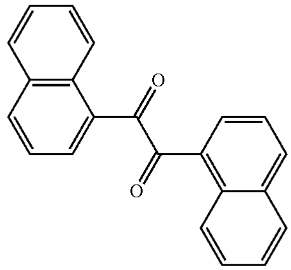

(ADK-8)

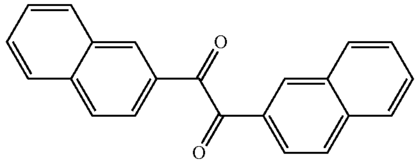

(ADK-9)

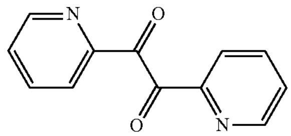

(ADK-10)

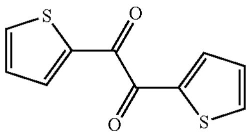

(ADK-11)

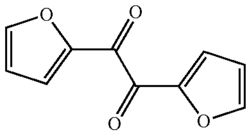

Optionally $Ar^1$ and/or $Ar^2$ in general formula ADK and any of the compounds represented by formula (ADK-1)-(ADK-11) can include one or more substituents on one or both of the aryl or heteroaryl groups, which substituents can be the same or different. Examples of substituents include, but are not limited to, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group, a nitro group, a hydroxyl group, a thiol, an alkyl thioether, an aryl thioether, a substituted or unsubstituted alcohol group, and those listed above.

Examples a polycyclic group including at least two fused rings of atoms, wherein at least one of the fused rings of atoms includes one or more substituents, wherein at least one of the substituents comprises a double bonded oxygen attached to a carbon atom ring member included in one of the fused rings that can be preferred include, but are not limited to, polycyclic groups represented by the following:

a thioxanthone group represented by general formula (PG-A):

(PG-A)

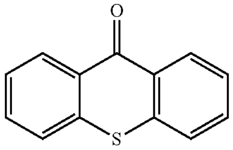

an acenaphthylene-1,2-dione group represented by general formula (PG-B):

(PG-B)

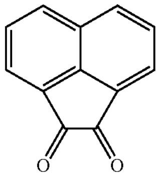

a thiochroman-4-one group represented by general formula (PG-C):

(PG-C)

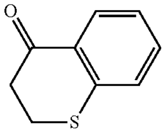

a 9-fluorenone group represented by general formula (PG-D):

(PG-D)

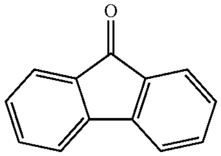

an anthraquinone group represented by general formula (PG-E):

(PG-E)

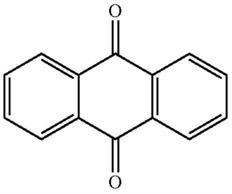

a benzanthrone group represented by general formula (PG-F):

(PG-F)

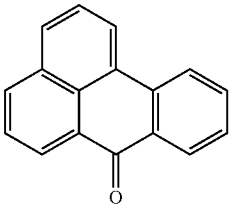

a 9,10-phenanthrenequinone group represented by general formula (PG-G):

(PG-G)

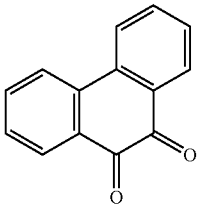

Examples of additional polycyclic groups that may be suitable for inclusion in a second unit include, but are not limited to:

a xanthone group represented by general formula (PG-H):

(PG-H)

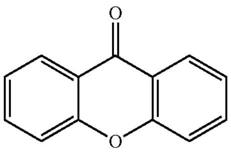

a 1,3-indanedione group represented by general formula (PG-I):

(PG-I)

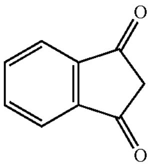

a chromone group represented by general formula (PG-J):

(PG-J)

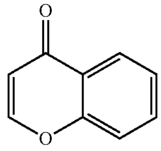

a 1,4-naphthoquinone group represented by general formula (PG-K):

(PG-K)

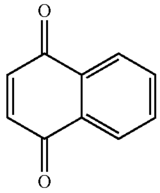

a coumarin group represented by general formula (PG-L):

(PG-L)

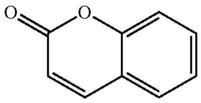

a ketocoumarin group represented by general formula (PG-M):

(PG-M)

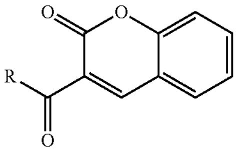

R = aryl wherein the aryl group can be substituted or unsubstituted and can optionally include one or more heteroatoms.

Optionally, a polycyclic group, including any of PG-A to PG-M can be further substituted with one or more additional substituents or functional groups.

Preferred examples of A include structures represented by formula ($A_a$), ($A_b$), ($A_c$), and ($A_d$):

($A_a$)

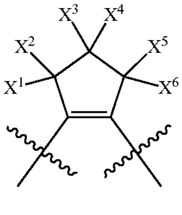

wherein:

$X^1$, $X^2$, $X^3$, $X^4$, $X^5$, and $X^6$ are the same or different and are independently hydrogen (H), fluorine (F), chlorine (Cl), or a substituted or unsubstituted alkyl or heteroalkyl group, ($A_b$)

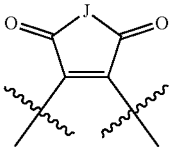

wherein:

J is a member of the ring and represents oxygen O or a nitrogen with an $R^{25}$ substituent group ($NR^{25}$) wherein $R^{25}$ represents hydrogen, substituted or unsubstituted alkyl, or substituted or unsubstituted aryl, ($A_c$)

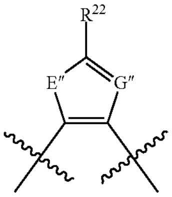

wherein:

E" is a member of the ring and represents an oxygen atom (O), a sulfur atom(S), a sulfur dioxide group ($SO_2$), a selenium atom, or a nitrogen atom with an $R^{23}$ substituent group ($NR^{23}$), G" is a member of the ring and represents a carbon atom with an $R^{24}$ substituent group ($CR^{24}$) or a nitrogen atom (N); and $R^{22}$—$R^{24}$ are substituents and are the same or different and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X—R' wherein R or R' can independently represent an aryl or alkyl group), or a substituted or unsubstituted alcohol group, or ($A_d$)

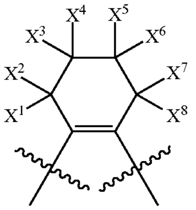

wherein:

$X^1$, $X^2$, $X^3$, $X^4$, $X^5$, $X^6$, $X^7$, and $X^8$ are the same or different and are independently represent hydrogen (H), fluorine (F), chlorine (Cl), or a substituted or unsubstituted alkyl or heteroalkyl group.

Other examples of A include substituted or unsubstituted 6-member rings structures and substituted and unsubstituted polycyclic ring structures that include an ethene bridge wherein X and Y are attached to the carbons at opposite ends of the double bond of the ethene bridge.

In general formula (I), it can be desirable for at least one functional group comprising a carbonyl group to comprise a ketone. In general formula (I), it can be desirable for at least one functional group comprising a carbonyl group to be a ketone.

Examples of preferred photoswitchable photoinitiators in accordance with the present invention include those represented by the following formulae (III)-(XXX):

| (Formula No.)/Compound No. Structure |
|---|
| (III)/AE1 |
| 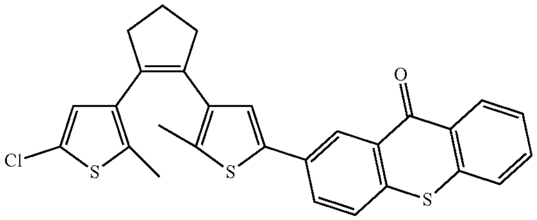 [SMILES: Cc1sc(Cl)cc1C1=C(c2cc(-c3ccc4sc5ccccc5c(=O)c4c3)sc2C)CCC1] |
| (IV)/AE2 |
| 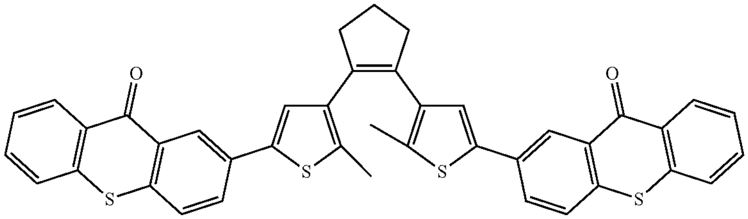 [SMILES: Cc1sc(-c2ccc3sc4ccccc4c(=O)c3c2)cc1C1=C(c2cc(-c3ccc4sc5ccccc5c(=O)c4c3)sc2C)CCC1] |
| (V)/AE3 |
| 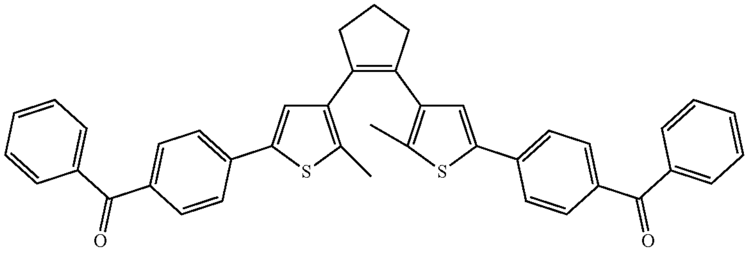 [SMILES: Cc1sc(-c2ccc(C(=O)c3ccccc3)cc2)cc1C1=C(c2cc(-c3ccc(C(=O)c4ccccc4)cc3)sc2C)CCC1] |
| (VI)/AE4 |
| 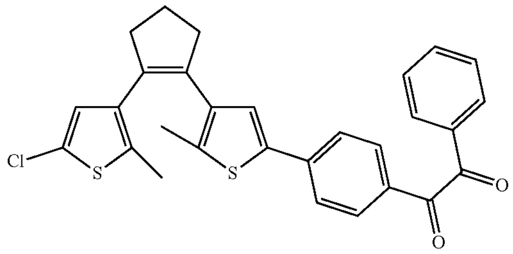 [SMILES: Cc1sc(Cl)cc1C1=C(c2cc(-c3ccc(C(=O)C(=O)c4ccccc4)cc3)sc2C)CCC1] |
| (VII)/AE5 |

-continued
| (Formula No.)/Compound No. Structure |
| --- |
| 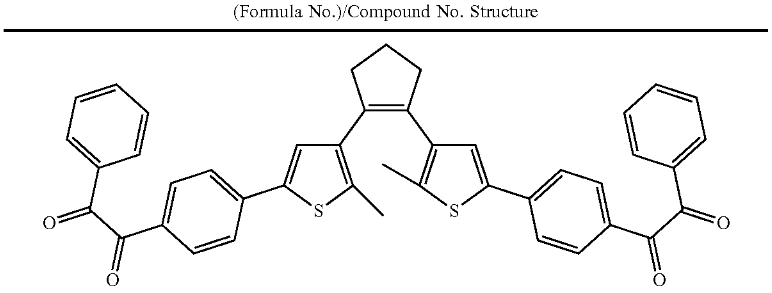 |
| (VIII)/AE6 |
| 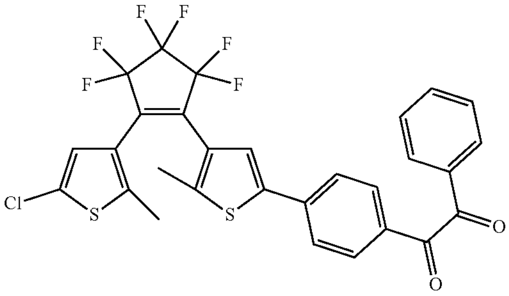 [SMILES: Cc1sc(Cl)cc1C1=C(c2cc(-c3ccc(C(=O)C(=O)c4ccccc4)cc3)sc2C)C(F)(F)C(F)(F)C1(F)F] |
| (IX)/AE7 |
| 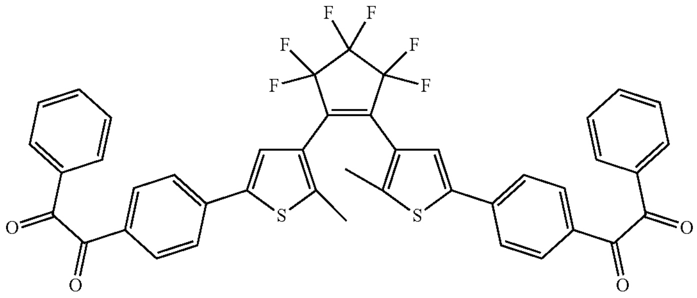 [SMILES: Cc1sc(-c2ccc(C(=O)C(=O)c3ccccc3)cc2)cc1C1=C(c2cc(-c3ccc(C(=O)C(=O)c4ccccc4)cc3)sc2C)C(F)(F)C(F)(F)C1(F)F] |
| (X)/AE11 |
| 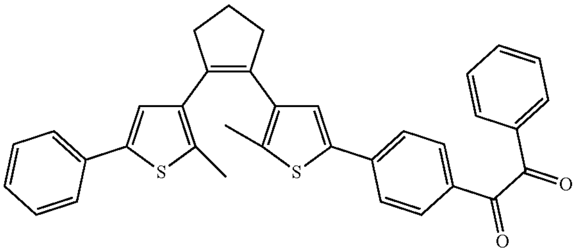 [SMILES: Cc1sc(-c2ccccc2)cc1C1=C(c2cc(-c3ccc(C(=O)C(=O)c4ccccc4)cc3)sc2C)CCC1] |
| (XI)/AE14 |
| 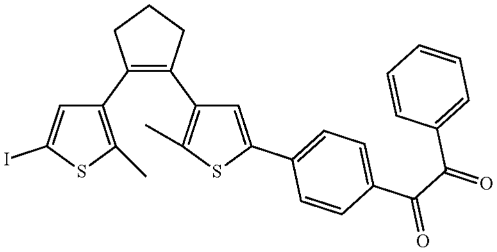 [SMILES: Cc1sc(I)cc1C1=C(c2cc(-c3ccc(C(=O)C(=O)c4ccccc4)cc3)sc2C)CCC1] |
| (XII)/AE19 |

-continued
| (Formula No.)/Compound No. Structure |
| --- |
| 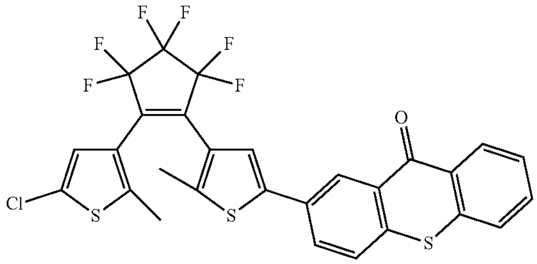 [SMILES: Cc1sc(Cl)cc1C1=C(c2cc(-c3ccc4sc5ccccc5c(=O)c4c3)sc2C)C(F)(F)C(F)(F)C1(F)F] |
| (XIII)/AE20 |
| 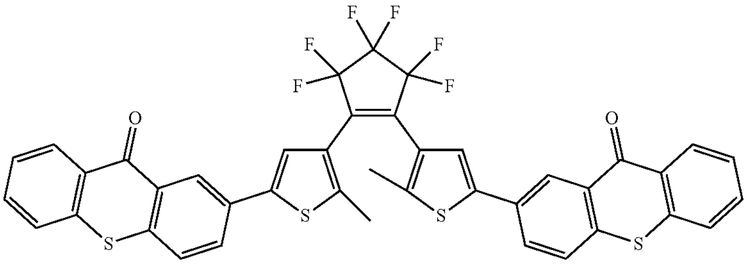 [SMILES: Cc1sc(-c2ccc3sc4ccccc4c(=O)c3c2)cc1C1=C(c2cc(-c3ccc4sc5ccccc5c(=O)c4c3)sc2C)C(F)(F)C(F)(F)C1(F)F] |
| (XIV)/AE24 |
| 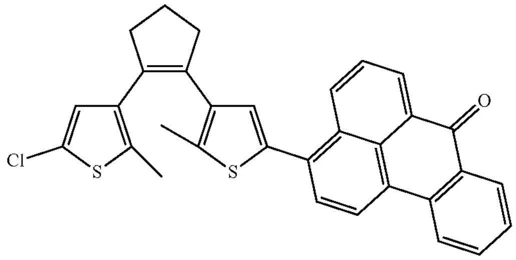 [SMILES: Cc1sc(Cl)cc1C1=C(c2cc(-c3ccc4c5c(cccc35)C(=O)c3ccccc3-4)sc2C)CCC1] |
| (XV)/AE25 |
| 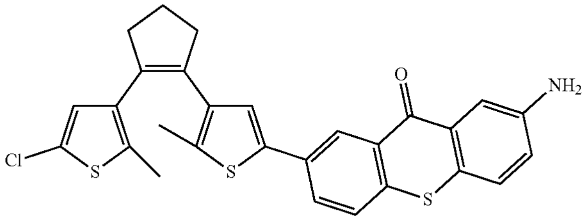 [SMILES: Cc1sc(Cl)cc1C1=C(c2cc(-c3ccc4sc5ccc(N)cc5c(=O)c4c3)sc2C)CCC1] |
| (XVI)/AE26 |
| 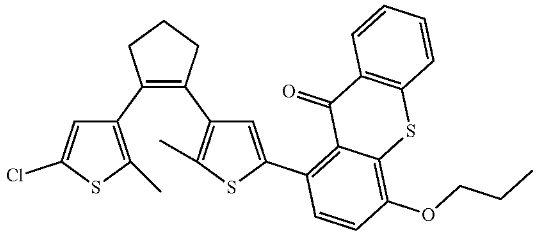 [SMILES: CCCOc1ccc(-c2cc(C3=C(c4cc(Cl)sc4C)CCC3)c(C)s2)c2c(=O)c3ccccc3sc12] |
| (XVII)/AE28 |

-continued
| (Formula No.)/Compound No. Structure |
| --- |
| 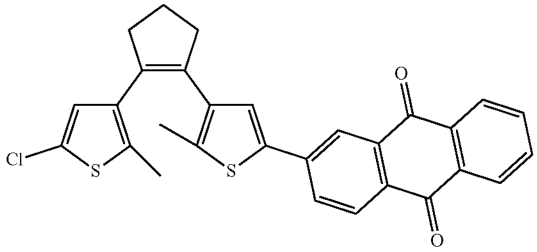 [SMILES: Cc1sc(Cl)cc1C1=C(c2cc(-c3ccc4c(c3)C(=O)c3ccccc3C4=O)sc2C)CCC1] |
| (XVIII)/AE29 |
| 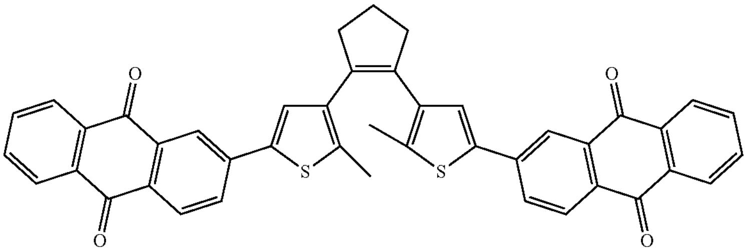 [SMILES: Cc1sc(-c2ccc3c(c2)C(=O)c2ccccc2C3=O)cc1C1=C(c2cc(-c3ccc4c(c3)C(=O)c3ccccc3C4=O)sc2C)CCC1] |
| (XIX)/AE30 |
| 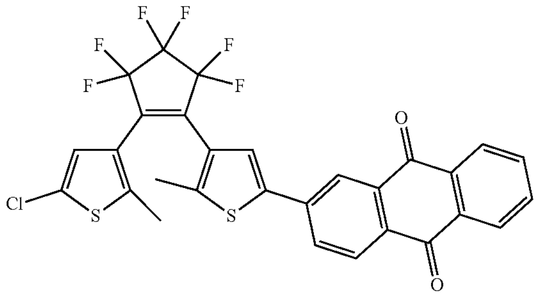 [SMILES: Cc1sc(Cl)cc1C1=C(c2cc(-c3ccc4c(c3)C(=O)c3ccccc3C4=O)sc2C)C(F)(F)C(F)(F)C1(F)F] |
| (XX)/AE31 |
| 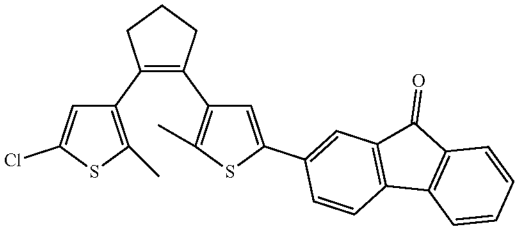 [SMILES: Cc1sc(Cl)cc1C1=C(c2cc(-c3ccc4c(c3)C(=O)c3ccccc3-4)sc2C)CCC1] |
| (XXI)/AE32 |
| 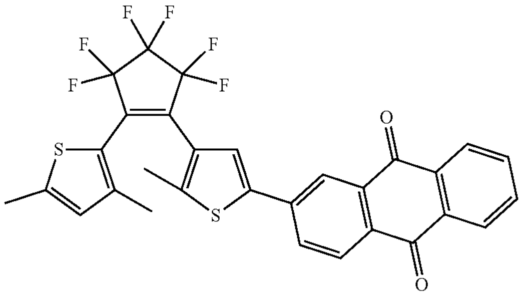 [SMILES: Cc1cc(C)c(C2=C(c3cc(-c4ccc5c(c4)C(=O)c4ccccc4C5=O)sc3C)C(F)(F)C(F)(F)C2(F)F)s1] |
| (XXII)/AE36 |

-continued
| (Formula No.)/Compound No. Structure |
|---|
| 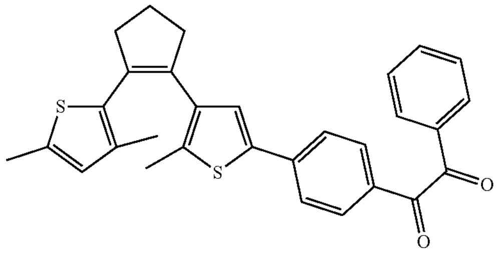 [SMILES: Cc1cc(C)c(C2=C(c3cc(-c4ccc(C(=O)C(=O)c5ccccc5)cc4)sc3C)CCC2)s1] |
| (XXIII)/AE38 |
| 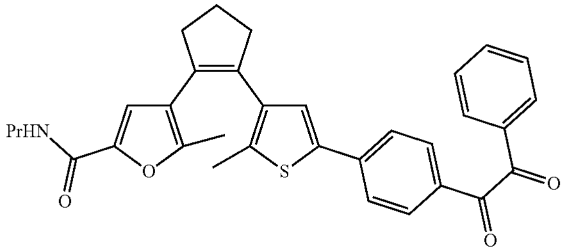 |
| (XXIV)/AE39 |
| 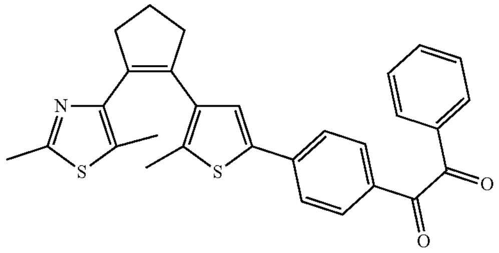 [SMILES: Cc1nc(C2=C(c3cc(-c4ccc(C(=O)C(=O)c5ccccc5)cc4)sc3C)CCC2)c(C)s1] |
| (XXV)/AE40 |
| 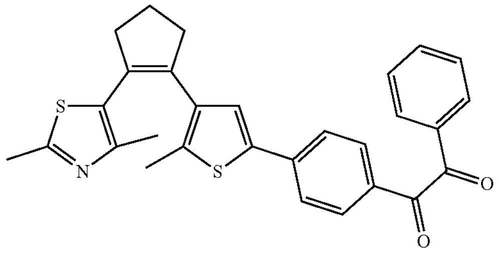 [SMILES: Cc1nc(C)c(C2=C(c3cc(-c4ccc(C(=O)C(=O)c5ccccc5)cc4)sc3C)CCC2)s1] |
| (XXVI)/AE41 |
| 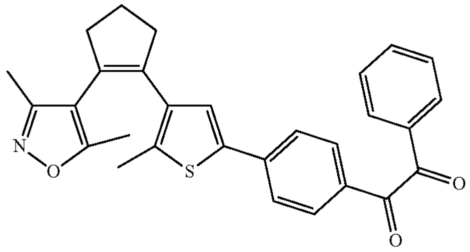 [SMILES: Cc1noc(C)c1C1=C(c2cc(-c3ccc(C(=O)C(=O)c4ccccc4)cc3)sc2C)CCC1] |
| (XXVII)/AE43 |

-continued

| (Formula No.)/Compound No. Structure |
|---|
| 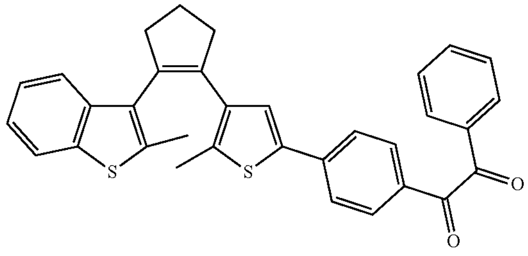 [SMILES: Cc1sc(-c2ccc(C(=O)C(=O)c3ccccc3)cc2)cc1C1=C(c2c(C)sc3ccccc23)CCC1] |
| (XXVIII)/AE44 |
| 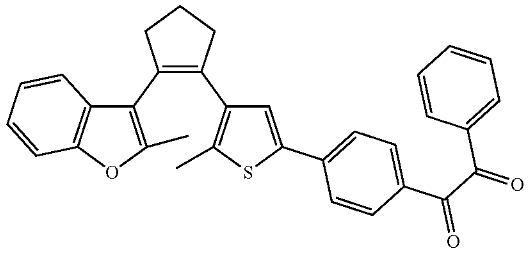 [SMILES: Cc1oc2ccccc2c1C1=C(c2cc(-c3ccc(C(=O)C(=O)c4ccccc4)cc3)sc2C)CCC1] |
| (XXIX)/AE45 |
| 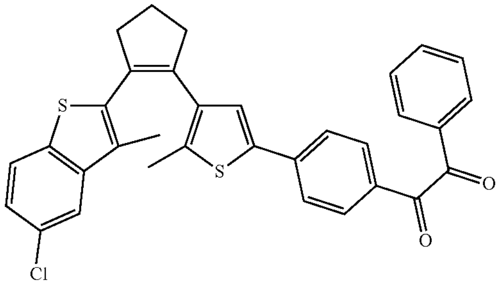 [SMILES: Cc1sc(-c2ccc(C(=O)C(=O)c3ccccc3)cc2)cc1C1=C(c2sc3ccc(Cl)cc3c2C)CCC1] |
| (XXX)/AE48 |
| 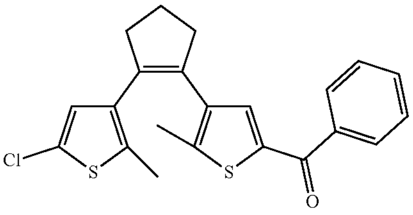 [SMILES: Cc1sc(Cl)cc1C1=C(c2cc(C(=O)c3ccccc3)sc2C)CCC1] |

In above formulae (III) to (XXX), a bare line attached to a ring structure represents a methyl group and where no substituent or line is shown at a ring position, the substituent is H (hydrogen).

Photoswitchable photoinitiators in accordance with the invention also include derivatives of the compounds represented by any of structures (III) to (XXX).

Of the above examples, the photoswitchable photoinitiators represented by formula (VI), (XIX) and (XXI) can be particularly desirable for inclusion in a method in accordance with the present invention.

Photoswitchable photoinitiators described herein will preferably absorb first wavelength light in a range from about 300 to 550 nm. Other examples of other ranges in photoswitchable photoinitiators described herein will absorb first wavelength light include, but are not limited to, from about 350 to about 460 nm, from about 350 to about 455 nm, from about 350 to about 445 nm, from about 350 to about 410 nm, from about 350 to about 405 nm, from about 375 to about 460 nm, from about 375 to 455 nm, from about 375 to 445 nm, from about 375 to 410 nm, from about 375 to about 405 nm, about 375 nm±10 nm, about 405 nm±10 nm, about 410+ nm. Depending upon the extinction coefficient for the particular photoswitchable photoinitiator, the conversion to the second form can be induced by exposure to any source which emits in this range, e.g., lasers, light emitting diodes, mercury lamps. Filters may be used to limit the output wavelengths. A non-limiting example of filtered light includes filtered emission from a mercury arc lamp, etc.

The second form of the photoswitchable photoinitiator will preferably absorb in a range of about 450 to 1000 nm and 450 to 850 nm most typically. Other examples of ranges in which the second form of the photoswitchable photoinitiator will preferably absorb include 450 to about 700 nm. This form can be activated by the second excitation light to produce free radicals directly or to produce excitons which undergo electron transfer or hydrogen abstraction (optionally via electron, hydrogen, or energy transfer to co-initiator(s) in aspects of the invention including one or more co-initiator) by exposure to any second wavelength within this range. For the second excitation, exposures may be accomplished using a laser source, an LED or LED array, the filtered emission from an arc lamp, or other suitable source with emission within the desired wavelength range. Argon ion, He—Ne, laser diodes, krypton, frequency-multiplied Nd-YAG etc. Other light sources may be used, optionally with filters to limit output wavelengths, e.g., light emitting diodes, incandescent lamps, halogen lamps, mercury lamps, arc lamps, etc.

In accordance with another aspect of the present invention, there is provided a photohardenable composition comprising a photohardenable resin component and a photoswitchable photoinitiator comprising a P-type photochromic molecule, preferably comprising a P-type diarylethene molecule, which molecule includes one or more substituents, wherein at least one substituent comprises a substituted or unsubstituted diarylketone group, a substituted or unsubstituted alpha-diketone group, or a polycyclic group including at least two fused rings of atoms, wherein at least one of the fused rings of atoms includes one or more substituents, wherein at least one of the substituents comprises a double bonded oxygen attached to a carbon atom ring member included in one of the fused rings, wherein the P-type photochromic molecule is activatable by light having a first wavelength (λ1) and light having a second wavelength (λ2) to induce a crosslinking or polymerization reaction in the photohardenable composition at the intersection of the first and second wavelengths, wherein the first wavelength is shorter than the second wavelength.

Preferred photoswitchable photoinitiators for inclusion in the photohardenable composition comprise a diarylcycloalkene molecule represented by general formula (I): described herein.

(I)

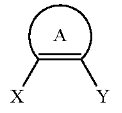

Examples of preferred P-type photoswitchable photoinitiators for inclusion in photohardenable compositions and methods in accordance with the invention include those represented by formula (III) through (XIII) and (XV-XXX) set forth above and derivatives thereof.

Of the above examples, the photoswitchable photoinitiators represented by formula (VI), (XIX) and (XXI) can be particularly desirable for inclusion in a photohardenable composition for use in a method in accordance with the present invention.

As discussed herein, a photohardenable composition that displays non-Newtonian rheological behavior can be desirable or preferred.

A photohardenable composition can optionally further include a co-initiator.

A photohardenable composition can optionally further include a sensitizer.

Optionally, the photohardenable composition can include a combination including one or more co-initiators and/or one or more sensitizers.

Several considerations in selecting a particular photoswitchable photoinitiator for inclusion in a photohardenable composition or method in accordance with the present invention include, by way of example, but not limited to, the absorption spectra and λmax of the molecule and its second forms, the solubility of the photoswitchable photoinitiator in the photohardenable resin component, the photosensitivity of the second form of the photoswitchable photoinitiator, the amount of initial concentration of the second form in the monomer solution, the stability of the photoswitchable photoinitiator and the reduction and oxidation potentials of the second form of the photoswitchable photoinitiator.

Photohardenable compositions in accordance with the present invention are particularly suitable for use in the methods of the present invention for forming three-dimensional objects because the photoswitchable photoinitiator molecule in its initial open form (which is typically colorless for the initial form of P-type diarylethenes) and the photoinitiator molecule in its second closed form (which is typically colored) have sufficiently distinct absorption spectra that once the open form of the molecule is converted to its closed form, the closed form absorbs in a wavelength region where the open form is substantially non-absorbing. In this way, the closed form can be independently excited with the second wavelength without causing unintended excitation of the open form by the second wavelength. The second wavelength can excite the closed form to generate free radicals or otherwise induce desired hardening of the photohardenable resin component once the closed form has been generated by exposure to the first wavelength.

A photohardenable resin component can optionally comprise one or more multifunctional acrylate monomers. Dipentaerythritol pentaacrylate, a pentafunctional acrylic monomer available from Sartomer as SR399 is an example of a photohardenable resin component.

Aliphatic urethane acrylates may also be desirable for use as a photohardenable resin component.

Mixtures of multifunctional acrylate monomers, such as dipentaerythritol pentaacrylate (e.g., SR399 from Sartomer), and aliphatic urethane acrylates can also be used.

An acrylamide monomer can also be included in a photohardenable resin composition to act as a solvent for mixing the photoinitiator in the first resin component.

Preferably, the photohardenable resin component included in the photohardenable composition is selected to achieve an optically transparent or clear liquid, which is desirable in processes and systems in which light, e.g., excitation light, is directed into the composition.

As provided herein, a photohardenable compositions in accordance with the present invention can optionally include one or more co-initiators.

Suitable co-initiators include co-initiators which are reducing agents, oxidizing agents, or hydrogen donating compounds.

Examples of co-initiators that may be useful can be selected from among those known in the art and, more particularly, tertiary amines and organoborates salts. Iodonium salts may also be useful, particularly in combination with a borate salt. In certain embodiments, an iodonium salt may also be included in combination with a tertiary amine. Examples of other useful electron donating co-initiators are discussed by Eaton, D. F., "Dye Sensitized Photopolymerization", Advances in Photochemistry, Vol. 13, pp 427-486.

Representative examples of N,N-dialkylanilines useful in the present invention as co-initiators include 4-cyano-N,N-dimethylaniline, 4-acetyl-N,N-dimethylaniline, 4-bromo-N,N-dimethylaniline, 4-methyl-N,N-dimethylaniline, 4-ethoxy-N,N-dimethylaniline, N,N-dimethylthioanicidine, 4-amino-N,N-dimethylaniline, 3-hydroxy-N,N-dimethylaniline, N,N,N,'N,-tetramethyl-1,4-dianiline, 4-acetamido-N,N-dimethylaniline, 2,6-diethyl-N,N-dimethylaniline, N,N,2,4,6-pentamethylaniline (PMA) and p-t-butyl-N,N-dimethylaniline.

Certain other tertiary amines are also useful co-initiators including triethylamine, triethanolamine, N-methyldiethanolamine, 2-ethyl-4-(dimethylamino)benzoate, 2-ethylhexyl-4-(dimethylamino)benzoate, etc.

Another class of useful co-initiators are alkyl borate salts such as ammonium salts of borate anions of the formula $BR^aR^bR^cR^d$ wherein $R^a$-$R^d$ are independently selected from the group consisting of alkyl, aryl, alkaryl, allyl, aralkyl, alkenyl, alkynyl, alicyclic and saturated or unsaturated heterocyclic groups. Representative examples of alkyl groups represented by $R^a$-$R^d$ are methyl (Me), ethyl, propyl, butyl, pentyl, hexyl, octyl, stearyl, etc. The alkyl groups may be substituted, for example, by one or more halogen, cyano, acyloxy, acyl, alkoxy or hydroxy groups. Representative examples of aryl groups represented by $R^a$-$R^d$ include phenyl, naphthyl and substituted aryl groups such as anisyl and alkaryl such as methylphenyl, dimethylphenyl, etc. Representative examples of aryl groups represented by $R^a$-$R^d$ include benzyl. Representative alicyclic groups include cyclobutyl, cyclopentyl, and cyclohexyl groups. Examples of an alkynyl group aryl propynyl and ethynyl, and examples of alkenyl groups include a vinyl group. Preferably, at least one but not more than three of $R^a$, $R^d$, $R^c$, and $R^d$ is an alkyl group. Each of $R^a$, $R^b$, $R^c$, and $R^d$ can contain up to 20 carbon atoms, and they typically contain 1 to 7 carbon atoms. More preferably $R^a$-$R^d$ are a combination of alkyl group(s) and aryl-group(s) or aralkyl group(s) and still more preferably a combination of three aryl groups and one alkyl group, i.e., an alkyltriphenylborate, e.g., but not limited to, a butyltriphenyl borate.

As mentioned herein, a photohardenable composition in accordance with the present invention can optionally include a co-initiator. (A co-initiator may also be referred to as a synergist.) Non-limiting examples of co-initiators include an amine, a thiol, a thioether, a mercaptan, a silane, an organoborate compound, a diaryliodonium salt, a triarylsulfonium salt. A preferred example of a suitable co-initiator is butyryl choline butyltriphenylborate. Another preferred example of a suitable co-initiator is N-methyldiethanolamine. When included in a photohardenable composition, a co-initiator, in combination with the photoswitchable photoinitiator, can facilitate photoinitiation by the photoswitchable photoinitiator active form via, e.g., electron transfer or hydrogen transfer.

Photohardenable compositions and methods in accordance with the present invention preferably display non-Newtonian rheological behavior advantageously where this rheological behavior can facilitate forming an object in a volume of a photohardenable composition described herein upon exposure to at least two different wavelengths of excitation light wherein the object remains at a fixed position or is minimally displaced in the volume of the unhardened photohardenable composition during formation. Minimal displacement refers to displacement of the object being formed during its formation in the volume that is acceptable for precisely producing the intended part geometry.

Photohardenable compositions and methods in accordance with the present invention preferably display non-Newtonian rheological behavior that advantageously can also facilitate separation of the formed object from the unhardened photohardenable composition upon application of stress. While not wishing to be bound by theory, upon the application of stress, the apparent viscosity of the non-Newtonian photohardenable composition can drop to a lower value (e.g., the steady shear viscosity) than the static value (e.g., zero shear viscosity or yield stress) allowing the unhardened photohardenable composition to more easily flow off and separate from the object. Examples of such non-Newtonian rheological behavior include but are not limited to pseudoplastic fluid, yield pseudoplastic, Bingham plastic, or Bingham pseudoplastic.

Non-Newtonian rheological behavior can be imparted to the photohardenable composition by further including one or more reactive components (e.g. urethane acrylate oligomers, urethane methacrylate oligomers, acrylated or methacrylated polyurethanes, acrylated or methacrylated polyurethane-ureas, acrylated or methacrylated polyesters, acrylated or methacrylated polyamides, acrylate- or methacrylate-functional block copolymers, alkenyl- or alkynyl-functional urethane oligomers, alkenyl- or alkynyl-functional polyurethanes, alkenyl- or alkynyl-functional polyurethane-ureas, alkenyl- or alkynyl-functional polyesters, alkenyl- or alkynyl-functional polyamides, alkenyl- or alkynyl-functional block copolymers, thiol-functional urethane oligomers, thiol-functional polyurethanes, thiol-functional polyurethane-ureas, thiol-functional polyesters, thiol-functional polyamides, thiol-functional block copolymers) in the photohardenable resin component and/or by further adding one or more nonreactive additives (e.g., but not limited to, one or more thixotropes and/or rheology modifiers) to the photohardenable composition. Selection of the one or more of reactive components and the amounts thereof for addition to the photohardenable resin component to impart non-Newtonian rheological behavior thereto is within the skill of the skilled artisan in the relevant art without undue experimentation. Similarly, selection of nonreactive additives and the amount(s) thereof for addition to the photohardenable composition to impart non-Newtonian rheological behavior thereto is within the skill of the skilled artisan of the relevant art without undue experimentation.

For photohardenable composition in accordance with the present invention, preferred steady shear viscosities are less than 30,000 centipoise, more preferably less than 10,000 centipoise, and most preferably less than 1,000 centipoise. (Steady shear viscosity refers to the viscosity after the thixotrope network has broken up.)

Additives

As mentioned above, photohardenable compositions in accordance with the present invention can include one or more additives. Examples of additives include, but are not limited to, a thixotrope/rheology modifier, a defoamer, a stabilizer, an oxygen scavenger, and a non-reactive solvent diluent. Any additive can be a single additive or a mixture of additives. For example, a thixotrope can comprise a single thixotrope or a mixture of two or more thixotropes.

Additives are preferably selected so that they do not react with the photohardenable resin component, photoswitchable photoinitiator, thixotrope, or any other additives that may be included in photohardenable compositions.

Fillers

Optionally, photohardenable compositions in accordance with the present invention can further include one or more fillers. Fillers can be included in an amount greater than 0 to about 90 weight percent, the amount being determined by the purpose for the filler and the desired end use characteristics for the intended three-dimensional object. Advantageously, fillers may be selected to maintain the optical transparency of the photohardenable composition, e.g., by controlling particle size to be substantially less than the excitation wavelengths or by matching the refractive indices of the filler and matrix to reduce optical scatter.

Fillers may be used to modify the properties of the hardened photohardenable composition, for example the stiffness, strength, toughness, impact resistance, resistance to creep, resistance to fatigue, mechanical energy return, mechanical loss tangent, glass transition temperature, thermal degradation temperature, thermal conductivity, thermal resistance, moisture uptake, electrical conductivity, static dissipation, dielectric constant and loss tangent, density, refractive index, optical dispersion, opacity to ionizing radiation, and resistance to ionizing radiation. Fillers may also be used to modify the properties of the liquid photohardenable composition, such as rheological properties such as viscosity and thixotropy and optical properties such as refractive index. Examples of fillers include but are not limited to silica, alumina, zirconia; silicates glasses such as soda-lime glass, borosilicate glass, sodium silicate glass, lead glass, aluminosilicate glass, barium glass, thorium glass, glass ceramics; chalcogenide glasses; glass microspheres and microbubbles; nanoclays such as laponite, montmorillonite, bentonite, kaolinite, hectorite, and halloysite; calcium phosphate minerals such as hydroxyapatite, mineral fillers such as chalk, rock dust, slag dust, fly ash, hydraulic cement, loess, limestone, kaolin, talc, and wollastonite. Examples of particle size ranges include but are not limited to less than 10 microns, less than 1 micron, 10 nm to 500 nm, 10 nm to 90 nm, 40 nm to 70 nm. Smaller particles sizes, in particular sizes less than about 100 nm, may be beneficial to provide high optical clarity of the liquid composition to better facilitate printing. Controlling the particle size distribution, for example monodisperse, bimodal, or trimodal distributions of sizes, may be beneficial to control rheological properties, increase filler weight percent, or modify the properties of the photohardenable composition.

Thixotrope/Rheology Modifier

Thixotropes and rheology modifiers suitable for inclusion in a photohardenable composition described herein include, for example and without limitation, urea derivatives; modified urea compounds such as Rheobyk 410 and Rheobyk-D 410 available from BYK-Chemie GmbH, part of the ALTANA Group; fumed metal oxides (also referred to as pyrogenic metal oxides) including for example, but not limited to, fumed silica, fumed alumina; zirconia; precipitated metal oxides including for example, but not limited to, precipitated silica, precipitated alumina; unmodified and organo-modified phyllosilicate clays; dimer and trimer fatty acids; polyether phosphates; oxidized polyolefins; hybrid oxidized polyolefins with polyamide; alkali soluble/swellable emulsions; cellulosic ethers; hydrophobically-modified alkali soluble emulsions; hydrophobically-modified ethylene oxide-based urethane; sucrose benzoate; ester terminated polyamides; tertiary amide terminated polyamides; polyalkyleneoxy terminated polyamides; polyether amides; acrylamidomethyl-substituted cellulose ester polymers; polyethyleneimine; polyurea; organoclays; hydrogenated castor oil; organic base salts of a clay mineral (e.g., montmorillonite) and other silicate-type materials; aluminum, calcium, and zinc salts of fatty acids, such as lauric or stearic acid.

See U.S. Pat. No. 6,548,593 of Merz, et al., issued Apr. 15, 2003, and 9,376,602 of Walther, et al., issued Jun. 28, 2016, which are hereby incorporated herein by reference in their entireties, for information relating to urea derivatives that may be useful as thixotropes.

Thermally reversible gellants such as ester terminated polyamides, tertiary amide terminated polyamides, polyalkyleneoxy terminated polyamides, and polyether amides, and combinations thereof, may be desirable for us as thixotropes. Examples include Crystasense LP1, Crystasense LP2, Crystasense LP3, Crystasense MP, Crystasense HP4, Crystasense HP5, Rheoptima X17, Rheoptima X24, Rheoptima X38, Rheoptima X58, Rheoptima X73, and Rheoptima X84 available from Croda. Crystasense HP-5 is a preferred example of a thixotrope.

Metal oxides that have been surface-treated to impart dispersibility characteristics compatible with the photohardenable resin component may be desirable for use as thixotropes.

A thixotrope can be included in a photohardenable composition described herein in an amount, for example, in a range from about 0.05 weight percent to about 15 weight percent, from about 0.5 weight percent to about 15 weight percent, from about 0.5 weight percent to about 10 weight percent from about 1 to about 10 weight percent of the composition. Other amounts may also be determined to be useful.

A thixotrope is preferably included in a photohardenable composition in an amount effective to at least partially restrict movement of the three-dimensional object or one or more regions thereof in the photohardenable composition during formation.

More preferably, the thixotrope is included in the photohardenable composition in an amount effective to at least partially restrict movement of the three-dimensional object suspended (without contact with a container surface) in the volume of the photohardenable composition during formation. Most preferably the position of the object in the volume of the photohardenable composition remains fixed position during formation of the object.

Defoamer

A defoamer can be included to aid in removing bubbles introduced during processing and handling. A preferred defoamer is BYK 1798 (a silicone based defoamer) available from BYK-Chemie GmbH, part of the ALTANA Group.

Stabilizer

A stabilizer can be included to improve shelf-life of the photohardenable composition and/or to control the level of cure and/or spatial resolution during printing. An example of preferred stabilizer is TEMPO (2,2,6,6-tetramethylpiperidinooxy free radical available from Sigma-Aldrich). Examples of other stabilizers include, but are not limited to, hindered phenols such as butylated hydroxytoluene; hydroquinone and its derivatives such as hydroquinone methyl ether; hindered amine light stabilizers; alkylated diphenylamines; and phosphite esters.

Oxygen Scavenger

An oxygen scavenger can be included to react with oxygen (e.g., singlet oxygen, dissolved oxygen) present in the photohardenable composition.

Non-Reactive Solvent Diluent

A non-reactive solvent diluent can be included. Examples include, but are not limited to, acetone, amyl acetate, n-butanol, sec-butanol, tert-butanol, butyl acetate, cyclohexanone, decane, dimethylacetamide, dimethylformamide, dimethylsulfoxide, dipropylene glycol, dipropylene glycol methyl ether, ethanol, ethyl acetate, ethylene glycol, glycerol, heptane, isopropanol, isopropyl acetate, methyl ethyl ketone, N-methyl pyrrolidone, propylene carbonate, propylene glycol, propylene glycol diacetate, tetrahydrofuran, tripropylene glycol methyl ether, toluene, water, xylenes.

Thermally Activated Radical Initiator

It may also be desirable to include a thermally activated radical initiator in a photohardenable composition. Thermally activated radical initiator examples include but are not limited to 2,2'-azobis(2-methylpropionitrile), 1,1'-azobis(cyclohexanecarbonitrile), 2,2'-azobis [N-(2-carboxyethyl)-2-methylpropionamidine] n-hydrate, 2,2'-azobis [2-methyl-N-(2-hydroxyethyl) propionamide], organic peroxides, inorganic peroxides, peroxydisulfate salts.

When a thermally activated radical initiator is included in a photohardenable composition, the composition may further include a resin component that is hardenable by a thermally driven reaction, in which case a thermal treatment of the part resulting from exposure to the first and second wavelength can be conducted to further harden the part. Examples of suitable thermally hardenable resin components include, but are not limited to, polyurethane, polyurethane-urea, and polyurea precursors; epoxy resins and epoxy curing agents; cyanate ester resins and phthalonitrile resins; maleimide resins such as bismaleimide resins, alone or with allyl curing agents; polyimide and polyamide imide precursors including but not limited to polyamic acids (e.g. poly (pyromellitic dianhydride-co-4,4'-oxydianiline) amic acid), polyamide amic acids (e.g. Torlon AI-30 and Torlon AI-50 available from Solvay), amines, acid anhydrides, and isocyanates; norbornene resins such as nadic-anhydride-terminated resins; phenolic resins; and the like. Examples of preferred thermally driven reactions or mechanisms include, but are not limited to, heating (e.g., the direct or indirect application of heat or thermal energy, irradiation with microwaves, irradiation with UV, visible, or infrared light for purpose of heating).

Inclusion of one or more resin components that can be hardened by a thermally driven reaction or mechanism in the photohardenable composition described herein can facilitate or enable formation of articles with characteristics and/or performance properties that can be suitable for end-use applications for articles formed from a resin including a photohardenable composition without the resin component may not be suitable. Examples of added properties that may be modified by the inclusion of the second resin component include, for example, but are not limited to, mechanical, thermal, electrical, dielectric, chemical resistance, moisture resistance, and biocompatibility properties. Examples include improved mechanical properties including increased tensile strength and modulus, flexural strength and modulus, compressive strength and modulus, impact strength, hardness, wear resistance, fatigue resistance, fracture toughness; improved thermal properties including increased glass transition temperature, increased heat deflection temperature, increased thermal degradation temperature, or reduced coefficients of thermal expansion; reduced moisture or solvent uptake; improved radiation resistance; improved fire resistance, flame retardancy, or char yield; improved dielectric performance (e.g., reduced dielectric constant, reduced dielectric loss constant, or increased breakdown voltage); or improved optical properties (e.g., increased refractive index).

Examples of suitable resin components include, but are not limited to, polyurethane, polyurethane-urea, and polyurea precursors; epoxy resins and epoxy curing agents; cyanate ester resins and phthalonitrile resins; maleimide resins such as bismaleimide resins, alone or with allyl curing agents; polyimide and polyamide imide precursors including but not limited to polyamic acids (e.g. poly(pyromellitic dianhydride-co-4,4'-oxydianiline) amic acid), polyamide amic acids (e.g. Torlon AI-30 and Torlon AI-50 available from Solvay), amines, acid anhydrides, and isocyanates; norbornene resins such as nadic-anhydride-terminated resins; phenolic resins; and benzoxazine resins.

A photohardenable composition in accordance with the invention that further includes a resin component that is hardenable by a thermally driven reaction can include, for example, but without limitation, from about 0.5 to about 95, preferably from about 40 to about 95, weight percent photohardenable resin component; from about 0.0001 to about 0.5, including, but not limited to, from about 0.0001 to about 0.05, 0.0001 to about 0.02, from about 0.0001 to less than about 0.02, weight percent photoswitchable photoinitiator; from about 0.0001 to about 25, weight percent second light activated photoinitiator, and from about 0.5 to about 95, and preferably from about 15 to about 95, weight percent resin component.

When a method includes a photohardenable composition described herein that further includes a resin component that is hardenable by a thermally driven reaction, once an object is formed by irradiation with the first and second wavelengths, it may be removed from volume in which is formed, optionally washed, and then subjected to a thermally driven reaction or mechanism (e.g., heated and/or microwave irradiated) sufficiently to further harden (e.g., by further reacting, further polymerizing, further chain extending) the thermally hardenable resin component and form the article.

Separation of the at least partially hardenable object from unhardened composition may be conducted by a number of means known in the art, e.g., gravity draining, sieving, air blade, centrifugation, vibration, or ultrasonic agitation.

Washing may be carried out with any suitable organic or aqueous wash liquid, or combination thereof, including solutions, suspensions, emulsions, microemulsions, etc. Examples of suitable wash liquids include, but are not limited to water, alcohols (e.g., methanol, ethanol isopropanol, etc.), glycol ethers, benzene, toluene, etc. Wash liquids including a mixture of two or more liquids (e.g., water and an alcohol (e.g., isopropanol) may also be suitable. Such wash solutions may optionally contain additional constituents such as surfactants, etc.

After the object is formed, optionally washed, etc., as described above, it can be further hardened by a thermally driven reaction or mechanism. Hardening can comprise heating and/or microwave irradiation to further cure the same. Heating may be active heating (e.g., in an oven, such as an electric, gas, or solar oven), or passive heating (e.g., at ambient temperature). Active heating can be more rapid than passive heating and in some embodiments can be preferred. Passive heating, e.g., by maintaining the intermediate at ambient temperature for a sufficient time to effect further cure, can also be desirable. Optionally, heating can comprise heating at a first temperature for a first time period, and then heating at a second temperature for a second time period, and then heating at a third temperature for a third time period, and so on, for any number of temperatures and time periods. The temperatures and time periods may be selected to facilitate evaporation of volatiles from the article without causing damage (e.g., cracks); to facilitate more complete curing of lower temperature curing component(s) to stabilize the article shape prior to subsequent cure of higher temperature curing component(s); or to develop higher thermomechanical properties. Differential scanning calorimetry may assist in determining the temperatures and time periods appropriate for curing, by indicating the temperatures where curing reactions initiate and reach their maximum rates (e.g., in a temperature ramp experiment) as well as indicating how much time is required to complete a curing reaction (e.g., in an isothermal experiment). The time periods can be the same length or different. In certain embodiments, the first temperature can be ambient temperature or greater than ambient temperature, and each subsequent temperature can be greater than the previous. Preferably the maximum temperature is sufficient to completely or substantially completely harden or cure the hardenable resin composition but is less than the degradation temperature, e.g., the 5% mass loss temperature as measured by thermogravimetric analysis. When multiple temperatures are used, the temperature can be ramped, for example, by step-wise increases.

Second Light-Activated Photoinitiator

Optionally, a photohardenable composition can further include a light activated photoinitiator. Preferably such photoinitiator is not appreciably responsive to light of a first wavelength or second wavelength. Inclusion of a photoinitiator can be desirable in connection with optional post-processing that includes, for example, a post-curing step involving exposure of the printed object to UV light after printing.

If a second light-activated photoinitiator is included in a photohardenable resin composition, the method can further include a post curing step comprising exposing the object to light of a third wavelength to further harden the object, the third wavelength being different from the first and second wavelengths. Irradiation with the third wavelength is preferably carried out after the partially hardened part is removed or separated from the volume in which it is formed. It can also be desirable to wash the separated or removed part prior to post-cure irradiation with the third wavelength. When the second light activated photoinitiator is UV activatable, the third wavelength is preferable in the ultraviolet range of wavelengths. A third wavelength in a range, for example, from about 240 to about 455 nm, about 240 nm to about 445 nm, from about 240 nm to about 410, or other ranges that are less than the first and second wavelengths can be useful.

Selection of a second photoinitiator is generally made taking into consideration the absorption band of the second photoinitiator and the wavelength of the radiation or light that will be used to activate the second photoinitiator and the first and second wavelengths for activating the photoswitchable photoinitiator so that undesired polymerization is avoided. By way of non-limiting examples, second photoinitiators are available that can be activated by UV or visible wavelength light. Other factors, e.g., absorption coefficients, rate constants of the primary radicals toward the photohardenable resin component, possible side reactions, light intensity can also be taken into consideration and balanced in the selection process. See, for example, A, Eibel, et al., "Choosing the ideal photoinitiator for free-radical photopolymerizations: predictions based on simulations using established data", Polym. Chem., 2018, 9, 5107-5115.

It is desirable for the second photoinitiator to show no or minimal absorption of the first wavelength and the second wavelength.

Preferably the third wavelength is not directed into the volume during formation of the partially hardened object therein.

Preferably the third wavelength is less than the first and second wavelengths.

The second photoinitiator preferably comprises a photoinitiator that initiates polymerization or cross-linking of the photohardenable resin component by free-radical reactions (also referred to herein as a free-radical photoinitiator). A second photoinitiator can comprise a Type I photoinitiator. (A Type I photoinitiator may also be referred to in the art as a Norrish Type I photoinitiator.) A second photoinitiator can comprise a Type II photoinitiator. (A Type II photoinitiator may also be referred to in the art as a Norrish Type II photoinitiator.) A second photoinitiator comprising a single component, e.g., a Type I photoinitiator, which does not appreciably absorb light at the first or second wavelength, can be preferred.

Examples of second photoinitiators include, but are not limited to, acetophenone, anisoin, anthraquinone, benzil, benzoin, benzoin ethyl ether, benzophenone, 1-hydroxycyclohexyl phenyl ketone, 2-benzyl-2-(dimethylamino)-4'-morpholinobutyrophenone, 4,4' bis(diethylamino) benzophenone, thioxanthone, 2-chlorothioxanthone, dibenzosuberone, 2,2'-diethoxyacetophenone, 4,4' dihydroxybenzophenone, 2,2-dimethoxy-2-phenylacetophenone, diphenyl (2,4,6 trimethylbenzoyl) phosphine oxide (TPO), 4'-ethoxyacetophenone, 3'-hydroxyacetophenone, 4'-hydroxyacetophenone, 3-hydroxybenzophenone, 1-hydrocyclohexyl phenyl ketone, 2-hydroxy-2-methylpropiophenone, methylbenzoylformate, 2-methyl-4'-(methylthio)-2-morpholinopropiophenone, phenanthraquinone, 4'-phenoxyacetophenone.

An example of preferred second photoinitiator comprising a free-radical photoinitiator is Omnirad 184 (1-hydroxycyclohexyl-phenyl ketone) available from IGM.

Exposure of the second photoinitiator to light at the third wavelength can advantageously induce alteration or alter, typically by a crosslinking or polymerization reaction in the photohardenable composition, at least one chemical or physical property of previously unaltered photohardenable composition included in the object for further hardening of the initial print or partially hardened object.

Preferably the second photoinitiator shows no or minimal absorption of the first wavelength and the second wavelength.

It can be desirable for the second photoinitiator not to be activatable or appreciably activatable by the first or second wavelengths to avoid undesired reactions in the photohardenable composition in the absence of exposure to the third wavelength.

Post-curing of an initial print or partially hardened object can be carried out with third wavelength light for further hardening (e.g., for further polymerization or cross-linking). Preferably exposure to the third wavelength is carried out after separation of the partially hardened object from the volume in which it is formed. It can be desirable to wash the separated object prior to irradiating it with light of the third wavelength.

The nature of the monomer, the amount of the photoswitchable photoinitiator and, when applicable, a co-initiator and/or a sensitizer, in photohardenable compositions in accordance with the present invention will vary with the particular use of the compositions, the emission characteristics of the exposure sources, the development procedures, the physical properties desired in the polymerized product and other factors.

Examples of photohardenable compositions in accordance with certain aspects of the invention including one or more co-initiators and/or sensitizers will generally have compositions which fall within the following compositional ranges in parts by weight [based on 100 parts total]:

Photohardenable resin component about 10 to 99.9999

Photoswitchable photoinitiator about 0.0001 to about 0.5, including, for example, but not limited to, e.g., about 0.0001 to about 0.1, about 0.0001 to about 0.05, about 0.0001 to about 0.01, about 0.0001 to about 0.009, about 0.0001 to about 0.005, from about 0.0001 to about 0.0025, etc.

Co-initiator (optional) about 0.001 to about 10 including, for example, but not limited to, about 0.001 to about 7.5, about 0.001 to about 5, about 0.001 to about 2.5, about 0.001 to about 1, about 0.001 to about 0.5, from about 0.0001 to about 0.25, etc.

Sensitizer (optional) about 0.1 to 1, including, for example, but not limited to, about 0.1 to about 0.75, about 0.1 to about 0.5, about 0.1 to about 0.25, etc.

Examples of photohardenable compositions in accordance with certain aspects the invention not including one or more co-initiators and/or sensitizers will generally have compositions which fall within the following compositional ranges in parts by weight [based on 100 parts total]:

Photohardenable resin component about 10 to about 99.9999

Photoswitchable photoinitiator about 0.0001 to about 0.5, including, for example, but not limited to, e.g., about 0.0001 to about 0.1, about 0.0001 to about 0.05, about 0.0001 to about 0.01, about 0.0001 to about 0.009, about 0.0001 to about 0.005, from about 0.0001 to about 0.0025, etc.

When a co-initiator is optionally further included in a photohardenable composition, it can be included in a compositional range, in part by weight [based on 100 parts total], set forth above.

The weight percent of the photohardenable resin component in the above exemplary compositions can be less than 10 weight percent, e.g., less than five weight percent, less than 3 weight percent, less than 2 weight percent, or one weight percent or less, in some cases such as printing of hydrogels where the remainder of the resin is then comprised of non-reactive components that are suspended within the final photo hardened resin.

Optionally, a photohardenable composition in accordance with the invention can further include a second light activated photoinitiator that is preferably not appreciably responsive to light of a first wavelength or second wavelength. Inclusion of such light activated photoinitiator can be desirable in connection with an optional post-curing step to be carried out with UV light after printing in any post-processing of the printed object.

When a second light activated photoinitator is further included in a photohardenable composition, it can be included, for example, in a compositional range, in part by weight [based on 100 parts total], in a range from about 0.0001 to about 25%, including, for example, but not limited to, about 0.0001 to about 10, about 0.0001 to about 7.5, about 0.0001 to about 5, about 0.0001 to about 2.5, about 0.0001 to about 1, from about 0.0001 to about 0.5, etc.

A photohardenable composition in accordance with the invention can be prepared using known or conventional procedures.

If a second light activated photoinitiator is included in a photohardenable resin for post-curing purposes, the method can further include a post curing step comprising exposing the object to light of a third wavelength to further harden the object, the third wavelength being different from the first and second wavelengths. When the photoinitiator is UV activatable, the third wavelength is preferable in the ultraviolet range of wavelengths.

EXAMPLES

Example 1

Preparation of Photoswitchable Photoinitiators

All photoswitchable photoinitiators reported herein were accessed using divergent Suzuki coupling reactions as depicted in Scheme 1. Structures and characterization of (III)-(XXX) are shown in Table 1. For the synthesis of photoswitchable photoinitiators (III)-(XXI) (Scheme 1a), halide-functionalized diarylethenes (1-4) and borylated sensitizers (5-13) were combined. A complementary approach was taken for the syntheses of photoswitchable photoinitiators (XXII)-(XXX) (Scheme 1b) wherein the final-step installation of a range of heterocycles could be achieved by the cross-coupling of borylates 14 and 15 with commercially available heterocyclic halides.

Diarylethene halide starting material 1 was purchased from Ambeed (Cat. No. A992492) and 2-3 were synthesized as described in the academic literature. The rest of the starting materials (4-15) were synthesized as described below.

Scheme 1. Divergent synthetic routes for photoswitchable (a)

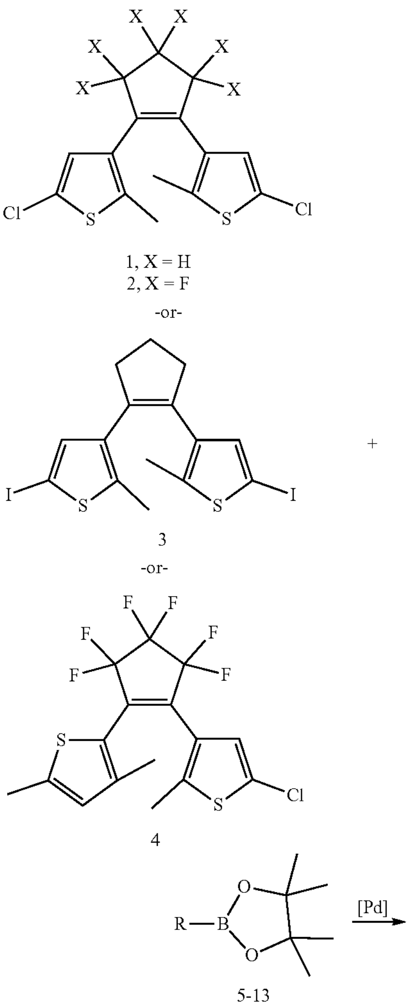

1, X = H
2, X = F
-or-
3
-or-
4
+
5-13
R = sensitizer

-continued

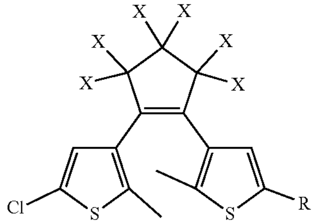

III, VI, VIII, XII, XIV, XV, XVI, XVII, XIX, XX

-or-

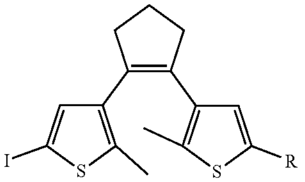

XI

-or-

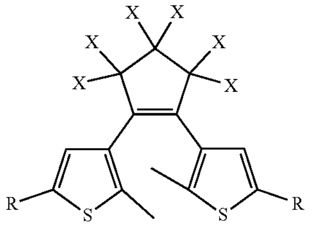

IV, V, VII, IX, XIII, XVIII

-or-

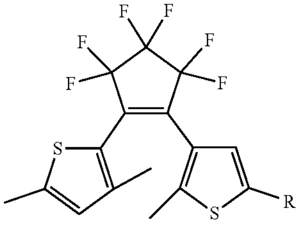

XXI

-continued (b)

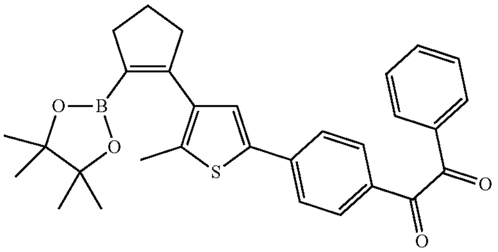

14

+

-or-

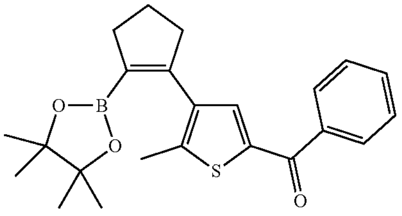

15

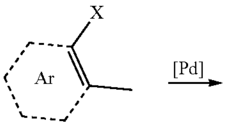

(hetero)aryl halide

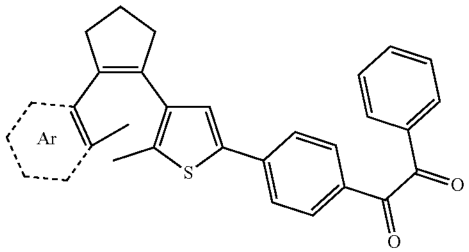

XXII-XXIX

-or-

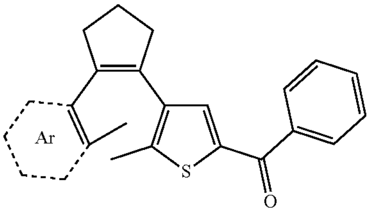

XXX

General Procedure for Synthesis of Photoswitchable Photoinitiators (III)-(XXX) as Depicted in Scheme 1:

To a 4 mL amber-colored vial was added the halide and borylate substrates*, Pd XPhos G3 (0.03 equiv), potassium phosphate (5.0 equiv), and a magnetic stirbar. The vial was sealed with a Teflon-lined cap and placed under an $N_2$ atmosphere with three vacuum/$N_2$ cycles. To this vial was then added a deoxygenated 5:1 mixture (v/v) of dioxane: water (2 mL) via syringe. The vial was sealed with electrical tape and placed on a heating block set to 90° C., then the mixture was stirred for 2 h. The mixture was partitioned between $CH_2Cl_2$ (4 mL) and water (4 mL), the organic layer was dried with $Na_2SO_4$ and filtered, then volatile materials were removed via rotary evaporation at 40° C. The residue was subjected to preparatory thin-layer chromatography (hexanes/$CH_2Cl_2$ or $CH_2Cl_2$/EtOAc solvent system) to afford the desired diarylethene photoswitchable photoinitiator (III)-(XXX). In several cases, both the mono- and di-substituted analogues were isolated from the same reaction as part of a statistical mixture (e.g. (III) and (IV)). The isolated compounds and characterization data are summarized in Table 1 below.

*For syntheses of III-XXI (Scheme 1a), the substrates were halide-functionalized diarylethene 1, 2, 3, or 4 (50 mg) and borylated sensitizer (5-13, 1 equiv). For syntheses of XXII-XXX (Scheme 1b), the substrates were borylates 14 or 15 (50 mg, 1 equiv) and commercially available heteroaryl halide (2 equiv).

TABLE 1

| Formula No. (Compound No.) & Structure |
|---|
| Formula (III) (Compound No. AE1) |
| 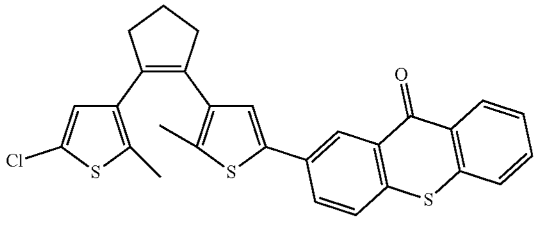 [SMILES: Cc1sc(Cl)cc1C1=C(c2cc(-c3ccc4sc5ccccc5c(=O)c4c3)sc2C)CCC1] |
| Structural Characterization data:<br>$^1$H NMR (400 MHz, $C_6D_6$) δ 9.14 (d, J = 2.2 Hz, 1H), 8.91-8.65 (m, 1H), 7.39 (dd, J = 8.4, 2.2 Hz, 1H), 7.07 (s, 1H), 7.06-6.92 (m, 4H), 6.59 (s, 1H), 2.60-2.49 (m, 4H), 1.85 (s, 3H), 1.88-1.77 (m, 2H), 1.69 (s, 3H).<br>Times for Cure measured under conditions described in Example 4:<br>Voxel time/light sheet time (s):<br>75/328 (conditions 1) |
| Formula (IV) (Compound No. AE2) |
| 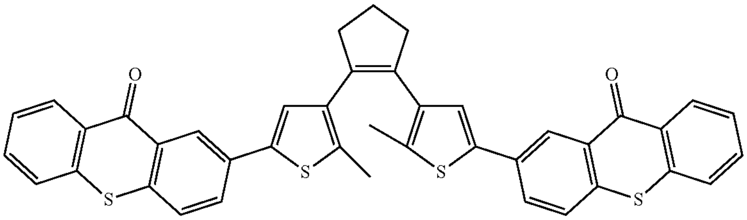 [SMILES: Cc1sc(-c2ccc3sc4ccccc4c(=O)c3c2)cc1C1=C(c2cc(-c3ccc4sc5ccccc5c(=O)c4c3)sc2C)CCC1] |
| Structural Characterization data:<br>$^1$H NMR (400 MHz, $C_6D_6$) δ 9.18 (d, J = 2.1 Hz, 2H), 8.83-8.73 (m, 2H), 7.46 (dd, J = 8.4, 2.2 Hz, 2H), 7.05-7.02 (m, 2H), 7.00 (d, J = 8.4 Hz, 2H), 6.98-6.93 (m, 4H), 2.69 (t, J = 7.5 Hz, 4H), 2.03-1.88 (m, 2H), 1.94 (s, 6H).<br>Times for Cure measured under conditions described in Example 4:<br>Voxel time/light sheet time (s):<br>124/>500 (conditions 1) |
| Formula (V) (Compound No. AE3) |
| 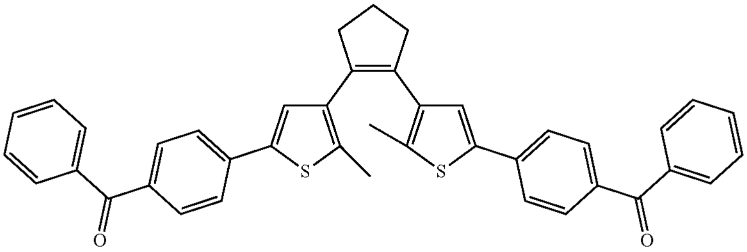 [SMILES: Cc1sc(-c2ccc(C(=O)c3ccccc3)cc2)cc1C1=C(c2cc(-c3ccc(C(=O)c4ccccc4)cc3)sc2C)CCC1] |

TABLE 1-continued

| Formula No. (Compound No.) & Structure |
|---|
| Structural Characterization data: $^1$H NMR (400 MHz, $C_6D_6$) δ 7.75-7.68 (m, 8H), 7.44-7.39 (m, 4H), 7.14 (s, 2H), 7.18-7.12 (m, 2H), 7.10-7.02 (m, 4H), 2.74 (t, J = 7.4 Hz, 4H), 1.96 (s, 6H), 2.04-1.89 (m, 2H). Times for Cure measured under conditions described in Example 4: Voxel time/light sheet time (s): 328/(not measured) (conditions 1) |
| Formula (VI) (Compound No. AE4) |
| 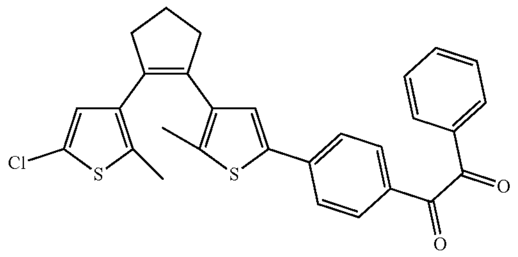 [SMILES: Cc1sc(Cl)cc1C1=C(c2cc(-c3ccc(C(=O)C(=O)c4ccccc4)cc3)sc2C)CCC1] |
| Structural Characterization data: $^1$H NMR (400 MHz, $C_6D_6$) δ 8.00-7.95 (m, 2H), 7.91-7.86 (m, 2H), 7.29-7.24 (m, 2H), 7.10-6.89 (m, 4H), 6.58 (s, 1H), 2.59 (t, J = 7.5 Hz, 2H), 2.51 (t, J = 7.5 Hz, 2H), 1.84 (s, 3H), 1.87-1.75 (m, 2H), 1.67 (s, 3H). Times for Cure measured under conditions described in Example 4: Voxel time/light sheet time (s): 19/263 (conditions 1) 15/88 (conditions 2) |
| Formula (VII) (Compound No. AE5) |
| 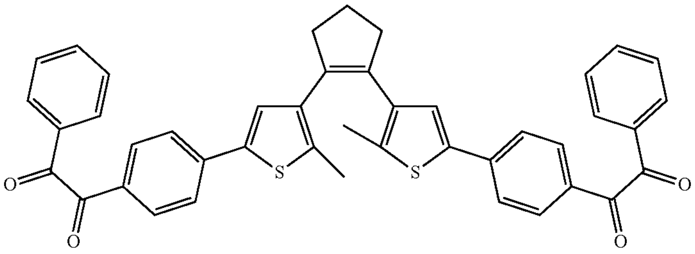 [SMILES: Cc1sc(-c2ccc(C(=O)C(=O)c3ccccc3)cc2)cc1C1=C(c2cc(-c3ccc(C(=O)C(=O)c4ccccc4)cc3)sc2C)CCC1] |
| Structural Characterization data: $^1$H NMR (400 MHz, $C_6D_6$) δ 7.98-7.93 (m, 4H), 7.91-7.86 (m, 4H), 7.33-7.27 (m, 4H), 7.07 (s, 2H), 7.06-7.01 (m, 2H), 6.99-6.93 (m, 4H), 2.70 (t, J = 7.4 Hz, 4H), 1.99-1.83 (m, 2H), 1.90 (s, 6H). Times for Cure measured under conditions described in Example 4: Voxel time/light sheet time (s): 81/243 (conditions 1) |
| Formula (VIII) (Compound No. AE6) |
| 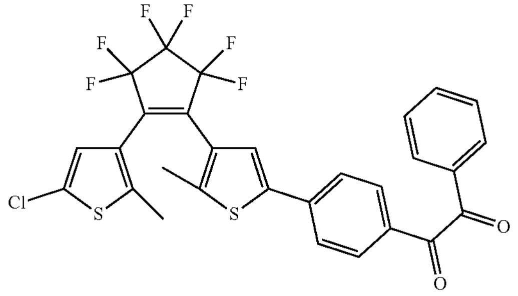 [SMILES: Cc1sc(Cl)cc1C1=C(c2cc(-c3ccc(C(=O)C(=O)c4ccccc4)cc3)sc2C)C(F)(F)C(F)(F)C1(F)F] |
| Structural Characterization data: $^1$H NMR (400 MHz, $C_6D_6$) δ 8.01-7.92 (m, 2H), 7.90-7.82 (m, 2H), 7.12-7.03 (m, 4H), 7.00-6.94 (m, 2H), 6.75 (s, 1H), 1.53 (s, 3H), 1.39 (s, 3H). Times for Cure measured under conditions described in Example 4: Voxel time/light sheet time (s): 66/227 (conditions 1) |
| Formula (IX) (Compound No. AE7) |

TABLE 1-continued

| Formula No. (Compound No.) & Structure |
|---|
| 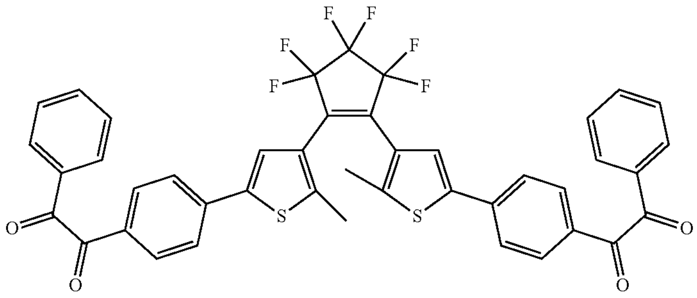 [SMILES: Cc1sc(-c2ccc(C(=O)C(=O)c3ccccc3)cc2)cc1C1=C(c2cc(-c3ccc(C(=O)C(=O)c4ccccc4)cc3)sc2C)C(F)(F)C(F)(F)C1(F)F] |
| Structural Characterization data:<br>$^1$H NMR (400 MHz, $C_6D_6$) δ 8.00-7.94 (m, 4H), 7.90-7.84 (m, 4H), 7.28 (s, 2H), 7.16-7.11 (m, 4H), 7.09-7.03 (m, 2H), 7.00-6.94 (m, 4H), 1.64 (s, 6H).<br>Times for Cure measured under conditions described in Example 4:<br>Voxel time/light sheet time (s):<br>119/286 (conditions 1)<br>Formula (X) (Compound No. AE11) |
| 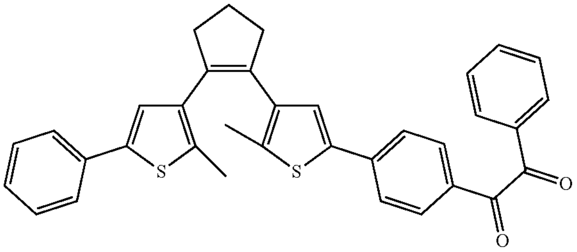 [SMILES: Cc1sc(-c2ccccc2)cc1C1=C(c2cc(-c3ccc(C(=O)C(=O)c4ccccc4)cc3)sc2C)CCC1] |
| Structural Characterization data:<br>$^1$H NMR (400 MHz, $C_6D_6$) δ 8.00-7.94 (m, 2H), 7.89-7.84 (m, 2H), 7.54-7.48 (m, 2H), 7.32-7.26 (m, 2H), 7.10 (s, 2H), 7.09-7.02 (m, 3H), 6.97 (m, 3H), 2.79-2.65 (m, 2H), 1.93 (s, 3H), 1.93 (s, 3H), 2.00-1.85 (m, 2H).<br>Times for Cure measured under conditions described in Example 4:<br>Voxel time/light sheet time (s):<br>50/341 (conditions 1)<br>Formula (XI) (Compound No. AE14) |
| 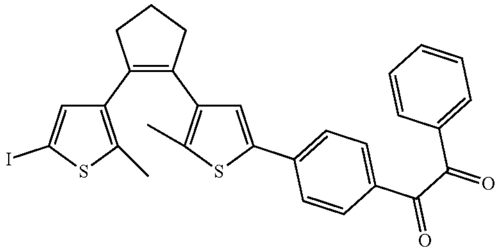 [SMILES: Cc1sc(I)cc1C1=C(c2cc(-c3ccc(C(=O)C(=O)c4ccccc4)cc3)sc2C)CCC1] |
| Structural Characterization data:<br>$^1$H NMR (400 MHz, $C_6D_6$) δ 8.03-7.94 (m, 2H), 7.91-7.84 (m, 2H), 7.29-7.23 (m, 2H), 7.09-7.01 (m, 1H), 7.00-6.93 (m, 3H), 6.91 (s, 1H), 2.60 (t, J = 7.5 Hz, 2H), 2.51 (t, J = 7.5 Hz, 2H), 1.84-1.81 (m, 2H), 1.81 (s, 3H), 1.72 (s, 3H).<br>Times for Cure measured under conditions described in Example 4:<br>Voxel time/light sheet time (s):<br>19/199 (conditions 1)<br>Formula (XII) (Compound No. AE19) |

TABLE 1-continued

| Formula No. (Compound No.) & Structure |
|---|

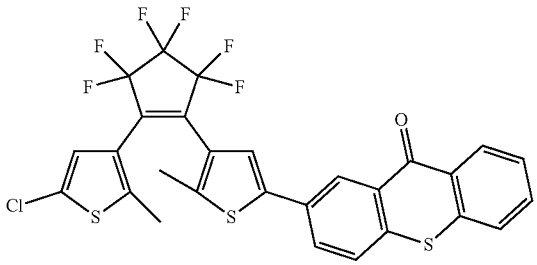 [SMILES: Cc1sc(Cl)cc1C1=C(c2cc(-c3ccc4sc5ccccc5c(=O)c4c3)sc2C)C(F)(F)C(F)(F)C1(F)F]

Structural Characterization data:
$^1$H NMR (400 MHz, $C_6D_6$) δ 8.97 (d, J = 2.1 Hz, 1H), 8.81-8.73 (m, 1H), 7.22-7.18 (m, 1H), 7.21 (s, 1H), 7.06-6.93 (m, 4H), 6.77 (s, 1H), 1.56 (s, 3H), 1.40 (s, 3H).
Times for Cure measured under conditions described in Example 4:
Voxel time/light sheet time (s):
78/235 (conditions 1)
Formula (XIII) (Compound No. AE20)

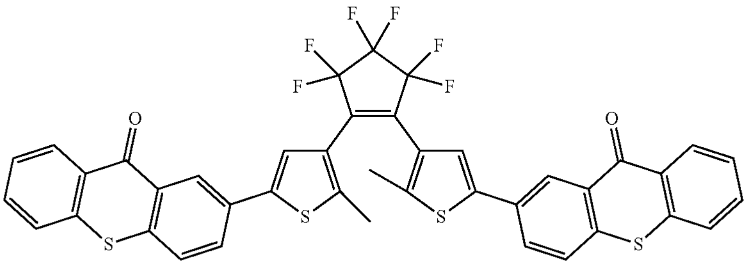 [SMILES: Cc1sc(-c2ccc3sc4ccccc4c(=O)c3c2)cc1C1=C(c2cc(-c3ccc4sc5ccccc5c(=O)c4c3)sc2C)C(F)(F)C(F)(F)C1(F)F]

Structural Characterization data:
$^1$H NMR (400 MHz, $C_6D_6$) δ 9.01 (d, J = 2.1 Hz, 2H), 8.81-8.71 (m, 2H), 7.31 (s, 2H), 7.27 (dd, J = 8.4, 2.2 Hz, 2H), 7.06-7.00 (m, 4H), 6.99-6.94 (m, 4H), 1.68 (s, 6H).
Times for Cure measured under conditions described in Example 4:
Voxel time/light sheet time (s):
390/(not measured)
Formula (XIV) (Compound No. AE24)

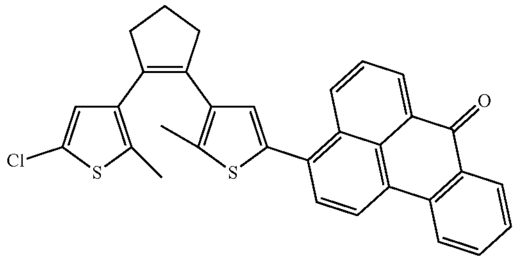 [SMILES: Cc1sc(Cl)cc1C1=C(c2cc(-c3ccc4c5c(cccc35)C(=O)c3ccccc3-4)sc2C)CCC1]

Structural Characterization data:
$^1$H NMR (400 MHz, $C_6D_6$) δ 8.96 (dd, J = 7.3, 1.3 Hz, 1H), 8.80 (dd, J = 7.8, 1.5 Hz, 1H), 8.44 (dd, J = 8.4, 1.3 Hz, 1H), 7.87 (d, J = 7.8 Hz, 1H), 7.82 (d, J = 8.1 Hz, 1H), 7.53 (d, J = 7.7 Hz, 1H), 7.46 (dd, J = 8.4, 7.3 Hz, 1H), 7.27 (ddd, J = 8.2, 7.2, 1.6 Hz, 1H), 7.20-7.17 (m, 1H), 6.84 (s, 1H), 6.62 (s, 1H), 2.70-2.62 (m, 2H), 2.55-2.47 (m, 2H), 2.05 (s, 3H), 1.87-1.80 (m, 2H), 1.79 (s, 3H).
Times for Cure measured under conditions described in Example 4:
No data on voxelation was acquired since this molecule was not photochromic upon irradiation at 405 nm (0.2 $W/cm^2$).
Formula (XV) (Compound No. AE25)

TABLE 1-continued

| Formula No. (Compound No.) & Structure |
|---|
| 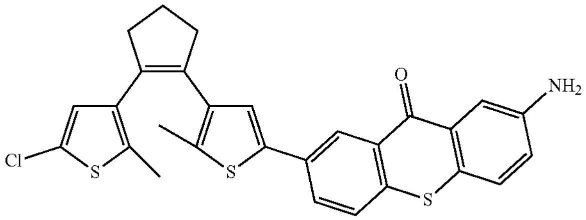 [SMILES: Cc1sc(Cl)cc1C1=C(c2cc(-c3ccc4sc5ccc(N)cc5c(=O)c4c3)sc2C)CCC1] |
| Structural Characterization data: |
| $^1$H NMR (400 MHz, $C_6D_6$) δ 9.21 (d, J = 2.2 Hz, 1H), 7.99 (d, J = 2.7 Hz, 1H), 7.40 (dd, J = 8.4, 2.2 Hz, 1H), 7.08 (s, 1H), 7.06 (d, J = 8.4 Hz, 1H), 6.97 (d, J = 8.7 Hz, 1H), 6.60 (s, 1H), 6.24 (dd, J = 8.5, 2.7 Hz, 1H), 2.81 (s, 2H), 2.61-2.48 (m, 4H), 1.84 (s, 3H), 1.84-1.76 (m, 2H), 1.69 (s, 3H). |
| Times for Cure measured under conditions described in Example 4: |
| Voxel time/light sheet time (s): |
| 55/96 (conditions 2) |
| Formula (XVI) (Compound No. AE26) |
| 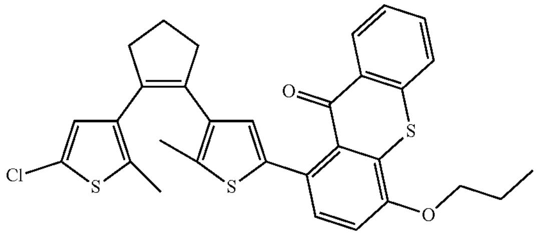 [SMILES: CCCOc1ccc(-c2cc(C3=C(c4cc(Cl)sc4C)CCC3)c(C)s2)c2c(=O)c3ccccc3sc12] |
| Structural Characterization data: |
| $^1$H NMR (400 MHz, $C_6D_6$) δ 8.53-8.45 (m, 1H), 7.26 (d, J = 8.2 Hz, 1H), 7.14-7.10 (m, 1H), 6.97-6.89 (m, 2H), 6.79 (s, 1H), 6.76 (s, 1H), 6.36 (d, J = 8.3 Hz, 1H), 3.45 (t, J = 6.3 Hz, 2H), 2.74 (t, J = 7.4 Hz, 2H), 2.56 (t, J = 7.5 Hz, 2H), 2.17 (s, 3H), 2.07 (s, 3H), 1.83 (p, J = 7.2 Hz, 2H), 1.56 (h, J = 7.0 Hz, 2H), 0.93 (t, J = 7.4 Hz, 3H). |
| Times for Cure measured under conditions described in Example 4: |
| Voxel time/light sheet time (s): |
| 58/96 (conditions 2) |
| Formula (XVII) (Compound No. AE28) |
| 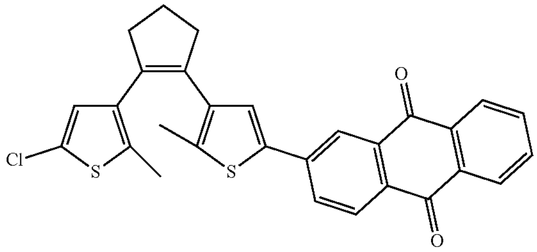 [SMILES: Cc1sc(Cl)cc1C1=C(c2cc(-c3ccc4c(c3)C(=O)c3ccccc3C4=O)sc2C)CCC1] |
| Structural Characterization data: |
| $^1$H NMR (400 MHz, $C_6D_6$) δ 8.61 (d, J = 2.0 Hz, 1H), 8.28-8.18 (m, 3H), 7.47 (dd, J = 8.2, 2.0 Hz, 1H), 7.12-7.05 (m, 3H), 6.57 (s, 1H), 2.58-2.48 (m, 4H), 1.87-1.78 (m, 2H), 1.81 (s, 3H), 1.67 (s, 3H). |
| Times for Cure measured under conditions described in Example 4: |
| Voxel time/light sheet time (s): |
| 6.8/14 (conditions 2) |
| Formula (XVIII) (Compound No. AE29) |
| 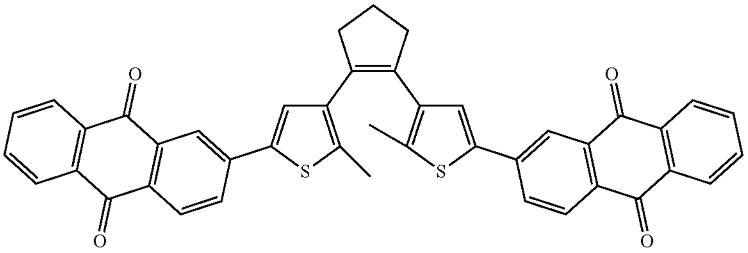 [SMILES: Cc1sc(-c2ccc3c(c2)C(=O)c2ccccc2C3=O)cc1C1=C(c2cc(-c3ccc4c(c3)C(=O)c3ccccc3C4=O)sc2C)CCC1] |

TABLE 1-continued

| Formula No. (Compound No.) & Structure |
|---|
| Structural Characterization data:<br>$^1$H NMR (400 MHz, $CDCl_3$) δ 8.42 (d, J = 1.9 Hz, 2H), 8.35-8.30 (m, 4H), 8.28 (d, J = 8.2 Hz, 2H), 7.88 (dd, J = 8.2, 2.0 Hz, 2H), 7.84-7.77 (m, 4H), 7.34 (s, 2H), 2.90 (t, J = 7.5 Hz, 4H), 2.15 (p, J = 7.5 Hz, 2H), 2.05 (s, 6H).<br>Times for Cure measured under conditions described in Example 4:<br>Voxel time/light sheet time (s):<br>20/57 (conditions 2, except a 638 nm light source was used in place of 520 nm) |
| Formula (XIX) (Compound No. AE30)<br>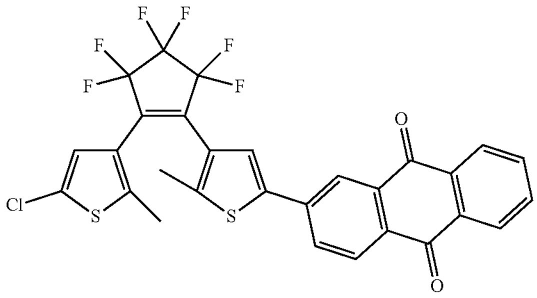 [SMILES: Cc1sc(Cl)cc1C1=C(c2cc(-c3ccc4c(c3)C(=O)c3ccccc3C4=O)sc2C)C(F)(F)C(F)(F)C1(F)F] |
| Structural Characterization data:<br>$^1$H NMR (400 MHz, $C_6D_6$) δ 8.45 (d, J = 2.0 Hz, 1H), 8.29-8.22 (m, 2H), 8.21 (d, J = 7.9 Hz, 1H), 7.29 (dd, J = 8.1, 2.0 Hz, 1H), 7.24 (s, 1H), 7.12-7.05 (m, 2H), 6.74 (s, 1H), 1.55 (s, 3H), 1.38 (s, 3H).<br>Times for Cure measured under conditions described in Example 4:<br>Voxel time/light sheet time (s):<br>7.4/37 (conditions 2) |
| Formula (XX) (Compound No. AE31)<br>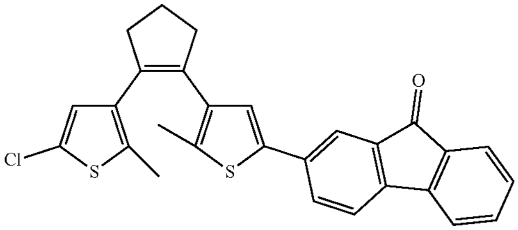 [SMILES: Cc1sc(Cl)cc1C1=C(c2cc(-c3ccc4c(c3)C(=O)c3ccccc3-4)sc2C)CCC1] |
| Structural Characterization data:<br>$^1$H NMR (400 MHz, $C_6D_6$) δ 8.00 (d, J = 1.8 Hz, 1H), 7.60 (d, J = 7.3 Hz, 1H), 7.39 (dd, J = 7.7, 1.8 Hz, 1H), 7.01-6.90 (m, 4H), 6.83-6.75 (m, 1H), 6.59 (s, 1H), 2.63-2.56 (m, 2H), 2.55-2.49 (m, 2H), 1.84 (s, 3H), 1.83-1.76 (m, 2H), 1.69 (s, 3H).<br>Times for Cure measured under conditions described in Example 4:<br>Voxel time/light sheet time (s):<br>42/51 (conditions 2) |
| Formula (XXI) (Compound No. AE32)<br>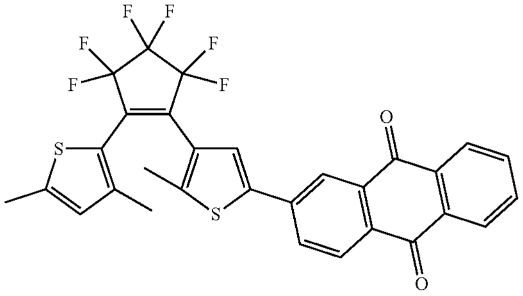 [SMILES: Cc1cc(C)c(C2=C(c3cc(-c4ccc5c(c4)C(=O)c4ccccc4C5=O)sc3C)C(F)(F)C(F)(F)C2(F)F)s1] |
| Structural Characterization data:<br>1H NMR (400 MHz, $C_6D_6$) δ 8.46 (d, J = 2.0 Hz, 1H), 8.28-8.20 (m, 2H), 8.19 (d, J = 8.2 Hz, 1H), 7.34 (s, 1H), 7.31 (dd, J = 8.2, 2.0 Hz, 1H), 7.11-7.06 (m, 2H), 5.97 (s, 1H), 1.89 (s, 3H), 1.75 (s, 3H), 1.56 (s, 3H).<br>Times for Cure measured under conditions described in Example 4:<br>Voxel time/light sheet time (s):<br>3.6/11.2 (conditions 1)<br>3.0/4.7 (conditions 2) |

TABLE 1-continued

| Formula No. (Compound No.) & Structure |
|---|
| Formula (XXII) (Compound No. AE36) |
| 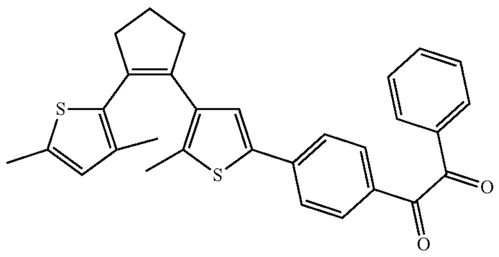 [SMILES: Cc1cc(C)c(C2=C(c3cc(-c4ccc(C(=O)C(=O)c5ccccc5)cc4)sc3C)CCC2)s1] |
| Structural Characterization data: $^1$H NMR (400 MHz, $C_6D_6$) δ 8.01-7.94 (m, 2H), 7.89-7.82 (m, 2H), 7.31-7.26 (m, 2H), 7.12 (s, 1H), 7.07-7.02 (m, 1H), 7.00-6.92 (m, 2H), 6.19 (s, 1H), 2.83 (t, J = 7.5 Hz, 2H), 2.66 (t, J = 7.6 Hz, 2H), 2.09 (s, 3H), 2.02 (s, 3H), 1.86 (p, J = 7.5 Hz, 2H), 1.79 (s, 3H). |
| Times for Cure measured under conditions described in Example 4: Voxel time/light sheet time (s): 5.5/8.9 (conditions 2) |
| Formula (XXIII) (Compound No. AE38) |
| 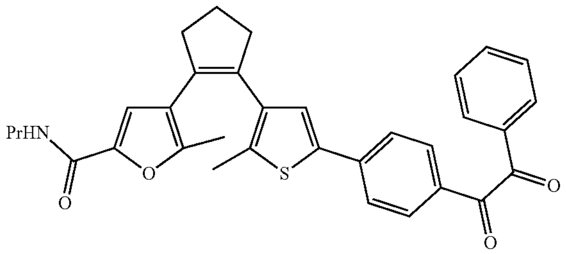 |
| Structural Characterization data: $^1$H NMR (400 MHz, $C_6D_6$) δ 8.01-7.94 (m, 2H), 7.91-7.82 (m, 2H), 7.31-7.21 (m, 2H), 7.17 (s, 1H), 7.08-7.02 (m, 1H), 7.01 (s, 1H), 7.00-6.92 (m, 2H), 5.77 (t, J = 6.1 Hz, 1H), 3.12 (q, J = 6.8 Hz, 2H), 2.64-2.51 (m, 4H), 1.91 (s, 3H), 1.87-1.78 (m, 2H), 1.78 (s, 3H), 1.21 (h, J = 7.4 Hz, 2H), 0.64 (t, J = 7.4 Hz, 3H). |
| Times for Cure measured under conditions described in Example 4: Voxel time/light sheet time (s): 9.8/53 (conditions 2) |
| Formula (XXIV) (Compound No. AE39) |
| 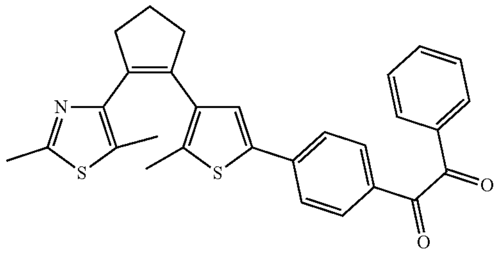 [SMILES: Cc1nc(C2=C(c3cc(-c4ccc(C(=O)C(=O)c5ccccc5)cc4)sc3C)CCC2)c(C)s1] |
| Structural Characterization data: $^1$H NMR (400 MHz, $C_6D_6$) δ 8.00-7.94 (m, 2H), 7.92-7.84 (m, 2H), 7.30-7.23 (m, 2H), 7.11-7.01 (m, 1H), 7.11 (s, 1H), 7.00-6.92 (m, 2H), 3.20-3.10 (m, 2H), 2.74-2.65 (m, 2H), 2.31 (s, 3H), 1.95 (s, 3H), 1.99-1.88 (m, 2H), 1.73 (s, 3H). |
| Times for Cure measured under conditions described in Example 4: Voxel time/light sheet time (s): 9.4/66 (conditions 2) |
| Formula (XXV) (Compound No. AE40) |

TABLE 1-continued

| Formula No. (Compound No.) & Structure |
| --- |
| 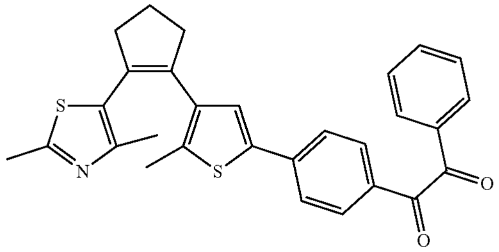 [SMILES: Cc1nc(C)c(C2=C(c3cc(-c4ccc(C(=O)C(=O)c5ccccc5)cc4)sc3C)CCC2)s1] |
| Structural Characterization data: |
| $^1$H NMR (400 MHz, $C_6D_6$) δ 8.01-7.94 (m, 2H), 7.91-7.82 (m, 2H), 7.34-7.24 (m, 2H), 7.10-7.04 (m, 1H), 7.03 (s, 1H), 7.00-6.93 (m, 2H), 2.74-2.66 (m, 2H), 2.64-2.55 (m, 2H), 2.24 (s, 3H), 2.20 (s, 3H), 1.95 (s, 3H), 1.82 (p, J = 7.5 Hz, 2H). |
| Times for Cure measured under conditions described in Example 4: |
| Voxel time/light sheet time (s): |
| 4.6/8.3 (conditions 2) |
| Formula (XXVI) (Compound No. AE41) |
| 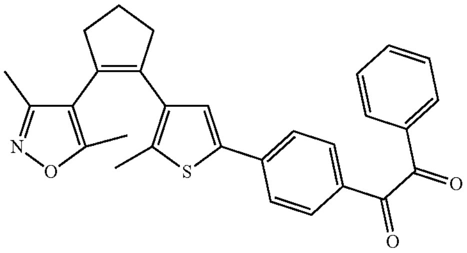 [SMILES: Cc1noc(C)c1C1=C(c2cc(-c3ccc(C(=O)C(=O)c4ccccc4)cc3)sc2C)CCC1] |
| Structural Characterization data: |
| $^1$H NMR (400 MHz, $C_6D_6$) δ 8.00-7.95 (m, 2H), 7.92-7.87 (m, 2H), 7.30-7.25 (m, 2H), 7.08-7.03 (m, 1H), 7.00-6.93 (m, 3H), 2.62-2.53 (m, 2H), 2.47-2.38 (m, 2H), 1.94 (s, 3H), 1.87-1.80 (m, 2H), 1.79 (s, 3H), 1.71 (s, 3H). |
| Times for Cure measured under conditions described in Example 4: |
| Voxel time/light sheet time (s): |
| 3.3/8.0 (conditions 1) |
| Formula (XXVII) (Compound No. AE43) |
| 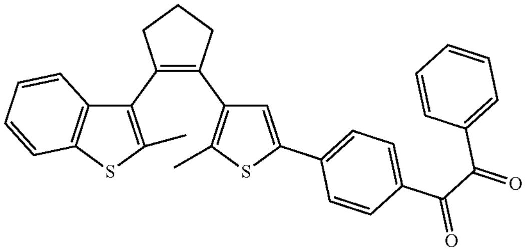 [SMILES: Cc1sc(-c2ccc(C(=O)C(=O)c3ccccc3)cc2)cc1C1=C(c2c(C)sc3ccccc23)CCC1] |
| Structural Characterization data: |
| $^1$H NMR (400 MHz, $C_6D_6$) δ 7.99-7.92 (m, 2H), 7.85-7.78 (m, 2H), 7.56 (d, J = 8.0 Hz, 1H), 7.51 (d, J = 8.0 Hz, 1H), 7.22-7.17 (m, 3H), 7.08-7.02 (m, 2H), 7.01 (s, 1H), 6.99-6.93 (m, 2H), 3.00-2.44 (m, 4H), 2.01 (s, 3H), 1.99-1.88 (m, 2H), 1.79 (s, 3H). |
| Times for Cure measured under conditions described in Example 4: |
| Voxel time/light sheet time (s): |
| 9.6/47 (conditions 2) |
| Formula (XXVIII) (Compound No. AE44) |

TABLE 1-continued

| Formula No. (Compound No.) & Structure |
|---|
| 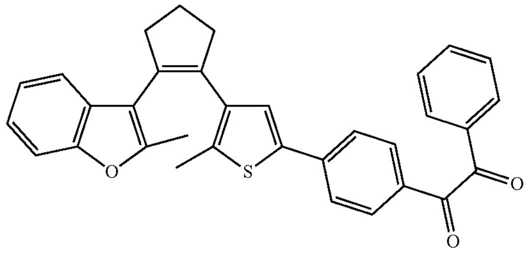 [SMILES: Cc1oc2ccccc2c1C1=C(c2cc(-c3ccc(C(=O)C(=O)c4ccccc4)cc3)sc2C)CCC1] |
| Structural Characterization data:<br>$^1$H NMR (400 MHz, $C_6D_6$) δ 7.99-7.94 (m, 2H), 7.89-7.80 (m, 2H), 7.42-7.37 (m, 1H), 7.32 (d, J = 7.9 Hz, 1H), 7.26-7.20 (m, 2H), 7.09 (s, 1H), 7.08-7.01 (m, 3H), 7.00-6.92 (m, 2H), 2.85-2.77 (m, 2H), 2.75-2.68 (m, 2H), 2.01-1.93 (m, 2H), 1.92 (s, 3H), 1.78 (s, 3H).<br>Times for Cure measured under conditions described in Example 4:<br>Voxel time/light sheet time (s):<br>11/74 (conditions 2) |
| Formula (XXIX) (Compound No. AE45) |
| 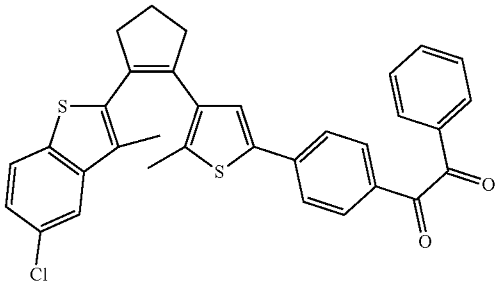 [SMILES: Cc1sc(-c2ccc(C(=O)C(=O)c3ccccc3)cc2)cc1C1=C(c2sc3ccc(Cl)cc3c2C)CCC1] |
| Structural Characterization data:<br>$^1$H NMR (400 MHz, $C_6D_6$) δ 7.99-7.94 (m, 2H), 7.90-7.83 (m, 2H), 7.45 (d, J = 2.0 Hz, 1H), 7.30-7.24 (m, 2H), 7.14 (s, 1H), 7.10-6.92 (m, 5H), 2.83-2.73 (m, 2H), 2.64 (td, J = 7.5, 2.2 Hz, 2H), 1.91-1.84 (m, 2H), 1.82 (s, 3H), 1.73 (s, 3H).<br>Times for Cure measured under conditions described in Example 4:<br>Voxel time/light sheet time (s):<br>7.4/20 (conditions 2) |
| Formula (XXX) (Compound No. AE48) |
| 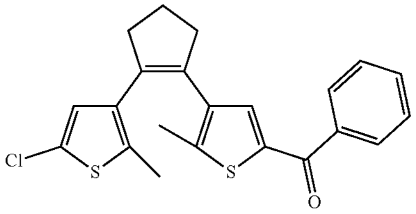 [SMILES: Cc1sc(Cl)cc1C1=C(c2cc(C(=O)c3ccccc3)sc2C)CCC1] |
| Structural Characterization data:<br>$^1$H NMR (400 MHz, $C_6D_6$) δ δ 7.75-7.68 (m, 2H), 7.20-7.15 (m, 3H), 7.11 (s, 1H), 6.39 (s, 1H), 2.46-2.31 (m, 4H), 1.83 (s, 3H), 1.71 (p, J = 7.5 Hz, 2H), 1.55 (s, 3H).<br>Times for Cure measured under conditions described in Example 4:<br>Voxel time/light sheet time (s):<br>41/79 (conditions 2, except 374 nm was used in place of 408 nm) |

Synthesis of Diarylethene Starting Material 4

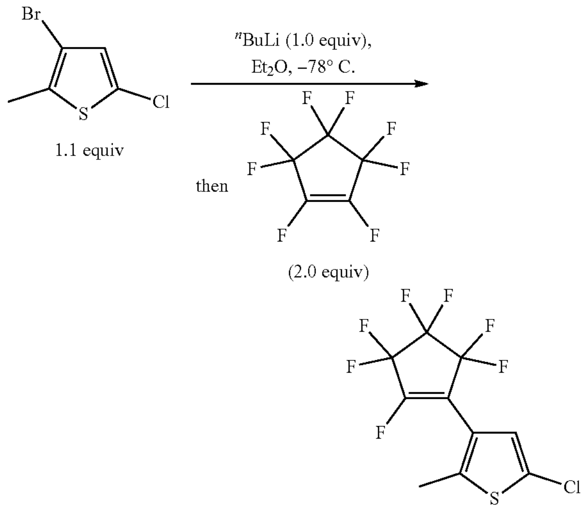

16

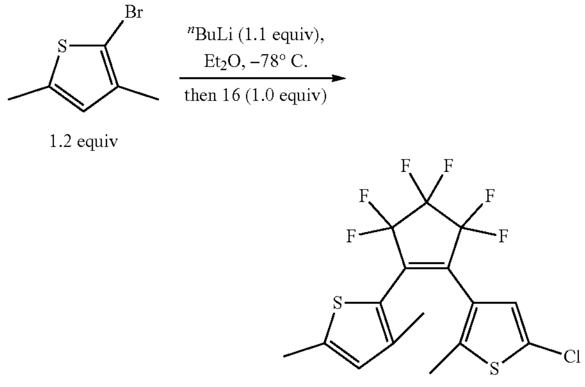

4

A 100 mL flame-dried Schlenk flask was charged with 3-bromo-5-chloro-2-methylthiophene (2.33 g. 11.0 mmol. 1.1 equiv), dry diethyl ether (30 mL), and a magnetic stirbar. The stirred solution was cooled to −78° C. with a dry ice/acetone bath, then n-BuLi (2.5 M in hexanes. 4.0 mL, 10.0 mmol, 1.0 equiv) was added dropwise over 3-5 min via syringe. The mixture was stirred for 30 min at the −78° C., then perfluorocyclopentene (4.2 g, 20 mmol, 2.0 equiv) was added rapidly via syringe. After a further 3-5 min at −78° C., the cold bath was removed, and the mixture was allowed to warm to room temperature. After 1 h at room temperature, the mixture was quenched with saturated aqueous $NH_4Cl$ (30 mL). The layers were separated, and the organic layer was washed with saturated aqueous NaCl (30 mL), dried with $Na_2SO_4$, filtered, and solvents were removed from the filtrate via rotary evaporation. The residue was purified by column chromatography (100% hexanes), affording compound 16 (1.62 g, 50%) as a colorless liquid. This liquid was directly employed in the next step without characterization.

A 25 mL flame-dried Schlenk flask was charged with 2-bromo-3,5-dimethylthiophene (540 mg, 2.83 mmol, 1.2 equiv), dry diethyl ether (10 mL), and a magnetic stirbar. The stirred solution was cooled to −78° C. with a dry ice/acetone bath, then n-BuLi (2.5 M in hexanes, 1.04 mL, 2.59 mmol, 1.1 equiv) was added dropwise over ~1 min via syringe. The mixture was placed on an ice/water bath for 15 min, then it was placed back on the −78° C. bath for ~5 min. Compound 16 (765 mg, 2.36 mmol, 1.0 equiv) was added dropwise over ~1 min via syringe. After a further 3-5 min at −78° C., the cold bath was removed, and the mixture was allowed to warm to room temperature. After 1 h at room temperature, the mixture was quenched with saturated aqueous $NH_4Cl$ (20 mL) and extracted with EtOAc (20 mL). The organic layer was washed with saturated aqueous NaCl (30 mL), dried with $Na_2SO_4$, filtered, and solvents were removed from the filtrate via rotary evaporation. The residue was purified by column chromatography (100% hexanes), affording compound 4 (0.57 g, 58%) as a colorless crystalline solid.

Synthesis of Boronic Esters 5-13

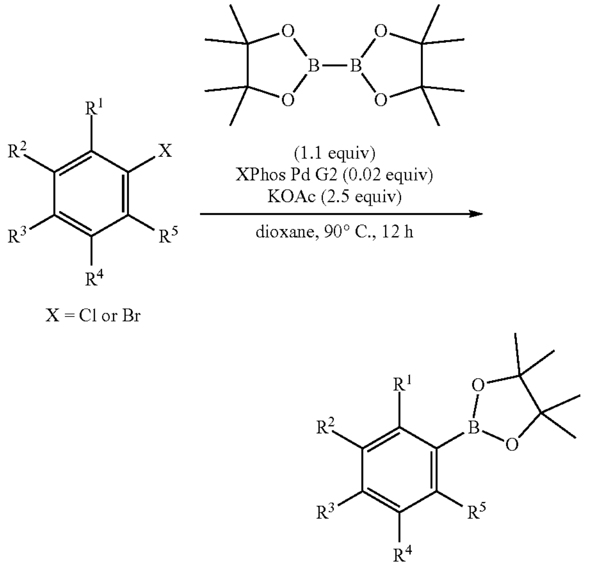

5-13

To a 40 mL screw-cap vial was added commercially available aryl halide (2.5 g), bis(pinacolato)diboron (1.1 molar equiv), XPhos Pd G2 (0.02-0.03 equiv), potassium acetate (2.5 equiv), and a stirbar. The vial was sealed and placed under an $N_2$ atmosphere with three vacuum/$N_2$ cycles. Anhydrous, deoxygenated dioxane (10 mL) was added via syringe and the vial was sealed with electrical tape. The mixture was stirred at 90° C. (heating block temperature) for 12-24 h, then the mixture was brought to room temperature and diluted with $CH_2Cl_2$ (30 mL). The mixture was filtered through a solvent-equilibrated plug of silica gel (20 g). The plug was flushed with 20% EtOAc in $CH_2Cl_2$ until no further product was observed by thin layer chromatography. The filtrate was concentrated via rotary evaporation and the crude boronic ester was recrystallized from hexanes or used without further purification. The following borylated polycyclic compounds were prepared and isolated using this procedure:

5
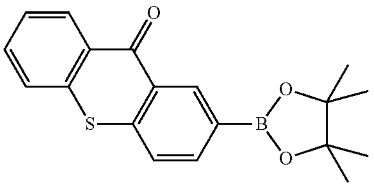
6
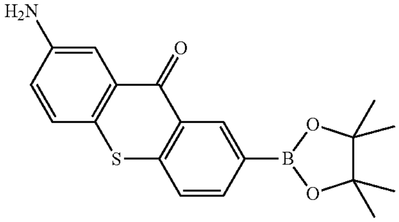
7
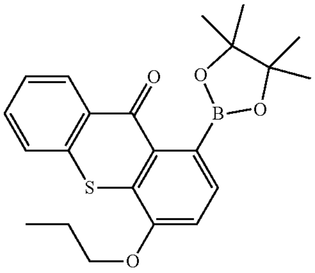
8
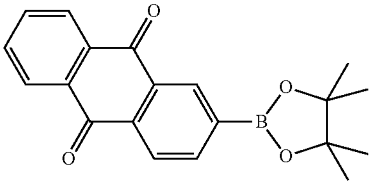
9
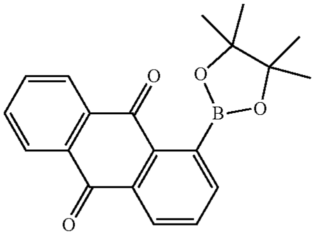
10
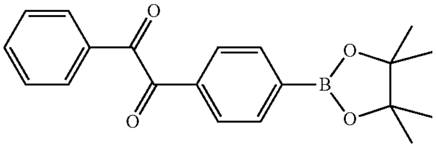
11
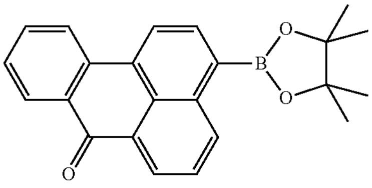
-continued
12
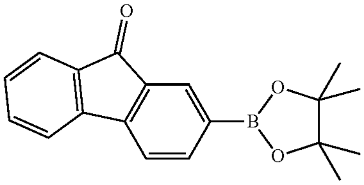
13
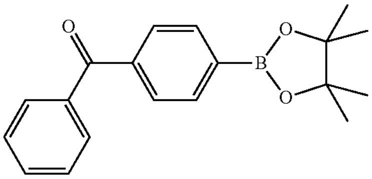
Synthesis of Building Blocks 14 and 15
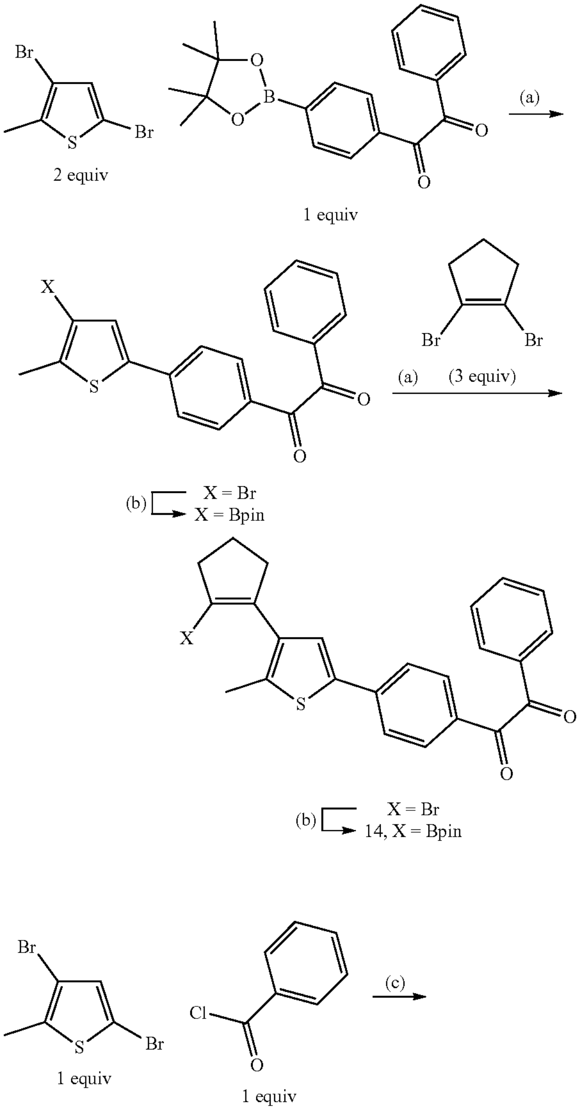

-continued

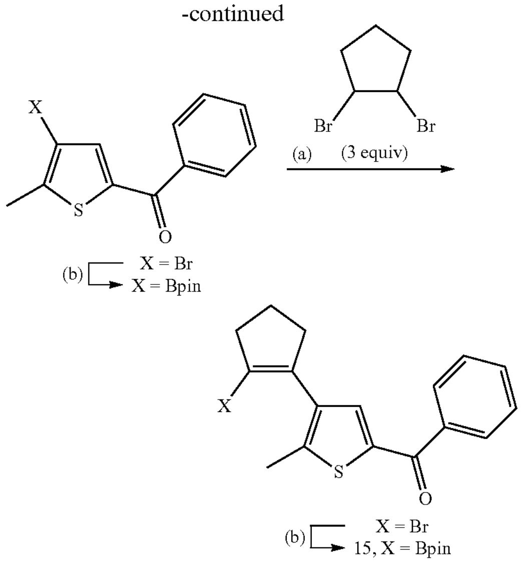

(a) $Pd(dppf)Cl_2$ (0.03 equiv), $K_2CO_3$ (5 equiv), dioxane/water, 90° C.;
(b) $(Bpin)_2$ (1.1 equiv), $Pd(dppf)Cl_2$ (0.03 equiv), KOAc (2.5 equiv), dioxane, 90° C.;
(c) $AlCl_3$ (1.5 equiv), $CH_2Cl_2$

Example 2

Base Resin Preparation

A 100-mL round bottom flask containing a magnetic stir bar was charged with 10.0 g of thixotrope (Crystasense HP-5, Croda). To this flask was then added 50.0 g N,N-dimethylacrylamide (DMAA, Rahn) via syringe. The flask was sealed with a rubber septum and a 1-in 22G needle was inserted for venting. The flask was placed on a preheated (105° C.) aluminum heating block and the mixture was stirred at 250-300 rpm until the thixotrope fully dissolved (10-15 min). Next, a 0.6 gallon polypropylene pail equipped with polypropylene lid was charged with 50.0 g DMAA via syringe. To this pail was then added 200 g of Genomer 4259 (Rahn) and 650 g of Genomer 4247 (Rahn) via large-bore syringe. The contents of the pail were speedmixed (DAC 2800-1000, Flacktek) at 1100 rpm for 1 min. The HP-5 solution was then poured into the pail and the contents of the pail were speedmixed at 1100 rpm for a further 1 min.

Example 3

Preparation of Resin Formulation 1 Including One of Compounds (III)-(XXX) and Polymerization Synergist for Use in Voxelation Studies A stock solution of one of photoswitchable photoinitiators (III)-(XXX) was first prepared by dissolving the photoswitchable photoinitiators in N,N-dimethylacrylamide (DMAA, Rahn) in a 4 mL amber vial such that the final concentration is 1.00 mg/g of photoswitchable photoinitiators in DMAA. To a 40 mL amber vial containing 28.5 g of Base Resin (described above) was then added 0.60 g of the photoswitchable photoinitiators stock solution (20 ppm by mass of photoswitchable photoinitiators) and 0.90 g of N-methyldiethanolamine (3% by mass of polymerization synergist). The contents of the vial were speedmixed (DAC 2800-1000, Flacktek) at 3500 rpm for 1 min to afford Resin Formulation 1. The formulation was transferred to 1 cm plastic cuvettes (Einmal-Küvetten), which were capped and centrifuged at 4000 rpm for 3 min (5804R, Eppendorf) to remove trapped air bubbles.

Example 4

Evaluation of Photoswitchable Photoinitiation in Resin Formulation 1 Under Intersecting Beams of UV and Visible Illumination Light A centrifuged, bubble-free cuvette containing Resin Formulation 1 (prepared as described above) was placed in a setup that features two intersecting, approximately collimated coherent light sources (408 nm and 520 nm). The irradiance for the 408 nm light source was 0.22 $W/cm^2$ ("conditions 1") or 0.6 $W/cm^2$ ("conditions 2") and the irradiance for the 520 nm light source was 1.7 $W/cm^2$ (all cases). The light sources were orthogonal to one another and intersect at the center of the 1 cm×1 cm square cuvette. Time taken to form the polymerized spot is noted and this serves as a proxy for formation of a part in the printer ("voxel time"). In a separate experiment, a different cuvette was subjected only to 408 nm irradiation at an irradiance of 0.22 $W/cm^2$ ("conditions 1") or 0.6 $W/cm^2$ ("conditions 2"). Time taken to form the polymerized region is noted and this serves as a proxy for cure from the UV light sheet in the printer ("light sheet time"). Times reported in Table 1 are the average of 2-3 measurements.

In the present work, two metrics are used for predicting the performance of a photoswitchable photoinitiator for volumetric printing: (1) the ratio of "light sheet time" to "voxel time"; (2) the value of "voxel time". A larger value for 1 and a smaller value for 2 contribute to better performance. For example, a ratio of (time to cure UV light)/(time to cure voxel) of at least one (1) with a voxel cure time of 30 seconds or less, and preferably a ratio of (time for UV cure/time for voxel cure) of at least 1.2 and voxel cure time less than 15 seconds, under the conditions of Example 4, was found to be useful to screen for preferred photoswitchable photoinitiators for volumetric printing.

While not wishing to be bound by theory, it is believed that a ratio of (time to cure UV light)/(time to cure voxel) not greater than one or a cure time greater than 30 seconds is not to be interpreted as an indication that the particular photoswitchable photoinitiator is not suitable for use in volumetric printing. It is expected, however, that such results may be useful as an indicator to vary one or more printing conditions (e.g., photoswitchable photoinitiator and/or synergist concentrations, power levels of one or both of the excitation light, printing temperature, and/or one or both of excitation wavelengths) for better printability. Such adjustments are routine for one of ordinary skill in the art without the need for undue experimentation.

Example 5

Example of Procedure for Printing an Object with AE4

A. Preparation of Resin

A stock solution is prepared by dissolving 80 milligrams of Compound No. AE4 (prepared as set forth in Example 1) in 25 milliliters of N,N-Dimethylacrylamide. Separately, 25 milliliters of N,N-Dimethylacrylamide is mixed with 70 milliliters of isobornyl acrylate and 5.5 grams of Crystasense HP5 (Croda). This solution is stirred at 80 degrees Celsius to fully dissolve and homogenize the components.

A third solution is prepared by mixing 650 grams of Genomer 4247 (Rahn) and 200 grams of Genomer 4259 (Rahn) at 60 degrees Celsius in a Flaktek speedmixer bucket. To this warm solution is added the solution containing the Crystasense HP5, and the resulting mixture is speedmixed at 1000 RPM for 1 minute (DAC 2800-1000, Flacktek). Then the solution containing the photoswitchable photoinitiator is added and the mixture is speedmixed again at 1000 RPM for 1 minute. Finally, 60 grams of N-Methyldiethanolamine is added to the bucket, and the entire mixture is speedmixed one more time for 1 minute at 1000 RPM.

This mixture is then centrifuged to remove bubbles, and dispensed into 20 mm long, 20 mm wide, 45 mm tall glass cuvettes by pouring and allowed to cool to room temperature before printing.

B. Printing Process

A cuvette of photohardenable composition is placed in a holder on a motorized stage. Green laser light (532 nm CW diode laser, 20 W operating power) is used to illuminate a digital micromirror device (Texas Instruments) to form a pattern which is projected into the cuvette along the z axis to produce a pattern of approximately 1.6 $W/cm^2$ of green light. Violet light (405 nm CW diode laser, 50-365 mW operating power) is used to form a light sheet that passes through the cuvette orthogonally to the projected pattern to illuminate a single x-y plane of nominal 100 microns thickness. This light sheet passes through two lenses and is reflected off a mirror, such that it traverses the resin a second time in the reverse direction, in approximately the same beam path as the forward propagating sheet to combine to form one forward and reverse propagating combined light sheet, generally as described in International Patent Application No. PCT/US2022/052157, filed Dec. 7, 2022, of Quadratic 3D, Inc.), although the photoswitchable photoinitiators described here can be used for volumetric printing using a variety of different light sheet and projector geometries. In this printing experiment, the violet laser diode is run at 200 mW to produce an irradiance of approximately 0.66 $W/cm^2$. The stage is advanced in increments of 14 microns at intervals of 250 ms, violet light forming a light sheet and the green light pattern changing at each advancement corresponding to computer generated slices of a three-dimensional object. In regions where there is simultaneous or nearly simultaneous exposure to both wavelengths of light, the photohardenable composition is hardened. In this manner, a three-dimensional solid object is formed without displacement (e.g., sinking or drifting) and without need for support structures or attachment to a build platform due to the high zero shear viscosity or yield stress of the non-Newtonian photohardenable composition. The part is removed from the resin using a spatula, washed for 2 minutes by agitation in isopropyl alcohol, left to dry for 10 minutes, then further postured using a Formlabs Form Cure for 10 minutes.

A photograph of a part printed generally in accordance with the procedure set forth in this Example 5 is shown in FIGS. 1A, 1B, and 1C. The printed parts reproduce features from the target object in all three-dimensions. FIGS. 1D, 1E, and 1F illustrate front, back, and side views of the 3D model shape targeted for printing.

Example 6

Example of Procedure for Printing an Object with AE32

A printing experiment generally as set forth in Example 5 was conducted using Compound No. AE32 as the photoswitchable photoinitator as detailed in this Example 6.

A. Preparation of Resin

Resin preparation was carried out generally as described in Example 5 above, but instead of 80 milligrams of Compound No. AE4, 20 milligrams of Compound No. AE32 (prepared as set forth in Example 1) were used.

B. Printing Process

Printing was carried out generally as described in Example 5 above to the print a part with the resin prepared as described in paragraph 6A of this Example, except printing was performed at 40 degrees Celsius, the stage was advanced at 28 micron increments at intervals of 150 milliseconds, UV irradiance was 0.50 $W/cm^2$ and green irradiance was 1.0 $W/cm^2$.

A photograph of a part printed generally in accordance with the procedure described for this Example 6 is shown in FIGS. 2A, 2B, and 2C. The part faithfully reproduces features from the target object in all three dimensions. FIGS. 2D, 2E, and 2F illustrate front, back, and side views of the 3D model shape targeted for printing.

Example 7

Example of Procedure for Printing an Object with AE39

A printing experiment generally as set forth in Example 5 was conducted using Compound No. AE39 as the photoswitchable photoinitator as detailed in this Example 7.

A. Preparation of Resin

Resin preparation was carried out generally as described in Example 5 above, but instead of 80 milligrams of AE4, 40 milligrams of AE39 (prepared as set forth in Example 1) were used.

B. Printing Process

Printing was carried out generally as described in Example 5 above to the print a part with the resin prepared as described in paragraph 7A of this Example, except printing was performed at 40 degrees Celsius, the stage was advanced at 28 micron increments at intervals of 280 milliseconds, UV irradiance was 1.0 $W/cm^2$ and green irradiance was 1.6 $W/cm^2$.

A photograph of a part printed generally in accordance with the procedure described for this Example 7 is shown in FIGS. 3A, 3B, and 3C. The part faithfully reproduces features from the target object in all three dimensions. FIGS.

3D, 3E, and 3F illustrate front, back, and side views of the 3D model shape targeted for printing.

Example 8

Example of Printing an Object in a Photohardenable Composition Including a Photohardenable Photoinitiator Represented by Formula XXI (Compound No. AE32) Above and a Photohardenable Resin Component with and without a Second Photoinitiator

A. Preparation of the Photoswitchable Photoinitiator Compound No. AE32

Compound AE32 was prepared in accordance with the procedure described in Example 1.

B. Preparation of Base Resin 25 milliliters of N,N-Dimethylacrylamide is mixed with 70 milliliters of isobornyl acrylate and 5.5 grams of Crystasense HP5 (Croda). This solution is stirred at 80 degrees Celsius to fully dissolve and homogenize the components.

A second solution was prepared by mixing 650 grams of Genomer 4247 (Rahn) and 200 grams of Genomer 4259 (Rahn) at 60 degrees Celsius in a Flaktek speedmixer bucket.

To this warm solution is added the solution containing the Crystasense HP5, and the resulting mixture is speedmixed at 1000 RPM for 1 minute (DAC 2800-1000, Flacktek). Finally, 60 grams of N-Methyldiethanolamine is added to the speedmixer bucket, and the entire mixture is speedmixed one more time for 1 minute at 1000 RPM.

C. Preparation of Resin Formulation Containing Compound No. AE32

A stock solution of a photoswitchable photoinitiator was prepared by dissolving the photoswitchable photoinitiator prepared generally as described in Example 1 in 25 mL of 1:1 v/v mixture of N,N-dimethylacrylamide (DMAA, Rahn) and benzyl acrylate (Beantown chemical) in a 40 mL amber vial such that the final concentration was approximately 0.75 mg/mL of photoswitchable photoinitiator in solvent. 0.30 mL of this photoswitchable photoinitiator stock solution was added to 14.7 grams of base resin described above to create a resin formulation containing 15 ppm of photoswitchable photoinitiator. This resin formulation was speedmixed (DAC 2800-1000, Flacktek) at 3000 rpm for 1 min.

D. Preparation of Test Samples

Two test samples were prepared as set forth below: one that included a second photoinitiator and one that included no second photoinitiator.

To prepare the test sample including the second photoinitiator, to 1 kilogram of resin prepared generally as set forth in Example 8C was added 0.6% by weight of 1-Hydroxy-cyclohexyl-phenyl ketone (Omnirad 184, IGM Resins, CAS NO. 947-19-3) and the mixture was stirred until all solid dissolved. It was centrifuged at 4500 rpm for 5 minutes (5804R, Eppendorf) to remove bubbles and poured into custom quartz cuvettes of internal dimension 2×2×4 cm for printing.

In the case of the test sample that did not include a second photoinitiator, 500 grams of base resin formulation (prepared generally as described in Example 8C was centrifuged at 4500 rpm for 5 minutes (5804R, Eppendorf) to remove bubbles and poured into custom quartz cuvettes of internal dimension 2×2×4 cm for printing.

E. Printing of Objects in a Resin Containing Compound No. AE32 with and without a Second Light Activated Photoinitiator Two cuvettes, each including one of the two samples described in Example 8D, were prepared for printing: one including a second photoinitiator and the other not including a second photoinitator.

One cuvette including the sample described in Example 8D including a second photoinitator and another cuvette including the sample described in Example 8D not including a second photoinitiator were used for printing 7×7×7 mm cube as generally described in this Example 8E.

These Cuvettes were Separately Loaded into the Following Printing Setup:

Violet light (408 nm mW diode laser, 365 mW maximum operating power) was illuminated off a scanning galvanometer to generate a light sheet of approximately 130 micron thickness, and was reflected off a mirror and retraced a similar optical beam path to achieve a combined double-pass light sheet (generally as described in International Patent Application No. PCT/US2022,052157, filed Dec. 7, 2022, of Quadratic 3D, Inc.) with irradiance of 0.50 $W/cm^2$ of violet light. This light was intersected orthogonally by projected green light green irradiance (532 nm laser, 18 Watt maximum operating power continuous wave diode laser) of 1.0 $W/cm^2$ projected orthogonally to the light sheet using a Texas Instruments DMD to pattern the projected green light spatially.

A 7×7×7 mm Cube was Printed in Each Cuvette Using the Following Print Settings:

40 degrees Celsius, 28 micron stage movement intervals, 150 milliseconds exposure per slice. In each case a cube was successfully printed, was then washed for 1 minute by stirring in isopropyl alcohol, and allowed to dry for 10 minutes, then post cured under nitrogen in a form cure for 10 minutes (9.1 Watts of 396 nm centered LED irradiation).

For these cubes, hardness was tested using a Shore D hardness tester to compare conversion of the resin to polymer. In the cube printed in resin without any secondary photoinitiator, Shore D hardness after this posturing protocol was 65D, while in the resin containing the secondary photoinitiator, the printed cube had a shore hardness of 87D.

Observations: The inclusion of the second photoinitiator activatable at a wavelength shorter than 405 nm appeared to be substantially inactive at the two printing wavelengths and resulted in more complete postcuring without substantially affecting print settings.

Light sheets can be constructed by means known in the art including, for example, but not limited to, techniques including a laser and a Powell lens, galvanometer, and/or polygon scanning mirror. Alternatively, one or more LEDs can be used as a light source.

Information that may be useful in connection with inventions disclose herein include International Patent Application No. PCT/US2021/035791 of Quadratic 3D, Inc. filed Jun. 3, 2021 for "Volumetric Three-Dimensional Printing Methods Including A Light Sheet And Systems" and U.S. Pat. No. 10,843,410 of Lippert, et al. for "System And Method For A Three-Dimensional Optical Switch Display (OSD) Device"; International Application No. PCT/US2022/039766 of Quadratic 3D, Inc. filed Aug. 9, 2022 for "Methods And Systems For Forming An Object In A Volume Of A Photohardenable Composition", Masahiro Irie, "Diarylethene Molecular Photoswitches-Concepts and Functionalities" 2021 Wiley-VCH, Boschstr. 12, 69469 Weinheim, Germany, and H. Durr and H. Bouas-Laurent, "Photochromism: Molecules and Systems" Elsevier (2003).

As used herein, unless otherwise provided, "alkyl" refers to a branched or straight fully saturated aliphatic hydrocarbon group or a monocyclic or polycyclic saturated aliphatic hydrocarbon ring system). Examples include, but are not limited to, alkyl groups having 1 to 20 (more typically 1 to 10) carbon atoms which may be straight chain, branched chain, or cyclic alkyl groups. An alkyl group may contain only carbon and hydrogen atoms, or may further incorporate one or more heteroatoms such as Si, N, O or S as part of the alkyl group (which may also be referred to as a heteroalkyl group).

As used herein, unless otherwise provided, "alkoxy" refers to a straight or branched chain alkyl moiety covalently bonded to the parent molecule through an —O-linkage. Examples include, but are not limited to, alkoxy groups having 1 to 20 (more typically 1 to 10) carbon atoms which may be straight chain, branched chain, or cyclic alkoxy groups, examples of which include, but are not limited to, methoxy (MeO), ethoxy (EtO), and the like.

As used herein, unless otherwise provided, "aralkyl or "arylalkyl" may also refer to an aryl-substituted alkyl moiety. Examples include, but are not limited to, aralkyl groups having 7 to 20 carbon atoms, examples of which include, but are not limited to, benzyl, methylphenyl, ethylphenyl, and the like.

As used herein, unless otherwise provided, "cycloalkyl" may also refer to a saturated aliphatic ring system moiety having at least three carbon atoms. Examples include, but are not limited to, cyclopropyl, cyclopentyl, cyclohexyl, cycloheptyl, and the like. A cycloalkyl group may contain a saturated aliphatic ring system containing only carbon atoms, or may further incorporate one or more heteroatoms such as Si, N, O or S as part of the ring group (which may also be referred to as a heteroalkyl group).

As used herein, unless otherwise provided, "heteroalkyl" may also refer to an alkyl group comprising one or more heteroatoms. When two or more heteroatoms are present, they may be the same or different. Examples of heteroalkyl groups include, but are not limited to, $CH_2$—OH, O—$C_nH\cdot_{2n+1}$, where n is any integer greater than or equal to 1.

As used herein, unless otherwise provided, "aryloxy" refers to an aryl moiety covalently bonded to the parent molecule through an —O-linkage.

As used herein, unless otherwise provided, "heteroatom" refers to any atom that is not hydrogen or carbon. Typical heteroatoms include but are not limited to S (sulfur), N (nitrogen), O (oxygen), P (phosphorous), Cl (chlorine), Br (bromine), I (iodine), F (fluorine), etc.

As used herein, unless otherwise provided, "alkenyl" refers to a monovalent straight or branched hydrocarbon chain or a monocyclic or polycyclic hydrocarbon ring moiety of from, e.g., two to twenty carbon atoms containing a carbon double bond. Examples include, but are not limited to, 1-propenyl, 2-propenyl, 2-methyl-1-propenyl, 1-butenyl, 2-butenyl, and the like. A cycloalkenyl group may contain only carbon and hydrogen atoms, or may further incorporate one or more heteroatoms such as Si, N, O or S as part of the alkyl group (which may also be referred to as a heteroalkenyl group).

As used herein, unless otherwise provided, "cycloalkenyl" may also refer to a monocyclic or polycyclic hydrocarbon ring system moiety having at least three carbon atoms. Examples include, but are not limited to, cyclopropenyl, cyclopentenyl, cyclohexenyl, cycloheptenyl, and the like. A cycloalkenyl group may contain a monocyclic or polycyclic hydrocarbon ring system containing a ring of only carbon, or may further incorporate one or more heteroatoms, such as Si, N, O or S, as part of the ring group (which may also be referred to as a heterocycloalkenyl group).

As used herein, unless otherwise provided, "amido" refers to —NRC(═O) R' wherein R and R' can be the same of different, wherein R and R' can independently represent, for example, for example, but not limited to, hydrogen, alkyl, or aryl.

As used herein, unless otherwise provided, "amino" refers to —NRR' wherein R and R' can independently represent, for example, but not limited to, hydrogen, alkyl, or aryl.

As used herein, unless otherwise provided, "carboxy ester" may also refer to —C(═O)O. Examples include groups of the structure —COOR or —OCOR wherein R can represent, for example, but not limited to, hydrogen, alkyl, or aryl.

As used herein, unless otherwise provided, "carboxyl" may also refer to —COOH. As used herein, "carbonyl" refers to any group comprising —C(═O) moiety, where C is bonded to two other atoms. Examples of carbonyl groups include groups that include a carbonyl moiety or a moiety that includes a carbonyl moiety. For example a carbonyl group can include a group including an aldehyde (—C(═O)H) moiety, a ketone (—C—C(═O)—C moiety, an ester (—C(═O)—O—C') moiety, an acyl (—C—C(—O)—) moiety, a carboxyl (—C(═O)OH group, a thioester (—C(═)OSR') moiety, a primary amide (—C—C(═O)N(non-C)$_2$ moiety (wherein N is attached to one C), a secondary amide (—C—C(═O)NHC-moiety (wherein N is attached to two Cs), a tertiary amide (—C(═O)NCC moiety (wherein N is attached to three Cs), and the like.

As used herein, unless otherwise provided, "aryl" refers to any aromatic carbocyclic or heterocyclic group containing unsaturated C—C bonds in conjugation with one another, whether one ring or multiple fused rings. Examples of aryl groups include, but are not limited to, an aryl group including, for example, 5 to 20 carbon atoms, examples of which include, but are not limited to, phenyl, naphthyl, phenanthryl, and the like. Examples of "aryl" substituents include, but are not limited to phenyl, naphthyl, anthranyl, naphthacenyl, fluorenyl, pyrenyl, and the like, or any aromatic heterocyclic group such as pyridine, pyrazine, indole, purine, furan, thiophene, pyrrole and the like. An aryl group may contain only carbon and hydrogen atoms, or may further incorporate one or more heteroatoms such as Si, N, O or S as part of the alkyl group (which may also be referred to as a heteroaryl group).

As used herein, unless otherwise provided, "heteroaryl" may also refer to an aromatic ring system moiety in which one or more ring atoms are heteroatoms, whether one ring or multiple fused rings. When two or more heteroatoms are present, they may be the same or different. In fused ring systems, the one or more heteroatoms may be present in only one of the rings. Examples of heteroaryl groups include, but are not limited to, benzothiazyl, benzoxazol, quinazolinyl, quinolinyl, isoquinolinyl, quinoxalinyl, pyridinyl, pyridazinyl, pyrimidinyl, pyrazinyl, pyrrolyl, oxazolyl, indolyl, thiazyl, and the like.

As used herein, unless otherwise provided, a group, moiety, or molecule may be substituted or unsubstituted. A "substituted" group refers to a group, moiety, or molecule having at least one hydrogen that is substituted with a group of atoms or a non-hydrogen atom. (A group of atoms or non-hydrogen atoms that replaces a hydrogen is also typically referred to as a substituent) When substituted, the substituent group(s) is (are) one or more group(s) individually and independently selected. Examples of various substituents include, but are not limited to, alkyl, cycloalkyl, alkenyl, cycloalkenyl, ether, aryl, heteroaryl, heterocycloalkyl, hydroxyl, oxy, alkoxyl, ester, thioester, acyl, carboxyl, carbonyl, cyano, nitro, amino, amido, halo (e.g., fluoro, chloro, bromo, iodo), or sulfur. When a substituted group includes more than one substituent, the substituents can be bound to the same atom in the group or two or more different atoms. A substituent including a group of atoms can optionally also be substituted.

When used as a characteristic of a portion of a container or build chamber, "optically transparent" refers to having high optical transmission to the wavelength of light being used, and "optically flat" refers to being non-distorting (e.g., optical wavefronts entering the portion of the container or build chamber remain largely unaffected).

As used herein, the singular forms "a", "an" and "the" include plural unless the context clearly dictates otherwise. Thus, for example, reference to an emissive material includes reference to one or more of such materials.

Applicant specifically incorporates the entire contents of all patents, patent applications, publications, and other references cited or referenced in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed, as well as the upper and lower value of each range. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A photohardenable composition comprising a photohardenable resin component and a photoswitchable photoinitiator, wherein the photoswitchable photoinitiator is activated by exposure to light having a first wavelength and light having a second wavelength to induce a crosslinking or polymerization reaction in the photohardenable resin component at an intersection of the lights of the two wavelengths, wherein the first and second wavelengths are different, and wherein the photoswitchable photoinitiator comprises a P-type photochromic molecule comprising a P-type diarylethene molecule, which molecule includes one or more substituents, wherein at least one substituent comprises a polycyclic group including at least two fused rings of atoms, wherein at least one of the fused rings of atoms includes one or more substituents, wherein at least one of the substituents comprises a double bonded oxygen attached to a carbon atom ring member included in one of the fused rings, wherein the polycyclic group is represented by general formula (PG-E):

(PG-E)

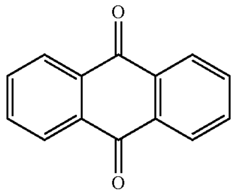

or a derivative thereof.

2. The photohardenable composition of claim 1 further comprising a co-initiator.

3. The photohardenable composition of claim 1 wherein the photohardenable composition exhibits non-Newtonian rheological behavior.

4. The photohardenable composition of claim 1 wherein the photoswitchable photoinitiator is represented by formula (XVIII):

(XVIII)

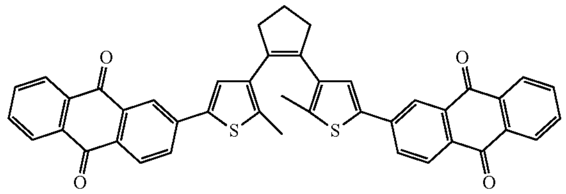

or a derivative thereof.

5. The photohardenable composition of claim 1 wherein the photoswitchable photoinitiator is represented by formula (XXI):

(XXI)

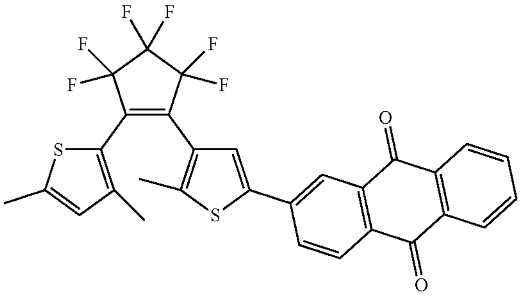

or a derivative thereof.

6. The photohardenable composition of claim 3 further comprising a co-initiator.

7. A photohardenable composition comprising a photohardenable resin component and a photoswitchable photoinitiator, wherein the photoswitchable photoinitiator is activated by exposure to light having a first wavelength and light having a second wavelength to induce a crosslinking or polymerization reaction in the photohardenable resin component at an intersection of the lights of the two wavelengths, wherein the first and second wavelengths are different, and wherein the photoswitchable photoinitiator comprises a P-type photochromic molecule comprising a P-type diarylcycloalkene molecule represented by general formula (I):

(I)

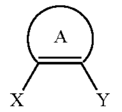

wherein:

A represents a substituted or unsubstituted cycloalkene ring structure,

X represents a heteroaryl group represented by following formula ($X_a$), ($X_b$), ($X_c$), or ($X_d$):

($X_a$)

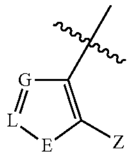

wherein:

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, a sulfur atom with an $R^7$ substituent group ($SR^7$), an oxygen atom with an $R^8$ substituent group ($OR^8$), or a cyano (CN) group, G is a member of the ring and represents a carbon atom with an $R^9$ substituent group ($CR^9$) or a nitrogen atom (N);

L is a member of the ring and represents a carbon atom with an $R^1$ substituent group (C $R^1$) or a nitrogen atom (N), and $R^1$ and $R^6$-$R^9$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X-R' wherein R or R' can independently represent an aryl or alkyl group), or a substituted or unsubstituted alcohol group; or ($X_b$)

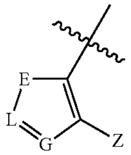

wherein:

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, a sulfur atom with an $R^7$ substituent group ($SR^7$), an oxygen atom with an $R^8$ substituent group ($OR^8$), or a cyano (CN) group, G is a member of the ring and represents a carbon atom with an R substituent group ($CR^9$) or a nitrogen atom (N);

L is a member of the ring and represents a carbon atom with an $R^1$ substituent group (C $R^1$) or a nitrogen atom (N), and $R^1$ and $R^6$-$R^9$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X-R' wherein R or R' can independently represent an aryl or alkyl group), or a substituted or unsubstituted alcohol group; or (X$_c$)

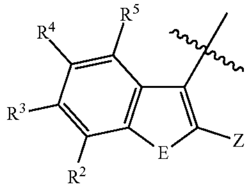

wherein:

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, a sulfur atom with an $R^7$ substituent group ($SR^7$), an oxygen atom with an $R^8$ substituent group ($OR^8$), or a cyano (CN) group, and $R^2$-$R^8$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X-R' wherein R or R' can independently represent an aryl or alkyl group), or a substituted or unsubstituted alcohol group; or (X$_d$)

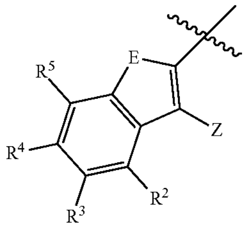

E is a member of the ring and represents an oxygen atom (O), a sulfur atom(S), a sulfur dioxide group ($SO_2$), a selenium atom, or a nitrogen atom with an $R^6$ substituent group ($NR^6$), Z represents a substituted or unsubstituted alkyl group, a substituted or unsubstituted aryl group, a substituted or unsubstituted alkynyl group, a sulfur atom with an $R^7$ substituent group ($SR^7$), an oxygen atom with an $R^8$ substituent group ($OR^8$), or a cyano (CN) group, and $R^2$-$R^8$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X-R' wherein R or R' can independently represent an aryl or alkyl group), or a substituted or unsubstituted alcohol group;

Y represents a heteroaryl group represented by formula (Y$_a$), (Y$_b$), (Y$_c$) or (Y$_d$):

(Y$_a$)

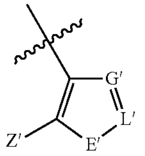

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z' represents a substituted or unsubstituted alkyl group, a substituted or unsubstituted aryl group, a substituted or unsubstituted alkynyl group, a sulfur atom with an $R^{16}$ substituent group ($SR^{16}$), an oxygen atom with an $R^{17}$ substituent group ($OR^{17}$), or a cyano (CN) group, G' is a member of the ring and represents a carbon atom with an $R^{18}$ substituent group ($CR^{18}$) or a nitrogen atom (N);

L' is a member of the ring and represents a carbon atom with an $R^{10}$ substituent group (C $R^{10}$) or a nitrogen atom (N), and $R^{10}$ and $R^{15}$-$R^{18}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X-R' wherein R or R' can independently represent an aryl or alkyl group), or a substituted or unsubstituted alcohol group;

($Y_b$)

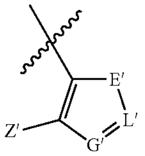

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z' represents a substituted or unsubstituted alkyl group, a substituted or unsubstituted aryl group, a substituted or unsubstituted alkynyl group, a sulfur atom with an $R^{16}$ substituent group ($SR^{16}$), an oxygen atom with an $R^{17}$ substituent group ($OR^{17}$), or a cyano (CN) group, G' is a member of the ring and represents a carbon atom with an $R^{18}$ substituent group, ($CR^{18}$) or a nitrogen atom (N);

L' is a member of the ring and represents a carbon atom with an $R^{10}$ substituent group (C $R^{10}$) or a nitrogen atom (N), and $R^{10}$ and $R^{15}$-$R^{18}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X-R' wherein R or R' can independently represent an aryl or alkyl group), or a substituted or unsubstituted alcohol group;

($Y_c$)

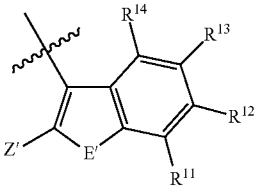

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z' represents a substituted or unsubstituted alkyl group, a substituted or unsubstituted aryl group, a substituted or unsubstituted alkynyl group, a sulfur atom with an $R^{16}$ substituent group ($SR^{16}$), an oxygen atom with an $R^{17}$ substituent group ($OR^{17}$), or a cyano (CN) group, and $R^{11}$-$R^{17}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X-R' wherein R or R' can independently represent an aryl or alkyl group), or a substituted or unsubstituted alcohol group; or ($Y_d$)

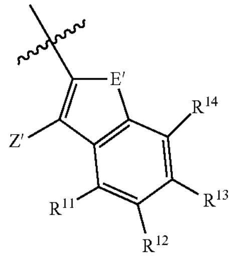

wherein:

E' is a member of the ring and represents an oxygen atom (O), a sulfur atom(S), a sulfur dioxide group ($SO_2$), a selenium atom, or a nitrogen atom with an $R^{15}$ substituent group ($NR^{15}$), Z' represents a substituted or unsubstituted alkyl group, a substituted or unsubstituted aryl group, a substituted or unsubstituted alkynyl group, a sulfur atom with an $R^{16}$ substituent group ($SR^{16}$), an oxygen atom with an $R^{17}$ substituent group ($OR^{17}$), or a cyano (CN) group, and $R^{11}$-$R^{17}$ are substituents, are the same or different, and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X-R' wherein R or R' can independently represent an aryl or alkyl group), or a substituted or unsubstituted alcohol group;

wherein X and/or Y includes at least one R substituent comprising a substituted or unsubstituted polycyclic group including at least two fused rings of atoms, wherein at least one of the fused rings of atoms includes one or more substituents, wherein at least one of the substituents comprises a double bonded oxygen attached to a carbon atom ring member included in one of the fused rings, wherein the polycyclic group is represented by general formula (PG-E):

(PG-E)

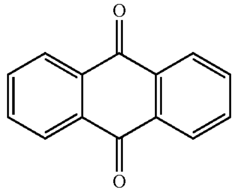

or a derivative thereof.

8. The photohardenable composition of claim 7 wherein A comprises a structure represented by formula ($A_a$), ($A_b$), ($A_c$), or A($_d$):

($A_a$)

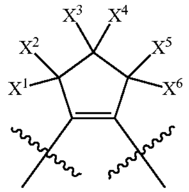

wherein:

$X^1$, $X^2$, $X^3$, $X^4$, $X^5$, and $X^6$ are the same or different and are independently hydrogen (H), fluorine (F), chlorine (Cl), or a substituted or unsubstituted alkyl or heteroalkyl group, ($A_b$)

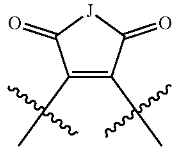

wherein:

J is a member of the ring and represents oxygen O or a nitrogen with an $R^{25}$ substituent group ($NR^{25}$) wherein $R^{25}$ represents hydrogen, substituted or unsubstituted alkyl, or substituted or unsubstituted aryl, ($A_c$)

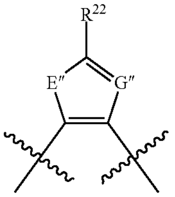

wherein:

E" is a member of the ring and represents an oxygen atom (O), a sulfur atom(S), a sulfur dioxide group ($SO_2$), a selenium atom, or a nitrogen atom with an $R^{23}$ substituent group ($NR^{23}$), G" is a member of the ring and represents a carbon atom with an $R^{24}$ substituent group ($CR^{24}$) or a nitrogen atom (N); and $R^{22}$-$R^{24}$ are substituents and are the same or different and independently represent, for example, hydrogen, a substituted or unsubstituted alkyl group, a substituted or unsubstituted alkenyl group, a substituted or unsubstituted cycloalkenyl group, a substituted or unsubstituted cycloalkyl group, a substituted or unsubstituted aryl group, a substituted or unsubstituted aralkyl group, a substituted or unsubstituted alkylaryl group, a substituted or unsubstituted heteroalkyl group, a substituted or unsubstituted heteroaryl group, a substituted or unsubstituted aryloxy group, a substituted or unsubstituted alkoxy group, a substituted or unsubstituted ester group, a substituted or unsubstituted carbonate group, a substituted or unsubstituted ketone group, a substituted or unsubstituted aldehyde group, a substituted or unsubstituted imine group, a substituted or unsubstituted carboxyl group, a substituted or unsubstituted amido group, a substituted or unsubstituted urethane group, a substituted or unsubstituted urea group, a substituted or unsubstituted tetrazine group, a substituted or unsubstituted amino group, iodo, bromo, chloro, fluoro, a cyano group (—CN), a nitro group (—$NO_2$), a hydroxyl group (—OH), a thiol (—SH), a thioether group (R—X-R' wherein R or R' can independently represent an aryl or alkyl group), or a substituted or unsubstituted alcohol group, or ($A_d$)

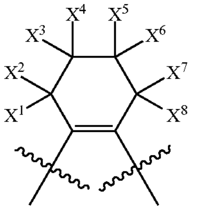

wherein:

$X^1$, $X^2$, $X^3$, $X^4$, $X^5$, $X^6$, $X^7$, and $X^8$ are the same or different and are independently represent hydrogen (H), fluorine (F), chlorine (Cl), or a substituted or unsubstituted alkyl or heteroalkyl group.

9. The photohardenable composition of claim 7 wherein R groups on any two adjacent ring members of X and/or Y may comprise atoms for completing a ring structure linking the two adjacent groups together.

10. The photohardenable composition of claim 7 wherein each of X and Y include one or more of the at least one R substituents comprising the substituted or unsubstituted polycyclic group including at least two fused rings of atoms, wherein at least one of the fused rings of atoms includes one or more substituents, wherein at least one of the substituents comprises a double bonded oxygen attached to a carbon atom ring member included in one of the fused rings, wherein the one or more R substituents on X and the one or more R substituent on Yare independently the same or different.

11. The photohardenable composition of claim 7 wherein, in general formula (I), A is represented by formula ($A_d$), wherein $X^1$-$X^6$ is hydrogen or fluorine, X is represented by ($X_a$) wherein $R^1$ is an iodo, bromo, chloro, fluoro, or an alkyl group, E is sulfur, Z is an alkyl or phenyl group, and G is $CR^9$, and Y is represented by ($Y_a$) wherein E' is sulfur, Z' is an alkyl or phenyl group, and G' is $CR^{15}$, and $R^{10}$ represents a polycyclic group including at least two fused rings of atoms, wherein at least one of the fused rings of atoms includes one or more substituents, wherein at least one of the substituents comprises a double bonded oxygen attached to a carbon atom ring member included in one of the fused rings.

12. The photohardenable composition of claim 7 wherein, in general formula (I), A is represented by formula ($A_d$), wherein $X^1$-$X^6$ is hydrogen or fluorine, X is represented by ($X_b$) wherein $R^1$ is an iodo, bromo, chloro, fluoro, or an alkyl group, E is sulfur, Z is an alkyl or phenyl group, and G is $CR^9$, and Y is represented by ($Y_a$) wherein E' is sulfur, Z' is an alkyl or phenyl group, and G' is $CR^{15}$, and $R^{10}$ represents a polycyclic group including at least two fused rings of atoms, wherein at least one of the fused rings of atoms includes one or more substituents, wherein at least one of the substituents comprises a double bonded oxygen attached to a carbon atom ring member included in one of the fused rings.

13. The photohardenable composition of claim 7 further comprising a co-initiator.

* * * * *